United States Patent
Mori

(10) Patent No.: US 7,952,330 B2
(45) Date of Patent: May 31, 2011

(54) SECONDARY BATTERY PROTECTION CIRCUIT, BATTERY PACK AND THERMOSENSITIVE PROTECTION SWITCH DEVICE

(75) Inventor: Iichiro Mori, Hyogo (JP)

(73) Assignee: Panasonic Corporation, Osaka (JP)

( * ) Notice: Subject to any disclaimer, the term of this patent is extended or adjusted under 35 U.S.C. 154(b) by 866 days.

(21) Appl. No.: 11/883,081

(22) PCT Filed: Apr. 20, 2006

(86) PCT No.: PCT/JP2006/008306
§ 371 (c)(1),
(2), (4) Date: Jul. 26, 2007

(87) PCT Pub. No.: WO2006/112501
PCT Pub. Date: Oct. 26, 2006

(65) Prior Publication Data
US 2008/0116851 A1 May 22, 2008

(30) Foreign Application Priority Data

Apr. 20, 2005 (JP) ................................. 2005-122729
Apr. 20, 2005 (JP) ................................. 2005-122765
May 31, 2005 (JP) ................................. 2005-159889
Jun. 3, 2005 (JP) ................................. 2005-164485
Jun. 21, 2005 (JP) ................................. 2005-181125

(51) Int. Cl.
*H02J 7/04* (2006.01)
*H02J 7/16* (2006.01)
(52) U.S. Cl. ........ 320/150; 320/151; 320/144; 320/153; 320/154
(58) Field of Classification Search .......... 320/150–151, 320/144, 154, 153
See application file for complete search history.

(56) References Cited

U.S. PATENT DOCUMENTS
6,222,346 B1 * 4/2001 Mori ............................ 320/134
(Continued)

FOREIGN PATENT DOCUMENTS
JP 63-174145 11/1988
(Continued)

OTHER PUBLICATIONS

Japanese Notice of Reasons for Rejection, w/ English translation thereof, issue in Japanese Patent Application No. JP 2005-159889 dated Feb. 23, 2010.

(Continued)

*Primary Examiner* — Edward Tso
*Assistant Examiner* — Samuel Berhanu
(74) *Attorney, Agent, or Firm* — McDermott Will & Emery LLP

(57) ABSTRACT

A protection circuit is provided for protecting a secondary battery from overcharging and excessive discharge current by a simple circuit. The protection circuit is provided with a connection terminal (T3) for connecting the secondary battery (6); a connection terminal (T1) for connecting a charging device for charging the secondary battery (6) and/or a load device driven by a discharge current from the secondary battery (6); a bimetal switch (SW1) that is provided between the connection terminals (T1, T3) and turned off in the case of exceeding a specified temperature set beforehand; a heater (R2) for heating the bimetal switch (SW1); and an integrated circuit (IC1) for turning the bimetal switch (SW1) off by causing the heater (R2) to generate heat if a voltage applied to the connection terminal (T3) by the secondary battery (6) exceeds a preset reference voltage.

10 Claims, 54 Drawing Sheets

U.S. PATENT DOCUMENTS

| | | | |
|---|---|---|---|
| 6,577,105 B1 * | 6/2003 | Iwaizono | 320/134 |
| 7,163,757 B2 | 1/2007 | Iwasaki et al. | |
| 2002/0140401 A1 * | 10/2002 | Watanabe et al. | 320/134 |

FOREIGN PATENT DOCUMENTS

| | | |
|---|---|---|
| JP | 02-139820 A | 5/1990 |
| JP | 4-75430 | 3/1992 |
| JP | 05-282977 A | 10/1993 |
| JP | 11-262270 | 9/1999 |
| JP | 2002-204525 A | 7/2002 |
| JP | 2003-007286 A | 1/2003 |
| JP | 2003-070153 A | 3/2003 |
| JP | 2003-111269 | 4/2003 |
| JP | 2003-115246 A | 4/2003 |
| JP | 2004-206894 | 7/2004 |
| JP | 2004-220944 A | 8/2004 |
| JP | 2006-304487 A | 11/2006 |

OTHER PUBLICATIONS

Japanese Notice of Reasons for Rejection, w/ English translation thereof, issued in Japanese Patent Application No. JP 2005-159889 dated Nov. 24, 2010.

Japanese Notice of Reasons for Rejection, w/ English translation thereof, Issued in Japanese Patent Application No. JP 2005-181125 dated Feb. 8, 2011.

Japanese Notice of Reasons for Rejection, w/ English translation thereof, Issued in Japanese Patent Application No. JP 2005-122765 dated Feb. 15, 2011.

* cited by examiner

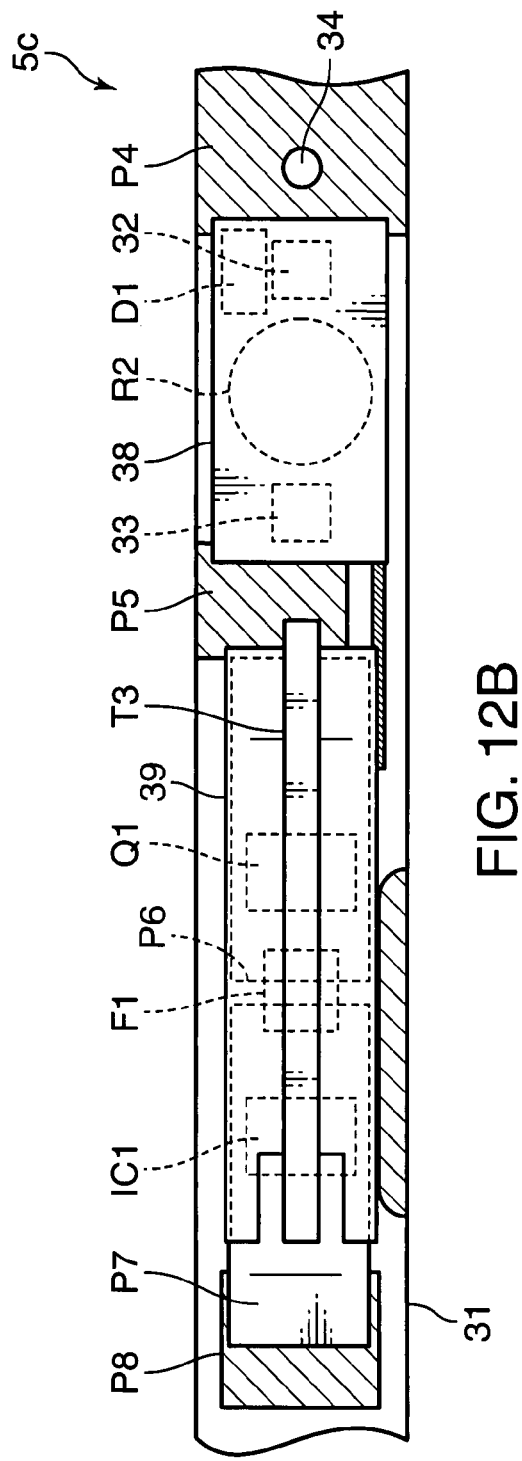
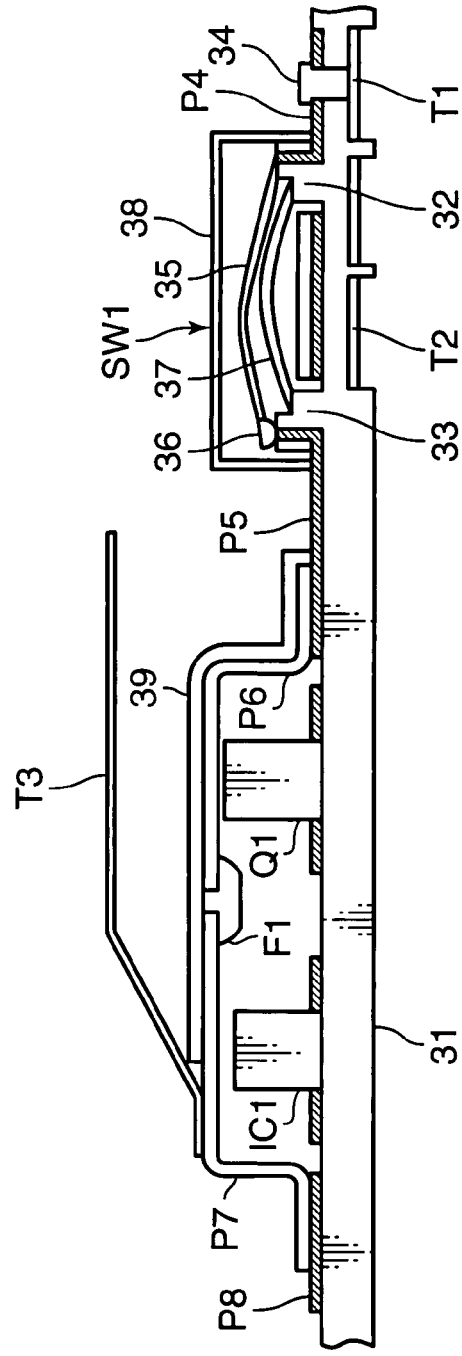
FIG. 12A
FIG. 12B

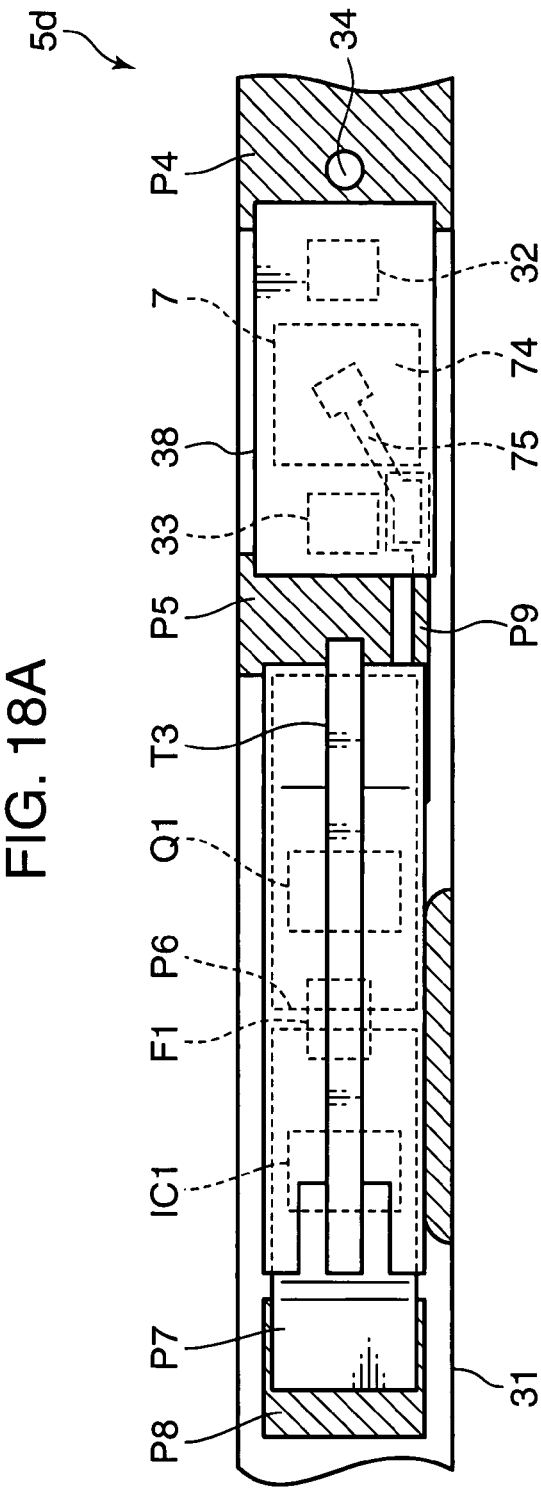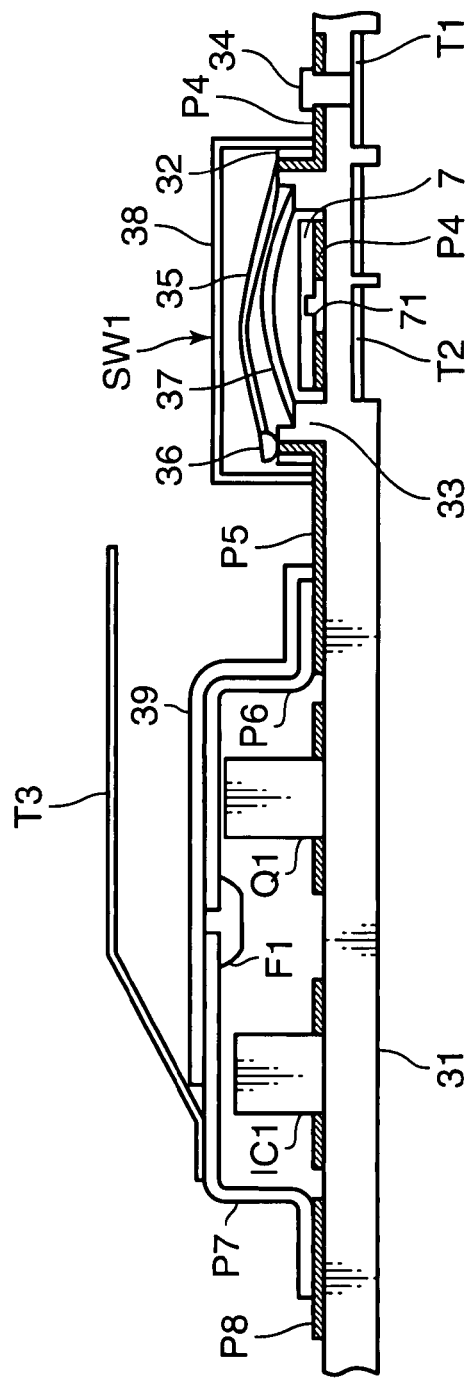

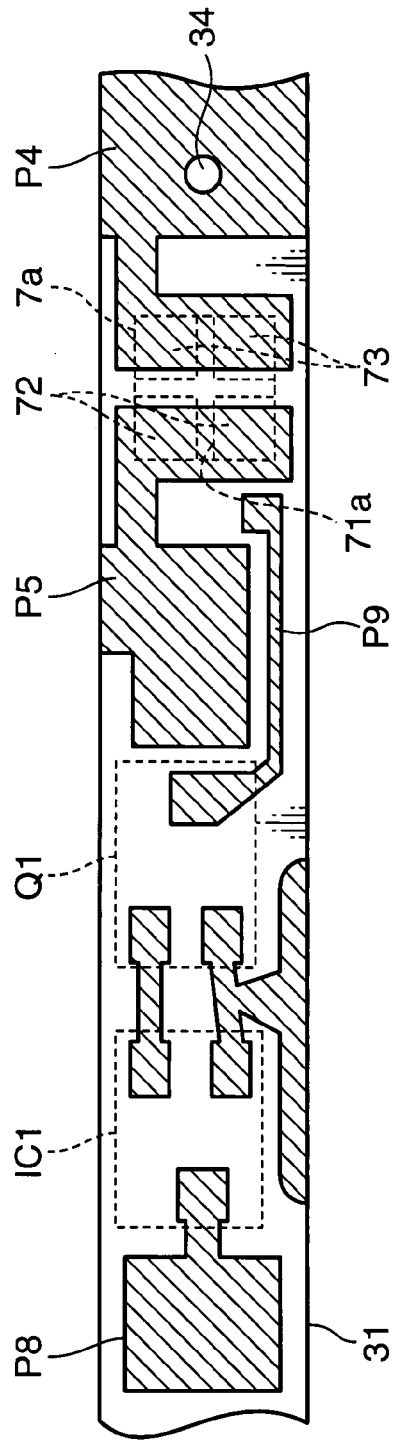
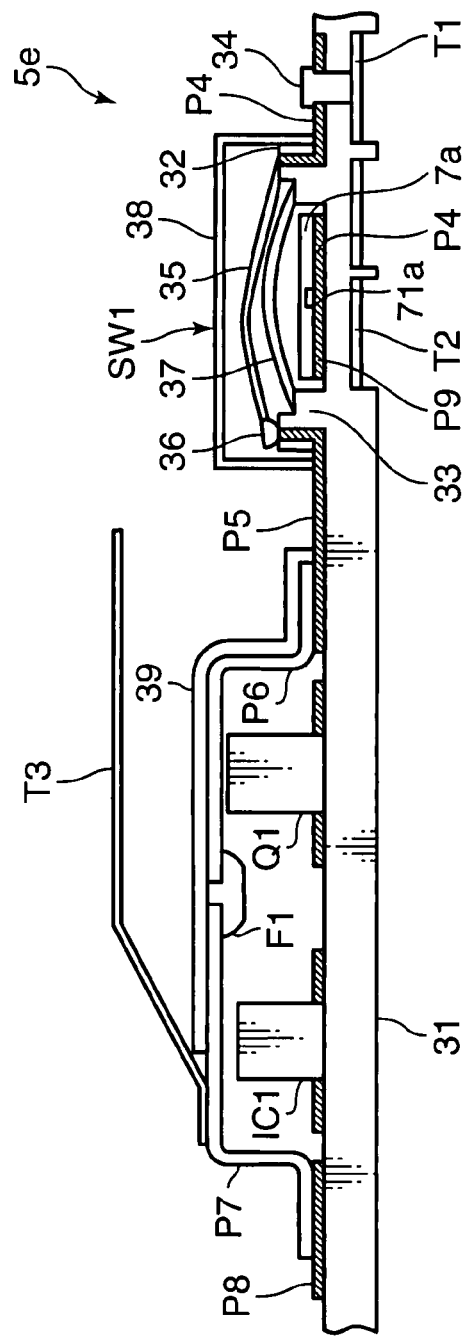
FIG. 22A
FIG. 22B

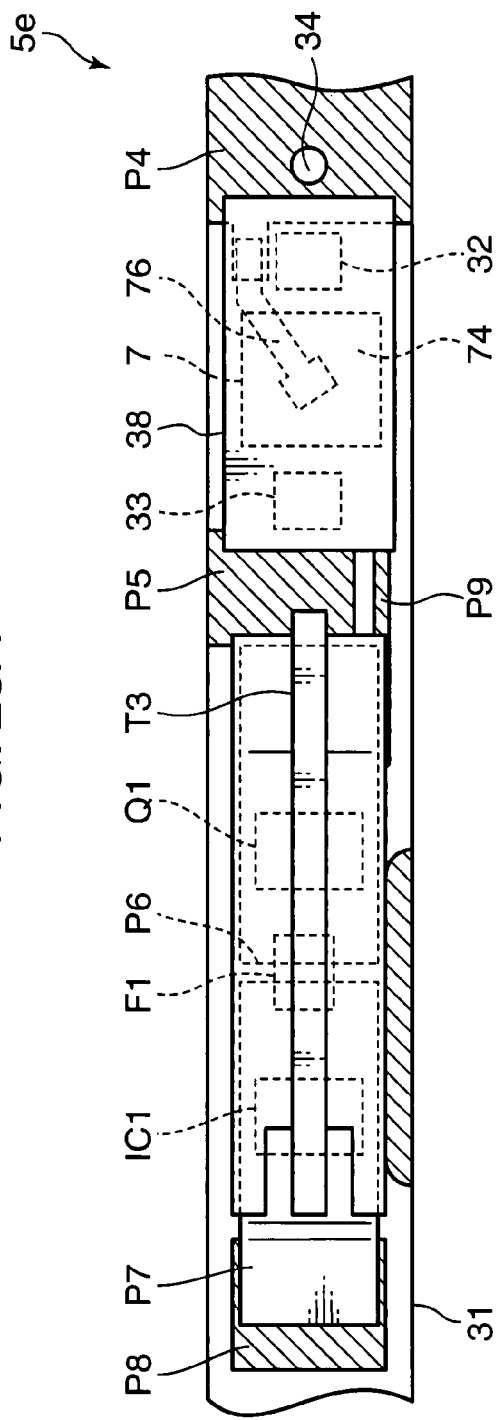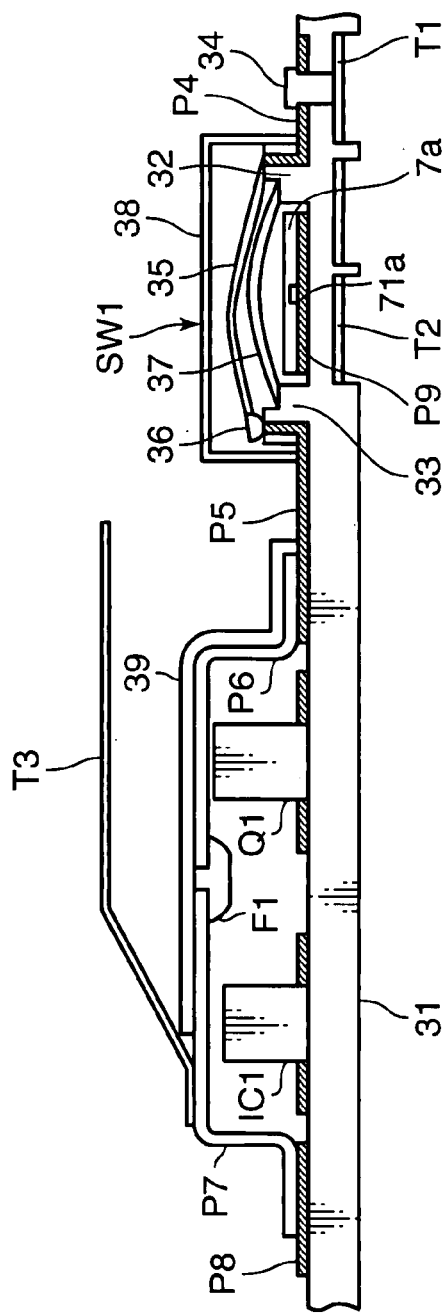
FIG. 23A
FIG. 23B

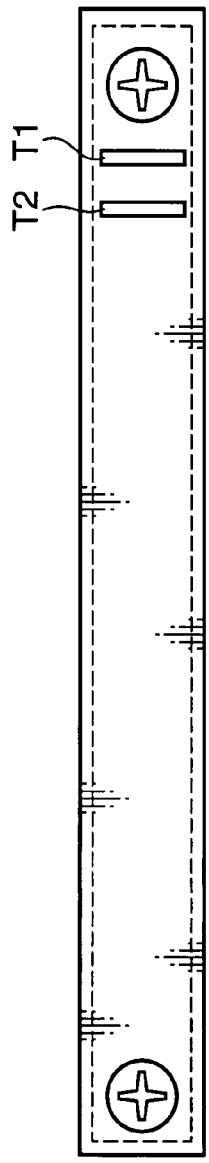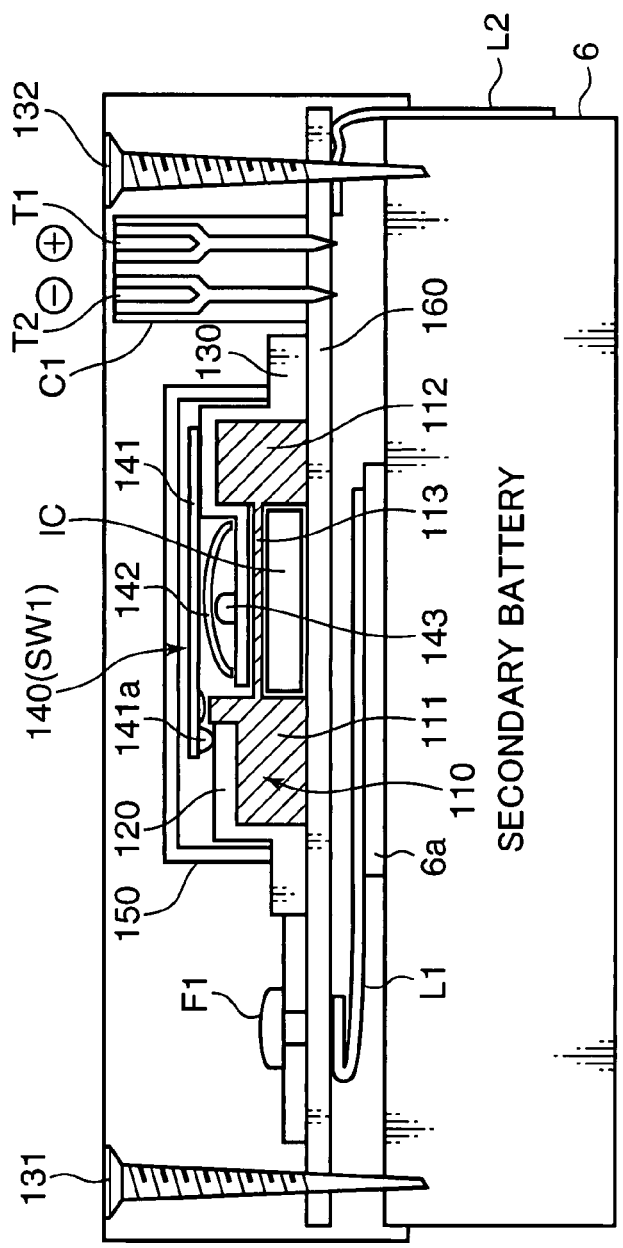
FIG. 36A
FIG. 36B

SECONDARY BATTERY PROTECTION CIRCUIT, BATTERY PACK AND THERMOSENSITIVE PROTECTION SWITCH DEVICE

This application is the U.S. National Phase under 35 U.S.C. §371 of International Application No. PCT/JP/2006/308306, filed on Apr. 20, 2006, which in turn claims the benefit of Japanese Application No. 2005-122729, filed on Apr. 20, 2005, JP 2005-122765, filed Apr. 20, 2005, JP 2005-159889, filed May 31, 2005, JP 2005-164485, filed Jun. 3, 2005, and JP 2005-181125, tiled Jun. 21, 2005, the disclosures of which Applications are incorporated by reference herein.

FIELD OF TECHNOLOGY

The present invention relates to a protection circuit for protecting a secondary battery from overcharging and excessive discharge current, a thermosensitive protection switch device and a battery pack provided with such protection circuit and switch device.

BACKGROUND ART

FIG. 51 is a circuit diagram showing the construction of a battery pack according to background art. A battery pack 1001 shown in FIG. 51 is provided with a protection circuit 1002 and a secondary battery 1003. The secondary battery 1003 is, for example, a rechargeable secondary battery such as a lithium ion secondary battery, a lithium polymer secondary battery, a nickel-metal-hydride secondary battery or a nickel-cadmium secondary battery. In the case of overcharging or excessive discharge current, such a secondary battery might have characteristics thereof such as cycle life degraded or might undergo expansion, deformation and the like. Accordingly, the battery pack 1001 is provided with the protection circuit 1002 for protecting the secondary battery 1003 from overcharging or excessive discharge current (see, for example, patent documents 1, 2).

The protection circuit 1002 includes external connection terminals 1004, 1005, FETs (Field Effect Transistor) 1006, 1007, reference voltage generators 1008, 1009, comparators 1010, 1111, a resistor 1112 and a logic circuit 1013.

The external connection terminals 1004, 1005 are connection terminals for connecting a charger for charging the secondary battery 1003 and for connecting a power source for driving a mobile device such as a mobile phone or a digital camera, an electric tool, a robot or an electric automobile that is driven by a discharge current from the secondary battery 1003. The external connection terminal 1004, the secondary battery 1003, the FET 1006, the FET 1007 and the external connection terminal 1005 are connected in series.

The FET 1006 is oriented such that an anode of a parasite diode is connected to the secondary battery 1003, whereas the FET 1007 is oriented such that an anode of a parasitic diode is connected to the external connection terminal 1005. The FET 1006 is used as a switch for protection from excessive discharge for cutting off a discharge current if the discharge current of the secondary battery 1003 becomes excessive, whereas the FET 1007 is used as a switch for protection from overcharging for cutting off a charge current if the secondary battery 1003 is overcharged.

Further, a positive electrode terminal of the secondary battery 1003 is connected to a plus terminal of the comparator 1010, a reference voltage Vref1 outputted from the reference voltage generator 1008 is applied to a minus terminal of the comparator 1010, and an output terminal of the comparator 1010 is connected to the logic circuit 1013. A voltage for detecting the overcharging of the secondary battery 1003 is set as the reference voltage Vref1. The comparator 1010 outputs a detection signal representing overcharging to the logic circuit 1013 if the secondary battery 1003 is charged by an unillustrated charger connected to the external connection terminals 1004, 1005 and a terminal voltage of the secondary battery 1003 exceeds the reference voltage Vref1.

Further, a connection point of the FETS 1006, 1007 is connected to a minus terminal of the comparator 1111 via the resistor 1112, and a reference voltage Vref2 outputted from the reference voltage generator 1009 is applied to a plus terminal of the comparator 1111. Thus, a voltage drop caused by the on-resistance of the FET 1006 resulting from the flow of a discharge current from the secondary battery 1003 is applied to the minus terminal of the comparator 1111 via the resistor 1112. The reference voltage Vref2 is set to a voltage corresponding to a voltage drop caused by the on-resistance of the FET 1006, for example, in the case where a maximum discharge current within such a range as not to cause the characteristic degradation of the secondary battery 1003 flows through the FET 1006.

The comparator 1111 detects an increase of the voltage drop in the FET 1006 and outputs a detection signal representing overcurrent discharge to the logic circuit 1013, for example, if the external connection terminals 1004, 1005 are short-circuited together due to the contact with a metal piece or the breakdown of a load device connected to the external connection terminals 1004, 1005 and an excessive discharge current flows from the secondary battery 1003.

The logic circuit 1013 turns the FET 1007 off to stop the charging of the secondary battery 1003 if a detection signal representing overcharging is outputted from the comparator 1010 while turning the FET 1006 off to stop the discharge of the secondary battery 1003 if a detection signal representing overcurrent discharge is outputted from the comparator 1111. In this way, the protection circuit 1002 protects the secondary battery 1003 from overcharging and overcurrent discharge.

Further, a known protection circuit for protecting a secondary battery from overcharging and overcurrent discharge in this way is such as in a battery pack 1021 shown in FIG. 52 in which a secondary battery 1022 and a bimetal switch 1023 are connected in series. If the bimetal switch 1023 is heated due to the heat generation of the secondary battery 1022 or the heat generation of the bimetal switch 1023 itself resulting from overcharging, for example, in the case of the breakdown of a charger 1026 connected with external connection terminals 1024, 1025, this protection circuit cuts off a charge current by turning the bimetal switch 1023 off to protect the secondary battery 1022.

Another known protection circuit is such as in a battery pack 1031 shown in FIG. 53 in which a PTC (Positive Temperature Coefficient) element 1032 in the form of a thermistor that is turned off in the case of exceeding a specified temperature is used, a secondary battery 1033 and the PTC element 1032 are connected in series. If the PTC element 1032 is heated due to the heat generation of the secondary battery 1032 or the heat generation of the PTC element 1033 itself resulting from overcharging, for example, in the case of the breakdown of a charger 1036 connected with external connection terminals 1034, 1035, this protection circuit cuts off a charge current by turning the PTC element 1032 off to protect the secondary battery 1032.

FIG. 54 is a circuit diagram showing another construction of a battery pack according to background art. A battery pack 1141 shown in FIG. 54 is a battery pack used in an electric apparatus, in which a large load current, e.g. 100 A (1 kW)

flows such as an electric tool, an electric automobile or a robot. The battery pack 1141 is provided with a protection circuit 1142 and secondary batteries 1143 to 1146. A plurality of secondary batteries 1143 to 1146 are similar to the secondary battery 1003 in the battery pack 1001 and are connected in series to increase an output power.

The protection circuit 1142 is provided with external connection terminals 1147, 1148, FETs 1149, 1150, reference voltage generators 1151 to 1159, comparators 1160 to 1168, AND gates 1169, 1170, a resistor 1171 and a logic circuit 1172.

The external connection terminals 1147, 1148 are connection terminals similar to the external connection terminals 1004, 1005 in the battery pack 1001. The external connection terminal 1147, the secondary batteries 1143 to 1146, the FET 1149, the FET 1150 and the external connection terminal 1148 are connected in series.

The FET 1149 is used as a switch for protection from excessive discharge for cutting off discharge currents similar to the FET 1006 in the battery pack 1001 if discharge currents of the secondary batteries 1143 to 1146 become excessive, whereas the FET 1150 is used as a switch for protection from overcharging for cutting off charge currents similar to the FET 1007 in the battery pack 1001 if the secondary batteries 1143 to 1146 are overcharged.

The comparators 1160, 1162, 1164 and 1166 are for detecting the overcharging of the secondary batteries 1143, 1144, 1145 and 1146, and the comparators 1161, 1163, 1165 and 1167 are for detecting the excessive discharge of the secondary batteries 1143, 1144, 1145 and 1146.

Output voltages of the secondary batteries 1143, 1144, 1145 and 1146 and reference voltages outputted from the reference voltage generators 1151, 1152, 1153 and 1154 are compared by the comparators 1160, 1162, 1164 and 1166, and signals representing the comparison results are outputted to the AND gate 1169. If the output voltages of the secondary batteries 1143, 1144, 1145 and 1146 exceed the respective reference voltages, overcharging is detected and a low-level output voltage of the AND gate 1169 is outputted to the logic circuit 1172, which in turn turns the FET 1150 off to protect the secondary batteries 1143, 1144, 1145 and 1146 from overcharging.

Similarly, output voltages of the secondary batteries 1143, 1144, 1145 and 1146 and reference voltages outputted from the reference voltage generators 1155, 1156, 1157 and 1158 are compared by the comparators 1161, 1163, 1165 and 1167, and signals representing the comparison results are outputted to the AND gate 1170. If the output voltages of the secondary batteries 1143, 1144, 1145 and 1146 fall below the respective reference voltages, excessive discharge is detected and a high-level output voltage of the AND gate 1169 is outputted to the logic circuit 1172, which in turn turns the FET 1149 off to protect the secondary batteries 1143, 1144, 1145 and 1146 from excessive discharge.

Further, a connection point of the FETs 1149 and 1150 is connected to a plus terminal of the comparator 1168 via the resistor 1171, and a reference voltage outputted from the reference voltage generator 1159 is applied to a minus terminal of the comparator 1168. Thus, the discharge currents from the secondary batteries 1143 to 1146 flow through the FET 1149 and a voltage drop caused by the on-resistance of the FET 1149 is applied to the plus terminal of the comparator 1168 via the resistor 1171. The reference voltage generator 1159 is set to generate a voltage corresponding to a voltage drop caused by the on-resistance of the FET 1149, for example, if a maximum discharge current within such a range as not to cause the characteristic degradation of the secondary batteries 1143 to 1146 flows through the FET 1149.

Upon the flow of excessive discharge currents from the secondary batteries 1143 to 1146, the comparator 1168 detects an increase in the voltage drop in the FET 1149 and outputs a detection signal representing overcurrent discharge to the logic circuit 1172.

Upon the output of the detection signal representing overcurrent discharge from the comparator 1168, the logic circuit 1172 turns the FET 1149 off to stop the discharge of the secondary batteries 1143 to 1146. In this way, the protection circuit 1142 protects the secondary batteries 1143 to 1146 from excessive charging and discharging and overcurrent discharge.

However, the protection circuit 1002 shown in FIG. 51 cannot cut off the discharge current and the charge current having different directions of current flows by one FET since the FET includes a parasitic diode, and it has been necessary to provide the FET 1006 for cutting off the discharge current and the FET 1007 for cutting off the charge current. Further, the reference voltage generator 1008 and the comparator 1010 are necessary to detect overcharging; the reference voltage generator 1009, the comparator 1111, and the resistor 1112 are necessary to detect the excessive discharge current; and the logic circuit 1013 is necessary to turn the two FETS 1006, 1007 on and off in accordance with the output signals of the comparators 1010, 1111. This has caused inconvenience of increasing the circuit size of the protection circuit 1002.

Particularly if it is necessary to cause a large load current to flow as in the battery pack 1141 shown in FIG. 54, transistors with a large current rating need to be used as the FETs 1149, 1150, which has caused inconvenience of enlarging the FETs 1149, 1150 and increasing costs. Further, if the output voltage is increased by connecting the secondary batteries in series, the withstand voltages of the FETs 1149, 1150 need to be increased. However, since the transistors having high withstand voltages tend to increase the on-resistances, there has been inconvenience of increasing power losses in the FETs 1149, 1150.

Further, in a construction for protecting the secondary battery from overcharging by connecting a temperature switch, which operates with temperature, such as a bimetal switch or a PTC element with the secondary battery in series as shown in FIGS. 52 and 53, accuracy in detecting overcharging is low. Thus, if the secondary battery continues to be charged with such a charge current as not to suddenly increase temperature as in the case where a battery pack is charged, for example, using a charger having poor accuracy in controlling the charging voltage, the secondary battery is overcharged without the temperature switch operating, thereby causing inconvenience of degrading the characteristics of the secondary battery and leading to a likelihood of expanding or deforming the battery.
Patent Document 1: Japanese Unexamined Patent Publication No. H04-75430
Patent Document 2: Japanese Unexamined Patent Publication No. H11-262270

DISCLOSURE OF THE INVENTION

In view of the above problems, an object of the present invention is to provide a protection circuit capable of preventing the degradation of characteristics of a secondary battery by protecting the secondary battery from overcharging, excessive discharge current and the like by a simple circuit.

The present invention is directed to a protection circuit for a secondary battery, comprising a first and a second connection terminals for connecting a charging device for charging the secondary battery and/or a load device driven by a discharge current from the secondary battery; a third and a fourth connection terminals connected between the opposite electrodes of the secondary battery; a heat-sensitive switch that is provided between the first and third connection terminals and turned off in the case of exceeding a specified temperature set beforehand; a first heater for heating the heat-sensitive switch; and a protection controller for turning the heat-sensitive switch off by causing the first heater to generate heat if a physical quantity relating to the characteristic of the secondary battery exceeds a preset value of the physical quantity.

With this construction, if the physical quantity relating to the characteristic of the secondary battery exceeds the preset value, the first heater is caused to generate heat by the protection controller and the heat-sensitive switch is heated by the first heater, thereby turning the heat-sensitive switch off to cut off a charge or discharge current. Thus, the characteristic degradation of the secondary battery can be reduced. Further, since the discharge current and the charge current can be cut off by one heat-sensitive switch, the circuit can be simplified.

BRIEF DESCRIPTION OF THE DRAWINGS

FIG. 4 is an external perspective view showing one example of the construction of a protection circuit according to the first embodiment of the invention, FIG. 5 are schematic diagrams showing one example of the construction of a protection circuit according to a second embodiment of the invention, wherein FIG. 5A is a diagram showing wiring patterns used to mount components of the protection circuit and FIG. 5B is a section showing one example of the mechanical construction of the protection circuit, FIG. 6 are schematic diagrams showing one example of the mechanical construction of the protection circuit shown in FIG. 5, wherein FIG. 16 is a schematic diagram showing one example of the construction of a series circuit of a heater R3 and a heater R4 used in a protection circuit shown in FIG. 15, FIG. 17 are schematic diagrams showing the mechanical construction of the protection circuit shown in FIG. 15, wherein FIG. 18A is a top view of the protection circuit shown in FIG. 17B and FIG. 18B is the same section as FIG. 17B, FIG. 21 is a circuit diagram showing one example of the electrical construction of a battery pack according to a sixth embodiment of the invention, FIG. 22 are schematic diagrams showing the mechanical construction of the protection circuit shown in FIG. 21, wherein FIG. 22A is a diagram showing wiring patterns used to mount components of the protection circuit and FIG. 22B is a section showing one example of the mechanical construction of the protection circuit, FIG. 23 are schematic diagrams showing the mechanical construction of the protection circuit shown in FIG. 21, wherein 23A is a top view of the protection circuit 5 shown in FIG. 23B and FIG. 23B is a section showing one example of the mechanical construction of the protection circuit, FIG. 32 is a circuit diagram showing the detailed construction of a protection circuit shown in FIG. 31, FIG. 33 are exploded construction diagrams of a battery pack in the case of using the protection circuit of the twelfth embodiment as an integrated circuit, wherein FIG. 33A is a top view and FIG. 33B is a side view, FIG. 34 are exploded construction diagrams of the battery pack in the case of using the protection circuit of the twelfth embodiment as an integrated circuit, wherein FIG. 34A is a top view and FIG. 34B is a side view, FIG. 35 are exploded construction diagrams of the battery pack in the case of using the protection circuit of the twelfth embodiment as an integrated circuit, wherein FIG. 35A is a top view and FIG. 35B is a side view, FIG. 36 are exploded construction diagrams of the battery pack in the case of using the protection circuit of the twelfth embodiment as an integrated circuit, wherein FIG. 36A is a top view and FIG. 36B is a side view.

BEST MODES FOR EMBODYING THE INVENTION

Figure 1:
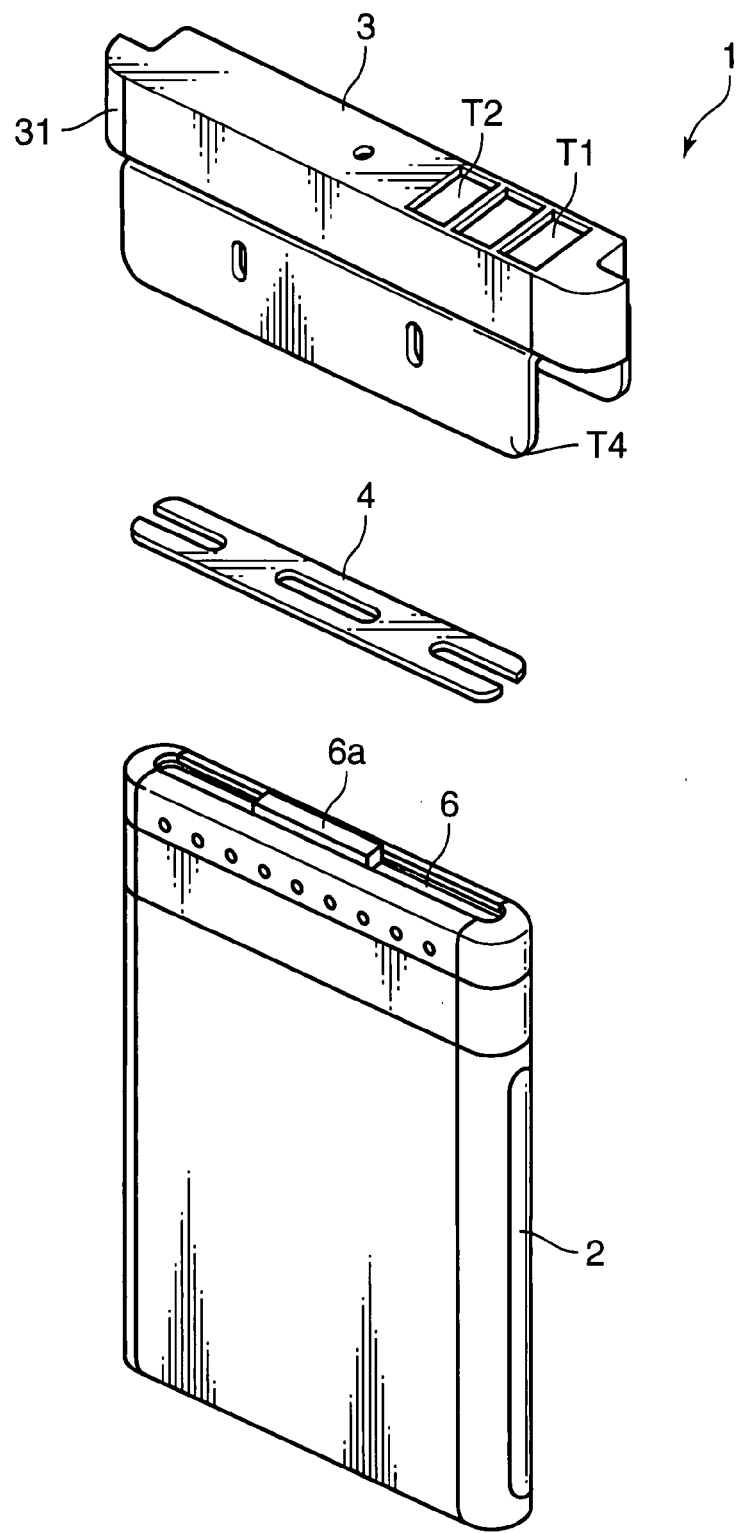
FIG. 1 is an exploded perspective view showing one example of a battery pack according to a first embodiment of the invention.

Hereinafter, embodiments of the present invention are described with reference to the accompanying drawings. It should be noted that elements identified by the same reference numerals are the same in the respective figures and are not repeatedly described.

First Embodiment

FIG. 1 is an exploded perspective view showing one example of a battery pack according to one embodiment of the present invention. A battery pack 1 shown in FIG. 1 is provided with a container 2 in the form of a bottomed tube, an external terminal connecting unit 3, and a plate-shaped spacer 4 to be inserted between the container 2 and the external terminal connecting unit 3. A secondary battery 6 is accommodated into the container 2 and sealed by caulking, and a positive electrode terminal 6a projecting from the secondary battery 6 projects through an opening end of the container 2. The container 2 is made of a steel sheet having the outer surface nickel plated, and a negative electrode of the secondary battery 6 is connected with the container 2 inside the container 2.

The external terminal connecting unit 3 includes a casing 31 formed, for example, by resin molding, and connection terminals T1, T2 used to connect a charging device and load devices are exposed on the outer surface of the casing 31. Connection terminals T4 connected with the connection terminal T2 and made, for example, of a sheet metal project in a connecting direction with the container 2.

Figure 2:
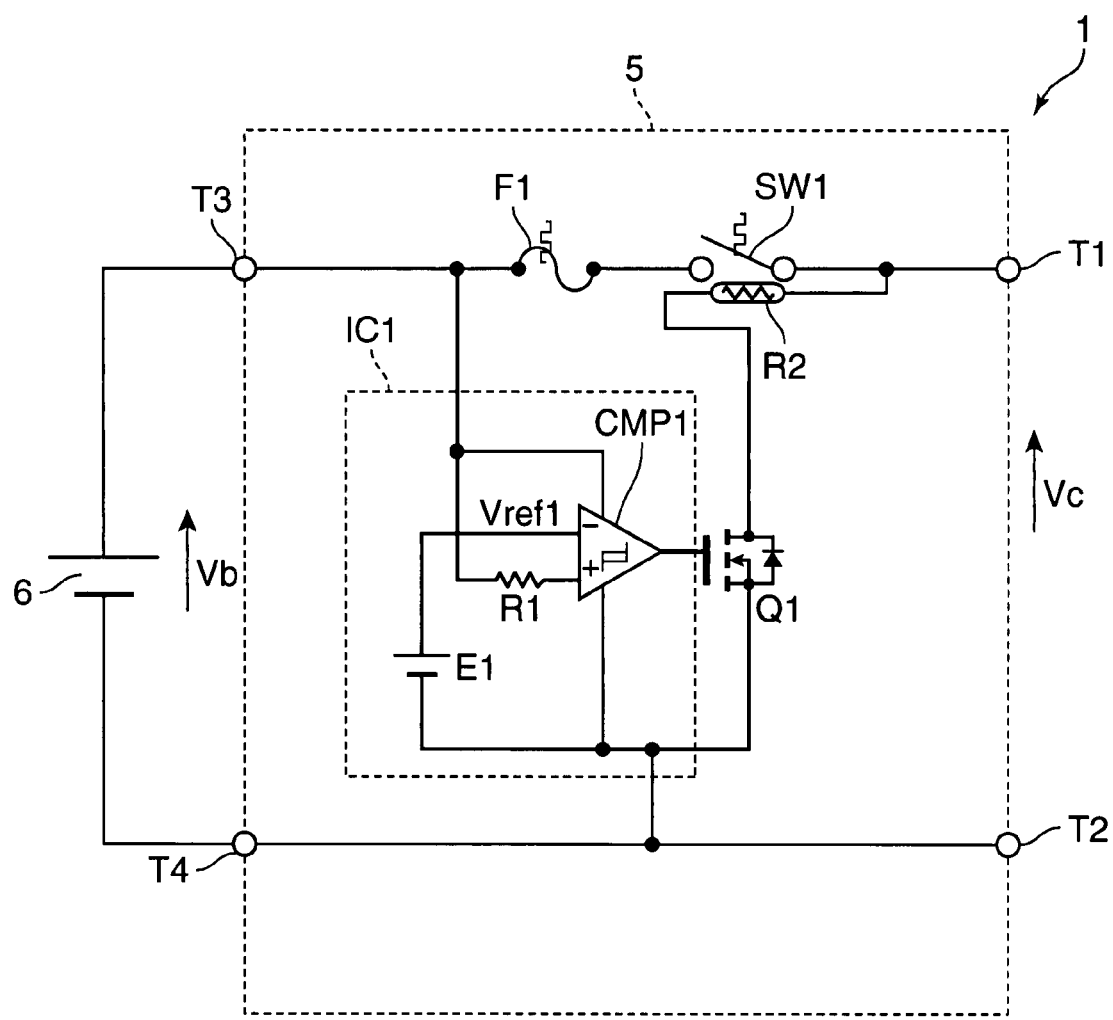
FIG. 2 is a circuit diagram showing one example of the electrical construction of the battery pack shown in FIG. 1.

FIG. 2 is a circuit diagram showing one example of the electrical construction of the battery pack 1 shown in FIG. 1. The battery pack 1 shown in FIG. 1 is provided with a protection circuit 5 and the secondary battery 6. The secondary battery 6 is, for example, a rechargeable secondary battery such as a lithium ion secondary battery, a lithium polymer secondary battery, a nickel-metal-hydride secondary battery or a nickel-cadmium secondary battery. The protection circuit 5 is for protecting the secondary battery 6 from overcharging and excessive discharge current.

The protection circuit 5 is arranged in the external terminal connecting unit 3 and includes connection terminals T1 to T4 (first to fourth connection terminals), a bimetal switch (heat-sensitive switch) SW1, a temperature fuse F1, a comparator CMP1, a reference voltage generator E1, a resistor R1, a transistor Q1 and a heater (first heater) R2. The connection terminals T1 and T2 are for the connection of an unillustrated charging device for charging the secondary battery 6 and/or load devices driven by a discharge current from the secondary battery 6. The load devices are various battery-driven electric devices such as a mobile phone, a digital camera, a video camera, a portable personal computer and an electric tool.

The bimetal switch SW1 is one example of a heat-sensitive switch that is turned off when temperature exceeds a preset specified operating temperature Tsw1 and also turned off by its own heat generation when a charge or discharge current of the secondary battery 6 exceeds a preset specified cut-off current value Isw1. A maximum temperature within such a temperature range as not to degrade characteristics of the secondary battery 6 is, for example, set as the operating temperature Tsw1, and a maximum discharge current value within such a range as not to degrade characteristics of the secondary battery 6 is set as the cut-off current value Isw1. The bimetal switch SW1 is a return-type heat-sensitive switch that is turned on again if temperature decreases after being turned off due to a temperature increase. Instead of the bimetal switch, a switch using a shape-memory alloy in place of a bimetal in the bimetal switch (e.g. those disclosed in Japanese Examined Utility Model Publication No. H07-4770 and Japanese Unexamined Patent Publication No. H11-224579) or a switch using a shape-memory resin can be similarly used as the heat-sensitive switch.

Any shape-memory alloy will do provided that it has a restoring force resulting from the thermoelastic martensitic transformation and reverse transformation of a nickel-titanium alloy, a copper-zinc-aluminum alloy or the like. Shape change temperature ranges within which these alloys change their shapes from the transformed shapes to the restored shape can be changed by changing a heating process in which the composition of the shape-memory alloy is suitably selected.

A polyester, a polyurethane, a styrene butadiene, a transpolyisoprene and like resins in which cross-linked or partially crystallized stationary phase and reversible phase are mixedly present can be used as the shape-memory resin.

A PTC (Positive Temperature Coefficient) thermistor having a positive temperature characteristic, i.e. whose resistance value increases and decreases with temperature is used as the heater R2. Thus, if voltage is applied to the heater R2, the resistance value of the heater R2 increases due to the heat generation of the heater R2 itself, thereby decreasing a current flowing through the heater R2, with the result that the temperature of the heater R2 finally stabilizes at a finally attained temperature Th. The finally attained temperature Th is set at such a temperature that is above the operating temperature Tsw1 of the bimetal switch SW1 and damages neither the secondary battery 6 nor the protection circuit 5. This can suppress the meltdown of the temperature fuse F1 due to an excessive temperature increase of the heater R2 and the damage of the secondary battery 6 and the protection circuit 5 due to the heat generation of the heater R2 itself.

The temperature fuse F1 is arranged in proximity to the secondary battery 6 or attached thereto with an insulating material held therebetween, and is melted by heat if the secondary battery 6 generates heat due to overcharging or excessive discharge. An operating temperature Tfuse1 at which the temperature fuse F1 is set higher than the operating temperature Tsw1 of the bimetal switch SW1. A melting characteristic of the temperature fuse F1 melts is set such that an operating speed of the temperature fuse F1 is slower than that of the bimetal switch SW1. The temperature fuse F1 is a non-return type heat-sensitive switch that does not return to an electrically conductive state once being melted. In this case, the operating temperature Tsw1 of the bimetal switch SW1, the finally attained temperature Th of the heater R2 and the operating temperature Tfuse1 of the temperature fuse F1 have a relationship given by Equation (1) below.

$$Tsw1 < Th < Tfuse1 \quad (1)$$

The operating temperatures and operating speeds of the bimetal switch SW1 and the temperature fuse F1 may be set by, for example, bringing the temperature fuse F1 and the secondary battery 6 into proximity to or into close contact with each other to make thermal resistance between the bimetal switch SW1 and the secondary battery 6 smaller than the one between the temperature fuse F1 and the secondary battery 6 in order to cause the bimetal switch SW1 to operate earlier than the temperature fuse F1 in addition to by setting the characteristics of components of the bimetal switch SW1 and the temperature fuse F1 themselves. For example, the bimetal switch SW1 is so constructed as to easily increase temperature due to its own heat generation by increasing an mount of heat generation of the bimetal switch SW1 through an increase in the contact resistance of the bimetal switch SW1 or resistance in the movable section, by increasing thermal resistance to the surrounding area when the bimetal switch S1 radiates heat, or by reducing thermal capacity through the miniaturization of the bimetal switch SW1.

In order to make the operation of the temperature fuse F1 slower than that of the bimetal switch SW1, the temperature fuse F1 may be so constructed as to be difficult to increase temperature, for example, by reducing thermal resistance to the surrounding area upon the heat radiation of the temperature fuse F1 or increasing the apparent thermal capacity of the temperature fuse F1 without enlarging the temperature fuse F1, for example, by a method of bringing a material having good thermal conductivity into contact with the temperature fuse F1.

Figure 3:
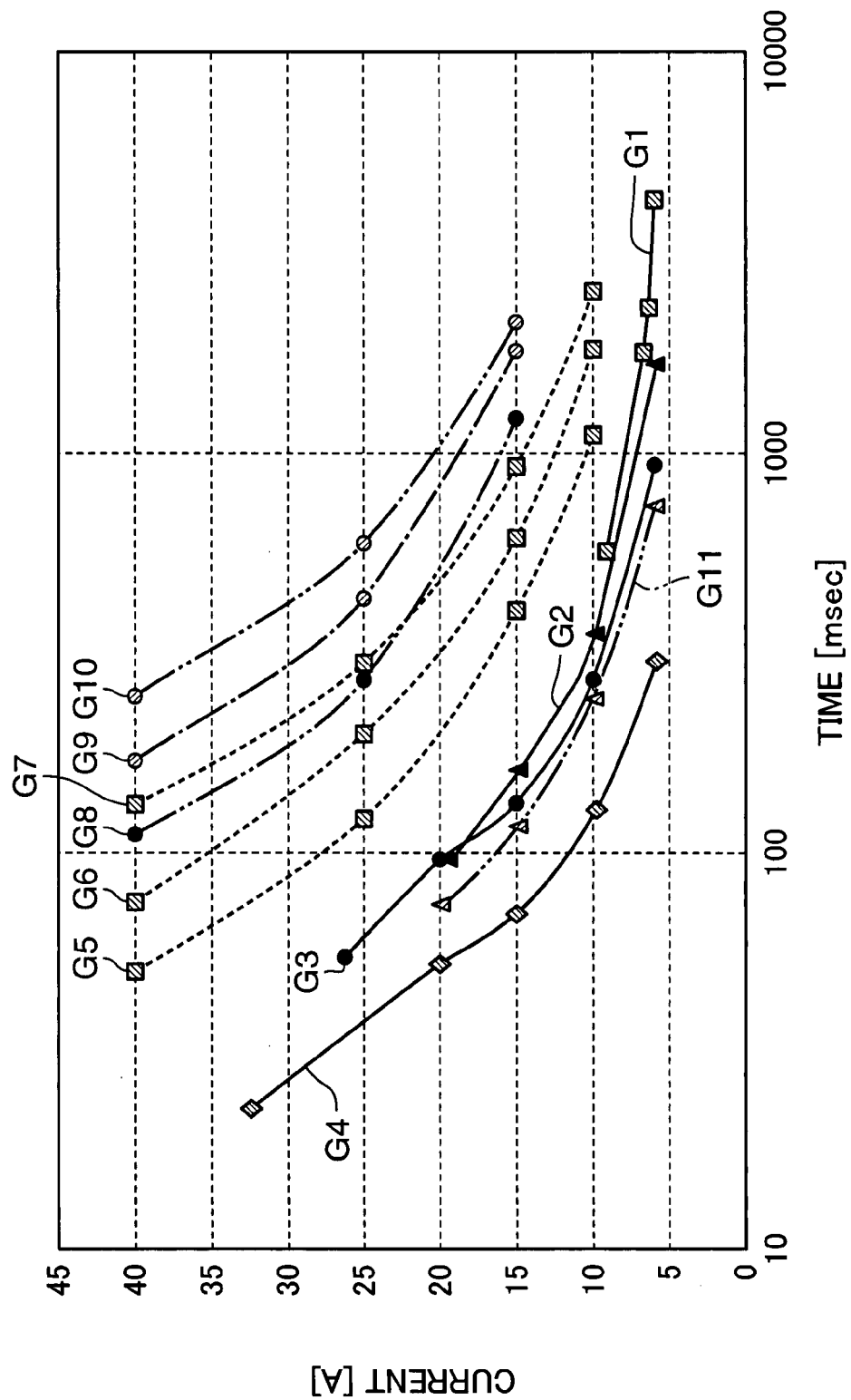
FIG. 3 is a graphical representation showing values of currents flowing through a bimetal switch and a temperature fuse in relation to operating time.

FIG. 3 is a graphical representation showing examples of current values in relation to operating time in the case where the operating temperatures and the operating speeds of the bimetal switch SW1 and the temperature fuse F1 are set to satisfy the above Equation (1). In the graphical representation shown in FIG. 3, vertical axis represents values of currents flowing through the bimetal switch SW1 and the temperature fuse F1 and horizontal axis represents time from the state of the flow of currents to the operations of the bimetal switch SW1 and the temperature fuse F1.

In FIG. 3, graphs G1 to G3 are graphs showing examples of the relationship between the value of the current flowing through the bimetal switch SW1 and the operating time with the battery pack 1 assembled. Graph G1 shows a case where ambient temperature is −30° C., graph G2 shows a case where ambient temperature is 0° C., graph G3 shows a case where ambient temperature is 25° C. and graph G4 shows a case where ambient temperature is 70° C. Further, graphs G5 to G10 are graphs showing examples of the relationship between the value of the current flowing through the temperature fuse F1 and the operating time with the battery pack 1 assembled. Graph G5 shows minimum values when ambient temperature is 65° C., graph G6 shows average values when ambient temperature is 65° C., graph G7 shows maximum values when ambient temperature is 65° C., graph G8 shows minimum values when ambient temperature is 25° C., graph G9 shows average values when ambient temperature is 25° C., and graph G10 shows maximum values when ambient temperature is 25° C. Graph G11 shows a characteristic of the bimetal switch SW1 as a single component. Upon measuring data shown in FIG. 3, EYP2ML098 produced by Panasonic Electronic Devices Co., Ltd. was used as the temperature fuse F1.

Referring back to FIG. 2, the connection terminal T1 is connected to a positive electrode of the secondary battery 6 via the bimetal switch SW1, the temperature fuse F1 and the connection terminal T3, and a negative electrode of the secondary battery 6 is connected to the connection terminal T2 via the connection terminal T4. Further, the connection terminal T3 is connected with a power supply terminal of the comparator CMP1 and the connection terminal T4 is connected to a ground terminal of the comparator CMP1 so that a supply voltage for the operation of the comparator CMP1 is supplied from the secondary battery 6.

The connection terminal T3 is connected to a plus terminal of the comparator CMP1 via the resistor R1; the connection terminal T4 is connected to a negative electrode of the reference voltage generator E1; a positive electrode of the reference voltage generator E1 is connected to a minus terminal of the comparator CMP1; and an output terminal of the comparator CMP1 is connected to a gate terminal of the transistor Q1.

The reference voltage generator E1 is a voltage generating circuit for outputting a reference voltage Vref1 that serves as a judgment standard for detecting the overcharging of the secondary battery 6. Thus, when the reference voltage Vref1 is applied to the minus terminal of the comparator CMP1 and a terminal voltage between the connection terminals T3 and T4, i.e. a voltage Vb of the secondary battery 6 exceeds the reference voltage Vref1, the comparator CMP1 sets a gate voltage of the transistor Q1 to high level, thereby turning the transistor Q1 on to cause the heater to generate heat.

A comparator whose input voltage has hysteresis characteristic is used as the comparator CMP1 in order to reduce the influence of noise when the voltage Vb is in the neighborhood of the reference voltage Vref1. The comparator CMP1, the resistor R1 and the reference voltage generator E1 are, for example, integrated into an integrated circuit IC1. In this case, the integrated circuit IC1 corresponds to one example of a protection controller.

The connection terminal T1 is connected to a drain of the transistor Q1 via the heater R2, and a source of the transistor Q1 is connected to the connection terminal T4.

Figure 4:
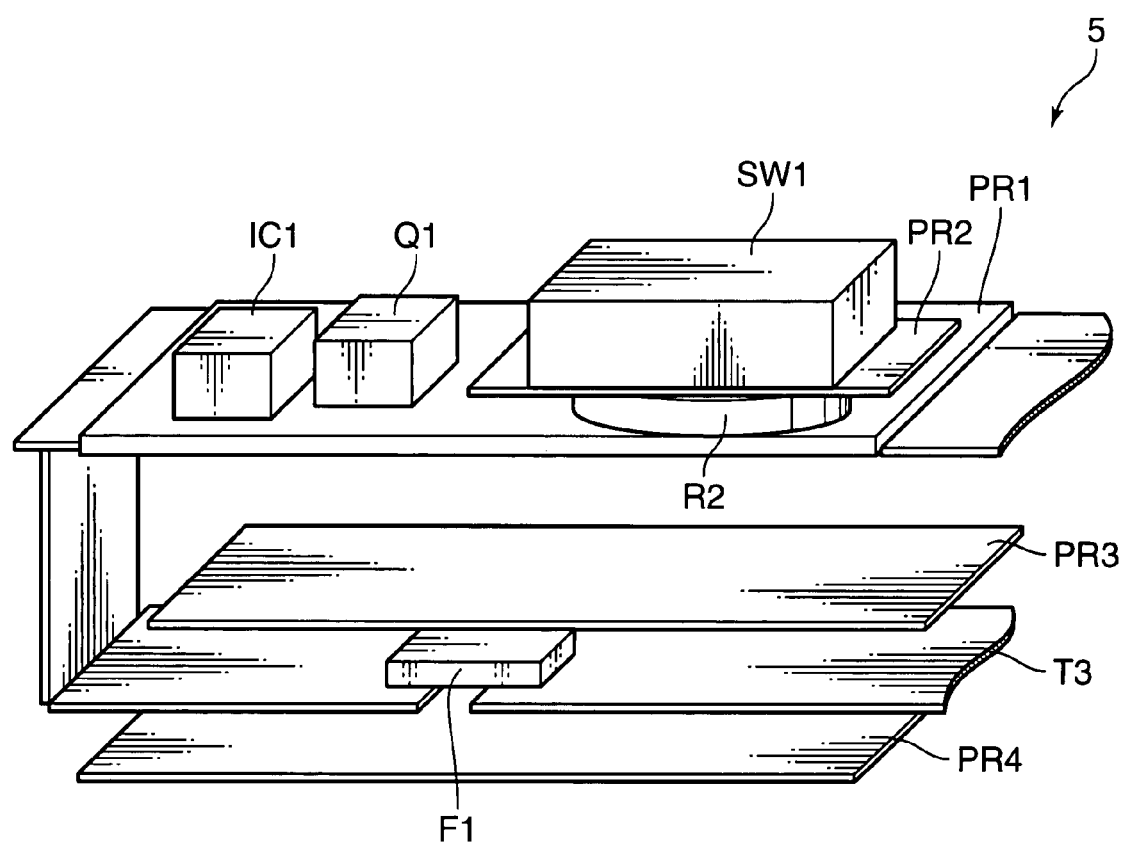

FIG. 4 is an external perspective view showing one example of the mechanical construction of the protection circuit 5 shown in FIG. 2. The protection circuit 5 shown in FIG. 4 is constructed such that the integrated circuit IC1, the transistor Q1, the heater R2 are arranged on the top surface of, for example, a printed wiring board PR1, and the bimetal switch SW1 is arranged above the heater R2 with a printed-wiring board PR2 therebetween. Thus, when the heater R2 generates heat, the bimetal switch SW1 is heated.

Further, the connection terminal T1 is drawn from one end of the printed-wiring board PR1 and is, for example, bent to have part thereof exposed to the outside through the opening of the external terminal connecting unit 3. One plate-shaped lead wire of the temperature fuse F1 is connected to the other end of the printed-wiring board PR1 and bent, so that the temperature fuse F1 and the printed-wiring board PR1 are opposed to each other with an insulating sheet PR3 therebetween. Further, the other plate-shaped lead wire of the temperature fuse F1 is used as the connection terminal T3. Further, an insulating sheet PR4 is provided to sandwich the temperature fuse F1 between the insulating sheets PR3 and PR4.

The protection circuit 5 is arranged inside the external terminal connecting unit 3 shown in FIG. 1 such that the temperature fuse F1 faces the secondary battery 6 accommodated in the container 2. The container 2 and the external terminal connecting unit 3 are assembled with the spacer 4 sandwiched therebetween. The positive electrode 6a is connected with the connection terminal T3 provided in the external terminal connecting unit 3 through an opening formed in the spacer 4, for example, by spot welding. Further, the connection terminal T4 connected to the connection terminal T2 and the opening end of the container 2 connected with the negative electrode of the secondary battery 6 are connected, for example, by spot welding to electrically connect the negative electrode of the secondary battery 6 and the connecting terminal T2. The protection circuit 5 is also arranged such that the temperature fuse F1 faces the secondary battery 6, wherefore the temperature fuse F1 is heated when the secondary battery 6 generates heat.

Next, the operation of the protection circuit 5 constructed as above is described. First, a protecting operation of the protection circuit 5 from overcharging is described. First, when an unillustrated charging device is connected with the connection terminals T1, T2 to apply a voltage Vc between the connection terminals T1 and T2 with the bimetal switch SW1 turned on, the secondary battery 6 is charged with the voltage Vb via the bimetal switch SW1, the temperature fuse F1 and the connection terminal T3.

The voltage Vb is normally up to, for example, 4.2 V. The reference voltage generator E1 is set to output, for example, 4.3 V as the reference voltage Vref1 to the comparator CMP1.

If the charging voltage Vb exceeds 4.3 V, for example, because the unillustrated charging device breaks down or the output voltage accuracy thereof is low, the transistor Q1 is turned on by the comparator CMP1 to cause a current to flow into the heater R2 to heat the bimetal switch SW1. When the temperature of the bimetal switch SW1 reaches the operating temperature Tsw1, the bimetal switch SW1 is turned off to cut off the charge current, thereby protecting the secondary battery 6 from overcharging.

Subsequently, if the voltage at the connection terminal T3 falls to or below the reference voltage Vref1 by the bimetal switch SW1 being turned off to cut off the charge current, the transistor Q1 is turned off by the comparator CMP1 to zero the current flowing into the heater R2. When the temperature of the bimetal switch SW1 falls below a return temperature by natural cooling, the bimetal switch SW1 is turned on to return from an overcharging protecting state to a normal state.

Figure 52:
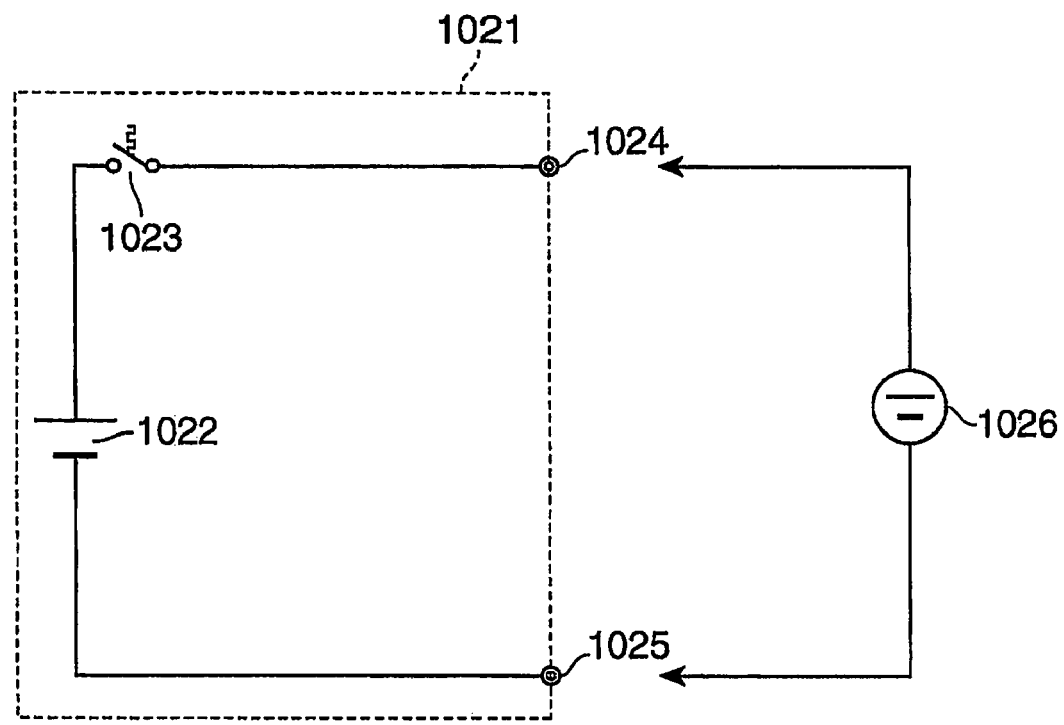
FIG. 52 is a circuit diagram showing the construction of a battery pack according to a related art.
Figure 53:
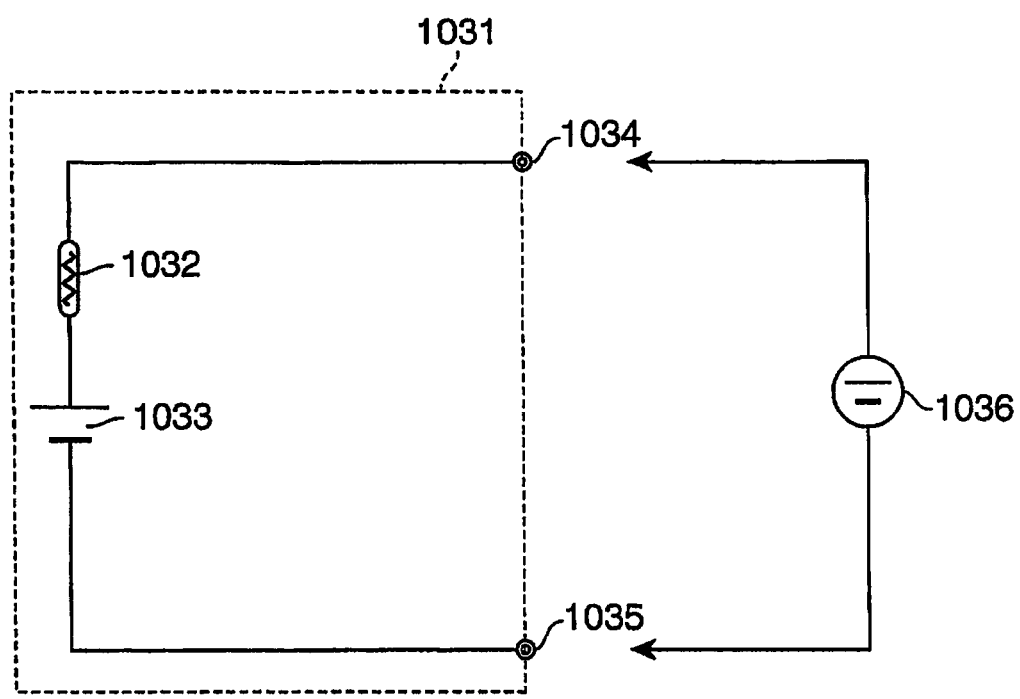
FIG. 53 is a circuit diagram showing the construction of a battery pack according to a related art.

Since overcharging is detected by the comparator CMP1 and the bimetal switch SW1 is heated by the heater R2 to be turned off in this case, accuracy in detecting overcharging can be improved as compared, for example, to the case where protection from overcharging is carried out only by the temperature switch connected in series with the secondary battery as shown in FIGS. 52 and 53. Therefore, likelihood of overcharging the secondary battery 6 without performing the overcharging protection, degrading the characteristics of the secondary battery 6 or causing the expansion or deformation of the secondary battery 6 can be reduced.

Next, a protecting operation of the protection circuit 5 in the case where discharge current from the secondary battery 6 becomes excessive is described. First, when the connection terminals T1, T2 are short-circuited or a resistance value between the connection terminals T1 and T2 becomes low with the bimetal switch SW1 turned on, for example, because a metal piece touches the connection terminals T1, T2 or an unillustrated mobile phone or like load device connected with the connection terminals T1, T2 breaks down, current discharged from the secondary battery 6 via the temperature fuse F1 and the bimetal switch SW1 increases and the bimetal switch SW1 is heated by the contact resistance thereof.

When the temperature of the bimetal switch SW1 reaches the operating temperature Tsw1, the bimetal switch SW1 is turned off to cut off the discharge current of the secondary battery 6, thereby protecting the secondary battery 6 from excessive discharge current.

In this case, the operating conditions of the bimetal switch SW1 are set such that the bimetal switch SW1 is turned off earlier than the temperature fuse F1 and the secondary battery 6 can be protected from overcharging and excessive discharge current by the bimetal switch SW1, which is a return-type heat-sensitive switch, without melting the temperature fuse F1, which is a nonreturn-type heat-sensitive switch. Thus, the battery pack 1 can be repeatedly used without replacing the temperature fuse F1 after removing the cause of overcharging and excessive discharge current, for example, by detaching the battery pack 1 from the charging device or the load device, wherefore convenience can be improved.

Even if the bimetal switch SW1 cannot be turned off at the time of overcharging, for example, because the contact of the bimetal switch SW1 is melted to cause a short-circuit problem or any one of the integrated circuit IC1, the transistor Q1 and the heater R2 breaks down, the temperature fuse F1 melts upon the heat generation of the secondary battery 6 by overcharging or excessive discharge current, whereby the secondary battery 6 can be protected. Therefore, the reliability of the protection circuit 5 can be improved.

Figure 51:
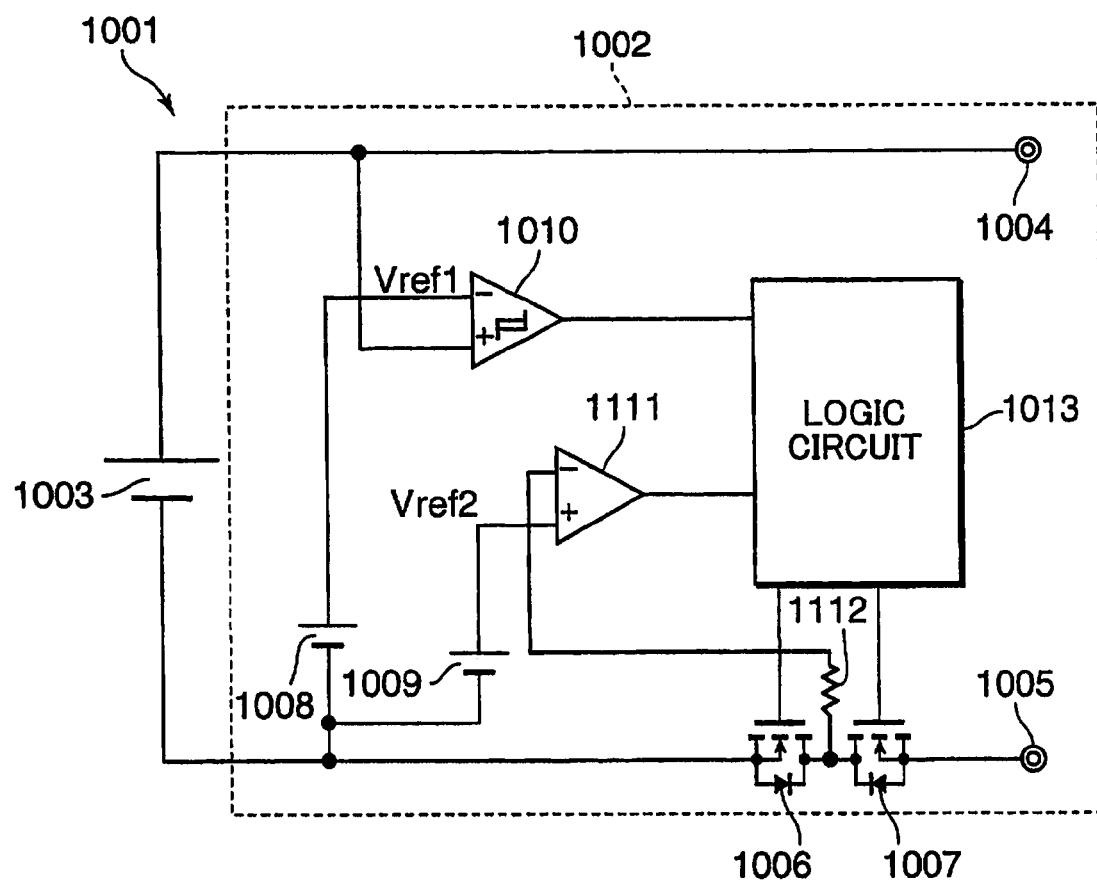
FIG. 51 is a circuit diagram showing the construction of a battery pack according to a related art.

Further, since the secondary battery 6 can be protected from overcharging and excessive discharge current using the bimetal switch SW1 that is a heat-sensitive switch, the FET 1006 for cutting off the discharge current, the FET 1007 for cutting off the charge current, the reference voltage generator 1009 for detecting excessive discharge current, the comparator 1111, the resistor 1112 and the logic circuit 1113 for on-off controlling the two FETs 1006, 1007 are not necessary unlike the protection circuit 1002 according to background art shown in FIG. 51, wherefore the protection circuit 5 can be simplified and can be easily miniaturized.

Second Embodiment

Next, a battery pack according to a second embodiment of the present invention is described. The external appearance of a battery pack 1a according to the second embodiment of the present invention is similar to that of the battery pack 1 shown in FIG. 1. Further, the electrical construction of a protection circuit 5a provided in the battery pack 1a according to the second embodiment of the present invention is similar to the protection circuit 5 shown in FIG. 2, but the mechanical construction thereof differs from that of the protection circuit 5 shown in FIG. 4.

Figure 5A:
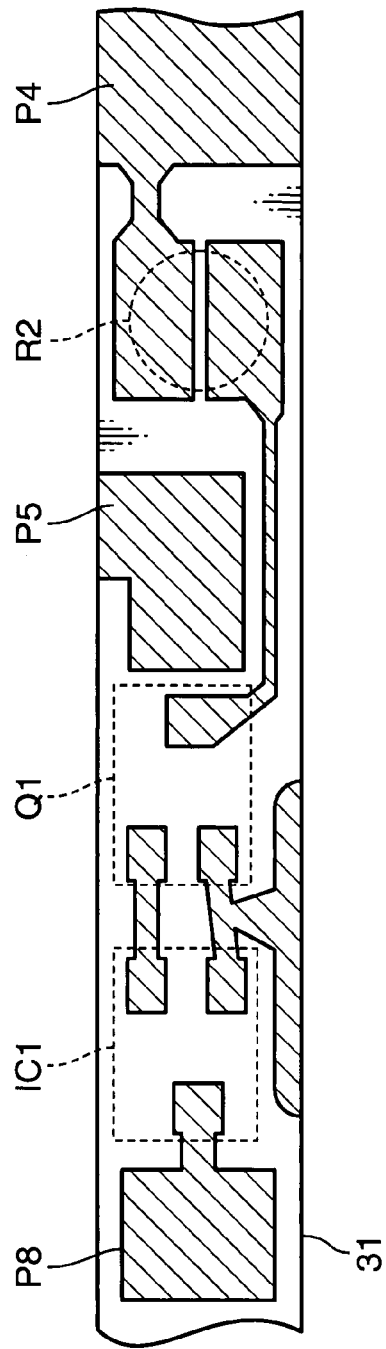
Figure 5B:
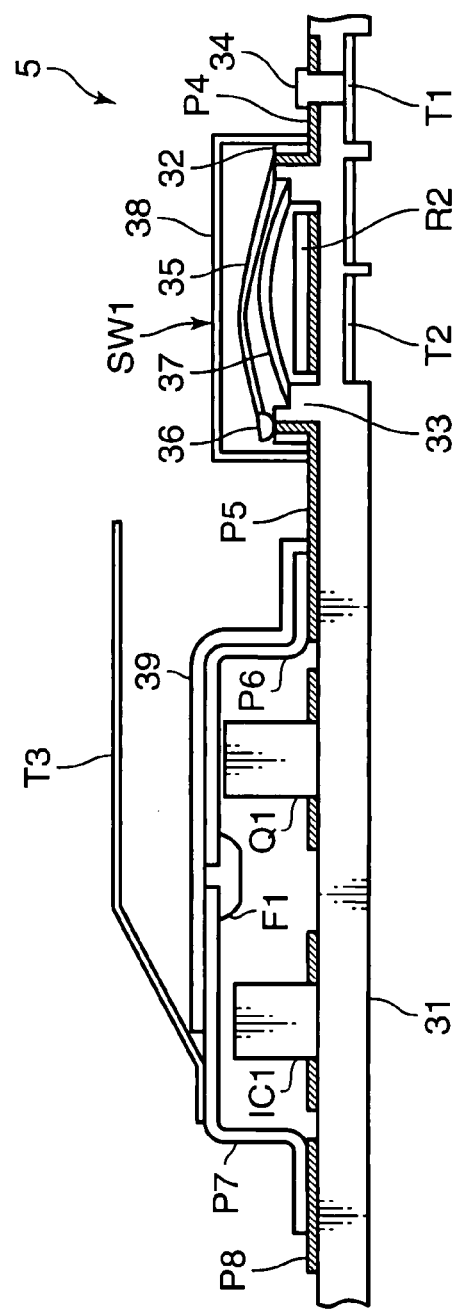
Figure 6A:
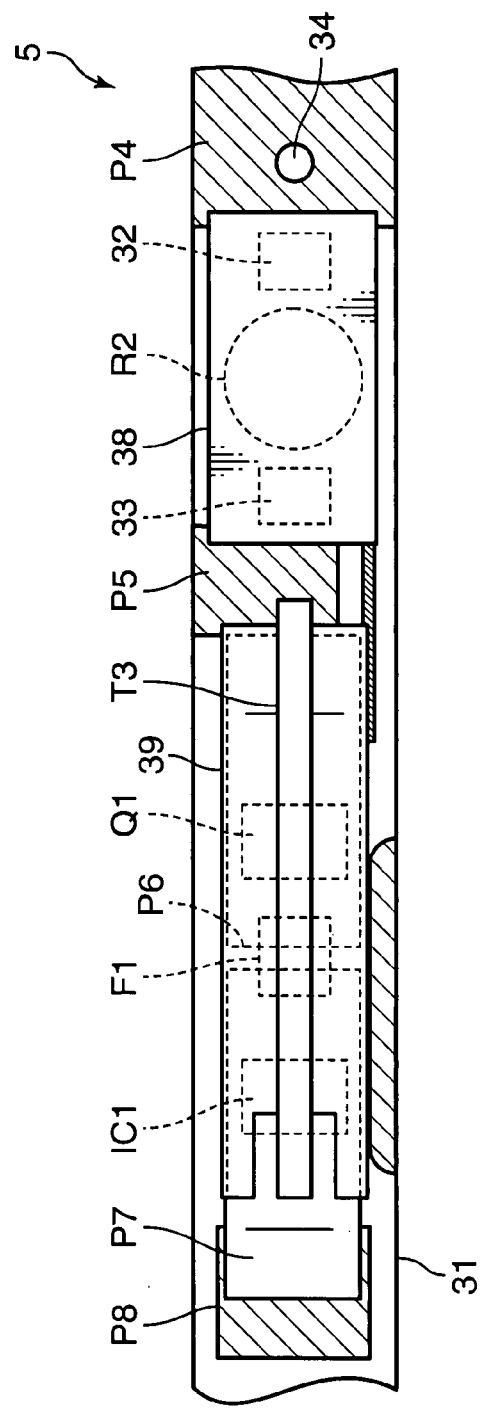
FIG. 6A is a top view showing one example of the mechanical construction of the protection circuit and FIG. 6B is a section showing one example of the mechanical construction of the protection circuit.
Figure 6B:
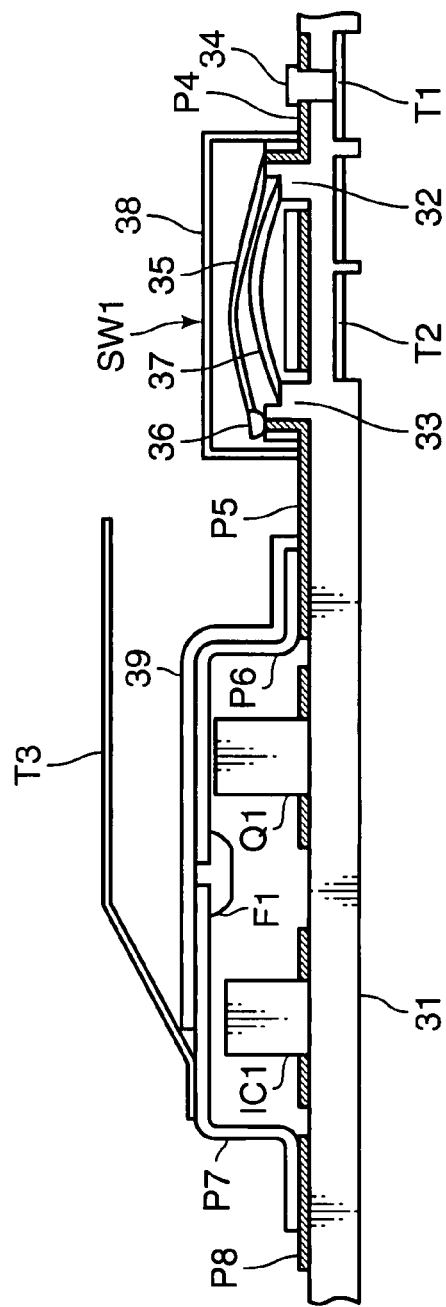

FIG. 5 are schematic diagrams showing the mechanical construction of the protection circuit 5a according to the second embodiment of the invention, wherein FIG. 5A is a diagram showing wiring patterns used to mount components of the protection circuit 5 and FIG. 5B is a section showing one example of the mechanical construction of the protection circuit 5. FIG. 6A is a top view of the protection circuit 5 shown in FIG. 5B and FIG. 6B shows the same section as FIG. 5B for comparison.

The wiring patterns shown in FIG. 5A are printed on an inner surface of the casing 31 of the external terminal connecting unit 3, i.e. on a surface thereof facing the secondary battery 6 accommodated in the container 2 when the external terminal connecting unit 3 and the container 2 are assembled, using an electroconductive wiring material in paste form made, for example, of metal fine particles, and the integrated circuit IC1, the transistor Q1 and the heater R2 are directly secured to the inner surface of the casing 31 where the wiring patterns are printed without using the printed-wiring board PR1 as in the protection circuit 5 shown in FIG. 5.

In this way, since the printed-wiring board PR1 can be omitted from the protection circuit 5 shown in FIG. 4, the protection circuit 5 can be easily miniaturized by the thickness of the printed-wiring board PR1.

Further, as shown in FIG. 5B, projection-shaped supporting members 32, 33 are formed on the inner surface of the casing 31 of the external terminal connecting unit 3, for example, by being integrally molded with the casing 31. A wiring pattern P4 drawn from the top of the supporting member 32 is connected to the connection terminal T1 provided on the outer surface of the casing 31, for example, via a cylindrical metal member 34 penetrating through the casing 31. Further, at the top of the supporting member 32, one end of a movable section 35 constituting the bimetal switch SW1 is connected with and fixed to the wiring pattern P4, for example, by spot welding. A contact 36 is provided at the other end of the movable section 35 and in contact with a wiring pattern P5 formed at the top of the supporting member 33.

Figure 7:
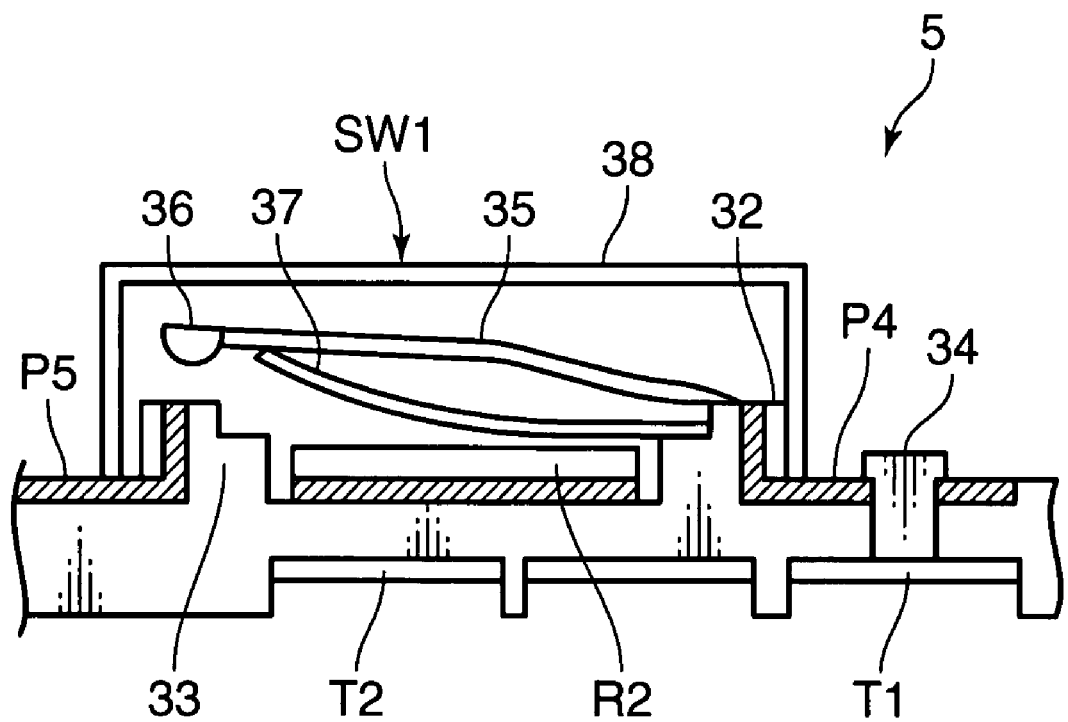
FIG. 7 is a schematic diagram showing the operation of a movable section.

Further, an arched bimetal 37 spans between the supporting members 32, 33 below the movable section 35. Upon reaching the operating temperature Tsw1, the bimetal 37 warps in an opposite direction as shown in FIG. 7 to move the movable section 35 upward, thereby separating the contact 36 from the wiring pattern P5. The bimetal switch SW1 is constructed by the supporting members 32, 33, the movable section 35, the bimetal 37 and the wiring patterns P4, P5. A switch cover 38 for dust-proof and insulation purpose is so secured as to cover the thus constructed bimetal switch SW1. A substantially disk-shaped heater R2 is disposed below the bimetal 37, so that the bimetal 37 is heated when the heater R2 generates heat.

In this way, since the bimetal switch SW1 can be constructed using the supporting members 32, 33 integrally molded with the casing 31, cost can be more easily reduced than in the case of using the bimetal switch SW1 constructed as an individual component. Further, since the bottom part of the casing in the case of constructing the bimetal switch SW1 as an individual component is not necessary, the bimetal switch SW1 can be miniaturized.

Further, conductor leads P6, P7 constructing connection terminals of the temperature fuse F1 are, for example, in the form of wide plates, and the temperature fuse F1 is so mounted as to cover the integrated circuit IC1 and the transistor Q1 by the temperature fuse F1 and the conductor leads P6, P7 by bending the conductor leads P6, P7. Wiring patterns P5, P8 provided at the opposite sides of the integrated circuit IC1 and the transistor Q1 are connected to each other via the conductor lead P6, the temperature fuse F1 and the conductor lead P7 while bypassing the integrated circuit IC1 and the transistor Q1.

The top surfaces of the temperature fuse F1 and the conductor leads P6, P7 and the opposite side surfaces of the conductor leads P6, P7 are covered, for example, by a sheet member 39 for insulation and dust-proof purpose.

Thus, the temperature fuse F1, the conductor leads P6, P7 and the sheet member 39 function as a cover for covering the integrated circuit IC1 and the transistor Q1, and a mounting area for the temperature fuse F1 on the outer surface of the casing 31 can be reduced and the protection circuit 5 can be miniaturized as compared to the case where a cover is provided in addition to the temperature fuse F1 and the conductor leads P6, P7.

Further, since the temperature fuse F1 and the conductor leads P6, P7 and the sheet member 39 are used as a jumper wiring for causing a current to flow between the wiring patterns P5 and P8 while bypassing the integrated circuit IC1 and the transistor Q1, an area on the outer surface of the casing 31 taken up by the wiring patterns can be reduced and the protection circuit 5 can be easily miniaturized.

The connection terminal T3 is mounted on the conductor lead P7, for example, by spot welding, whereby no area on the outer surface of the casing 31 is taken up to mount the connection terminal T3. Therefore, the external terminal connecting unit 3 can be easily miniaturized.

If the temperature fuse F1 and the conductor leads P6, P7 are mounted after the external terminal connecting unit 3 is heated and the electroconductive wiring material is cured, with components excluding the temperature fuse F1 and the conductor leads P6, P7 mounted on the wiring patterns printed using the electroconductive wiring material, there is no likelihood of melting or degrading the temperature fuse F1 at the time of production even if the curing temperature of the electroconductive wiring material is higher than the operating temperature Tfuse1 of the temperature fuse F1.

Figure 8:
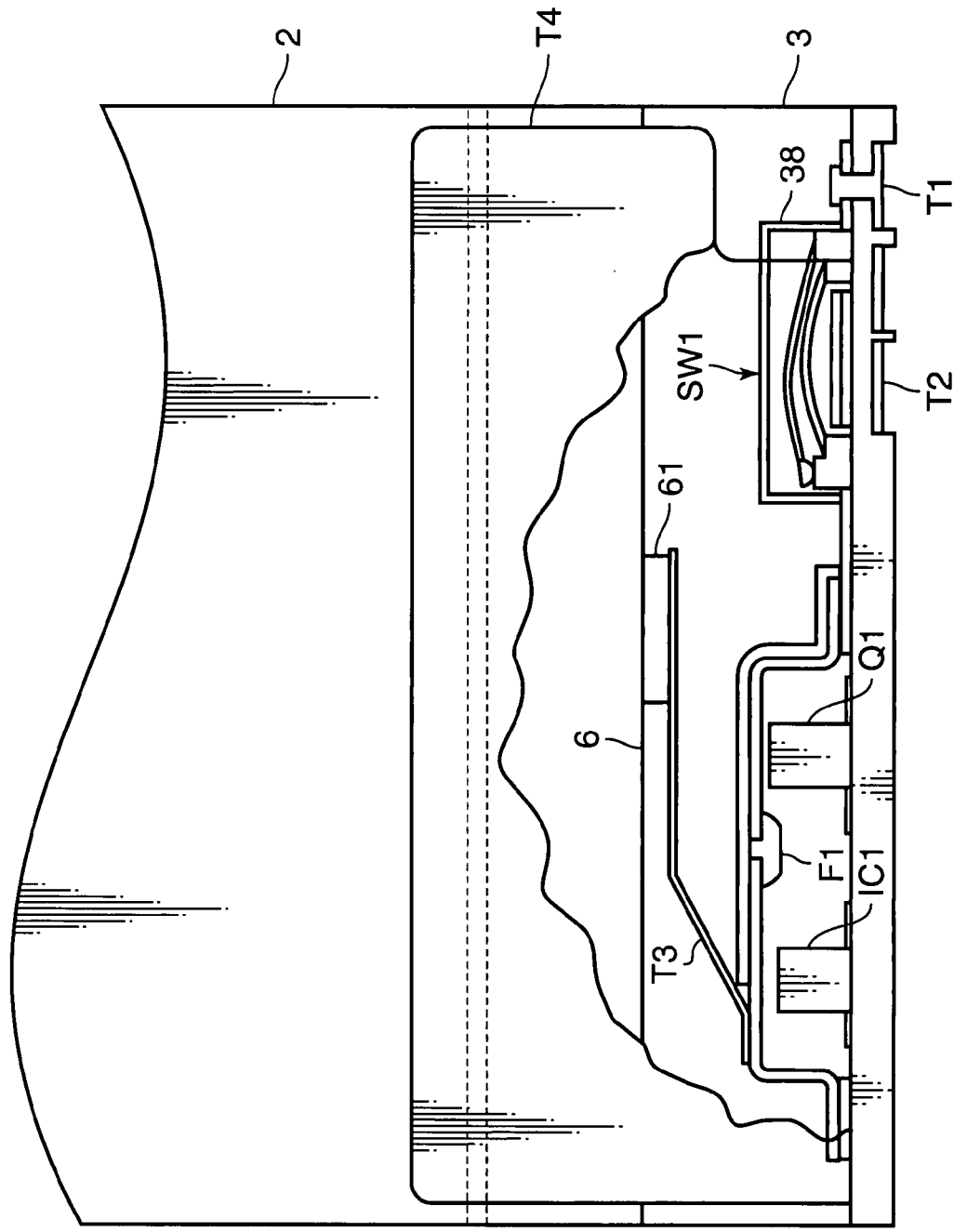
FIG. 8 is a schematic diagram showing a state where a container and an external connection terminal unit are assembled.

FIG. 8 is a schematic diagram showing a state where the container 2 and the external terminal connecting unit 3 are assembled. As shown in FIG. 8, the bimetal switch SW1 and the temperature fuse F1 are arranged at positions facing and in proximity to the secondary battery 6 accommodated in the container 2 with the container 2 and the external terminal connecting unit 3 assembled. Thus, thermal coupling between the bimetal switch SW1, the temperature fuse F1 and the secondary battery 6 can be strengthened and the charge current and the discharge current of the secondary battery 6 can be cut off by the bimetal switch SW1 and the temperature fuse F1 if the secondary battery 6 excessively generates heat.

Thus, even if the heater R2 cannot be caused to generate heat during the overcharging of the secondary battery 6, for example, because of the breakdown of the integrated circuit IC1, the transistor Q1, the heater R2 or the like, the bimetal switch SW1 and the temperature fuse F1 are heated when the secondary battery 6 generates heat due to overcharging. When the temperature of the bimetal switch SW1 reaches the operating temperature Tsw1, the bimetal switch SW1 is turned off to cut off the charge current. Therefore, the secondary battery 6 can be protected from overcharging even if the integrated circuit IC1, the transistor Q1, the heater R2 or the like breaks down.

In the case of a short-circuit problem caused, for example, by the melting of the contact of the bimetal switch SW1, the bimetal switch SW1 cannot be turned off even if the temperature of the bimetal switch SW1 reaches the operating temperature Tsw1. If the temperature fuse F1 is heated by the heat generation of the secondary battery 6 and the temperature of the temperature fuse F1 reaches the operating temperature Tfuse1, the temperature fuse F1 melts to cut off the charge current. Therefore, the secondary battery 6 can be protected from overcharging even if the bimetal switch SW1 breaks down.

Further, since the temperature fuse F1 is arranged also in proximity to both the integrated circuit IC1 and the transistor Q1, the charge current and the discharge current of the secondary battery 6 can be easily cut off by the temperature fuse F1 when the integrated circuit IC1 or the transistor Q1 excessively generates heat.

Although the wiring patterns constructing the protection circuit 5*a* are shown to be printed on the surface of the external terminal connecting unit 3 facing the secondary battery 6 accommodated in the container 2, they may be formed on a printed-wiring board instead of being printed on the surface of the external terminal connecting unit 3, and the integrated circuit IC1, the transistor Q1 and the bimetal switch SW1 constructing the protection circuit 5*a* may be arranged on this printed-wiring board. In this case, the supporting members 32, 33 may be passed through through holes formed in the printed-wiring board to support the movable section 35 and the bimetal 37 on the printed-wiring board.

The supporting members 32, 33 are not limited to those integrally molded with the casing 31 and may be formed, for example, by embedding cylindrical metal members in the casing 31. Further, the conductor leads P6, P7 may be short-circuited with each other without providing the temperature fuse F1. Furthermore, the switch cover 38 and the sheet member 39 may be integrally molded into one part.

Although the protection circuit 5*a* is shown to be incorporated into the battery pack 1*a*, it is not limited to incorporation into the battery pack 1*a* and may be incorporated, for example, into a load device and used as a protection circuit for a secondary battery built in the load device. The connection terminals T1, T2, T3 and T4 may be, for example, wiring patterns.

A secondary battery such as a lithium ion secondary battery, a lithium polymer secondary battery, a nickel-metal-hydride secondary battery or a nickel-cadmium secondary battery may enter an excessive discharge state to have the characteristics thereof such as cycle life degraded if discharge further continues after discharge progresses and the output voltage falls to or below a specified discharge final voltage. Accordingly, in a load device such as a mobile phone connected with the connection terminals T1, T2, it is desirable to detect the output voltage between the connection terminals T1 and T2 and to cut off the output current from the connection terminals T1, T2 if the output voltage between the connection terminals T1 and T2 falls to or below a specified discharge final voltage. This can suppress an occurrence of characteristic degradation caused by the excessive discharge of the secondary battery 6.

Third Embodiment

Figure 9:
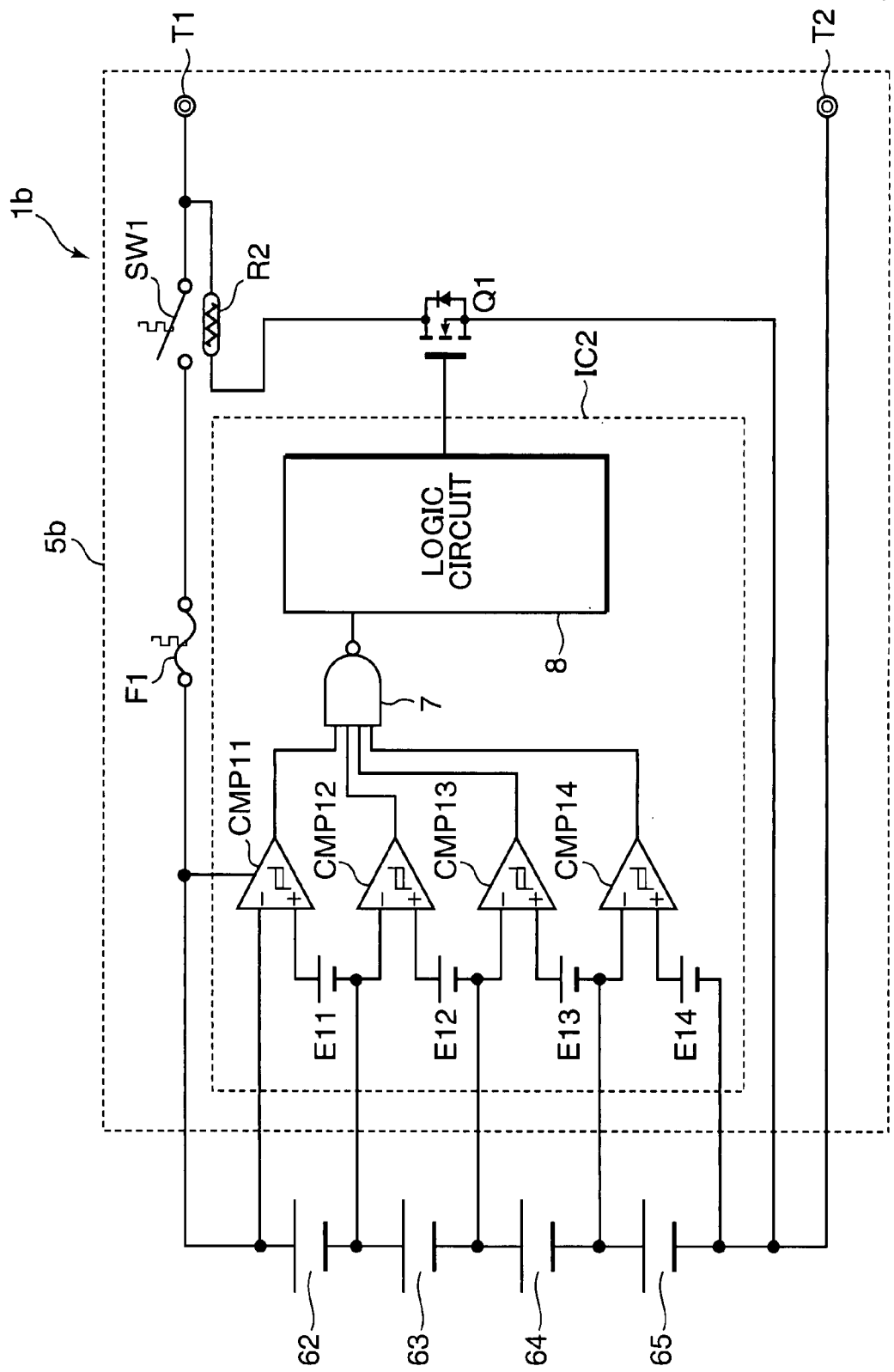
FIG. 9 is a circuit diagram showing one example of the construction of a protection circuit according to a third embodiment of the invention.

FIG. 9 is a circuit diagram showing one example of the electrical construction of a battery pack 1*b* according to a third embodiment of the present invention. The battery pack 1*b* shown in FIG. 9 is used for an electric device, in which a large load current, e.g. 100 A (1 kW) flows, such as an electric tool, an electric automobile or a robot and for a super-rapid charge standard cell to be charged within a short time of about several minutes. The battery pack 1*b* shown in FIG. 9 differs from the battery pack 1 shown in FIG. 2 in that secondary batteries 62 to 65 connected in series are provided in place of the secondary battery 6 and an integrated circuit IC2 is provided in place the integrated circuit IC1. In this case, the integrated circuit IC2 corresponds to one example of the protection controller and a wiring pattern connecting the integrated circuit IC2, the temperature fuse F1 and the secondary battery 62 corresponds to one example of the first connection terminal.

The integrated circuit IC2 includes reference voltage generators E11 to E14 similar to the reference voltage generator E1, comparators CMP11 to CMP14 similar to the CMP1, a NAND gate 7 and a logic circuit 8. A positive electrode of the secondary battery 62 is connected to a minus terminal of the comparator CMP 11; a plus terminal of the comparator CMP11 is connected to a positive electrode of the reference voltage generator E11; a negative electrode of the reference voltage generator E11 is connected to a negative electrode of the secondary battery 62; and an output terminal of the comparator CMP11 is connected to an input terminal of the NAND gate 7.

Further, a positive electrode of the secondary battery 63 is connected to a minus terminal of the comparator CMP12; a plus terminal of the comparator CMP12 is connected to a positive electrode of the reference voltage generator E12; a negative electrode of the reference voltage generator E12 is connected to a negative electrode of the secondary battery 63; and an output terminal of the comparator CMP12 is connected to an input terminal of the NAND gate 7.

Further, a positive electrode of the secondary battery 64 is connected to a minus terminal of the comparator CMP13; a plus terminal of the comparator CMP13 is connected to a positive electrode of the reference voltage generator E13; a negative electrode of the reference voltage generator E13 is connected to a negative electrode of the secondary battery 64; and an output terminal of the comparator CMP13 is connected to an input terminal of the NAND gate 7.

Further, a positive electrode of the secondary battery 65 is connected to a minus terminal of the comparator CMP14; a plus terminal of the comparator CMP14 is connected to a positive electrode of the reference voltage generator E14; a negative electrode of the reference voltage generator E14 is connected to a negative electrode of the secondary battery 65; and an output terminal of the comparator CMP14 is connected to an input terminal of the NAND gate 7. An output terminal of the NAND gate 7 is connected to a signal input terminal of the logic circuit 8, and a signal output terminal of the logic circuit 8 is connected to a gate of the transistor Q1.

Next, the operation of the battery pack 1b constructed as above is described. First, if a voltage at both ends of the secondary battery 62 exceeds an output voltage of the reference voltage generator E11 due to overcharging, an output signal of the comparator CMP11 becomes low level and a high-level output signal of the NAND gate 7 is outputted to the logic circuit 8. Then, the transistor Q1 is turned on by the logic circuit 8 and a current flows into the heater R2 to cause heat generation, whereby the bimetal switch SW1 is turned off to protect the secondary battery 62 from overcharging.

Similarly, when the secondary battery 63 to 65 is excessively charged, overcharging is detected by the comparator CMP12 to CMP14, the transistor Q1 is turned on by the NAND gate 7 and the logic circuit 8 and a current flows into the heater R2 to cause heat generation, whereby the bimetal switch SW1 is turned off to protect the secondary battery 63 to 65 from overcharging.

The other construction and operation are not described since they are similar to those of the battery pack 1 shown in FIG. 2.

Figure 54:
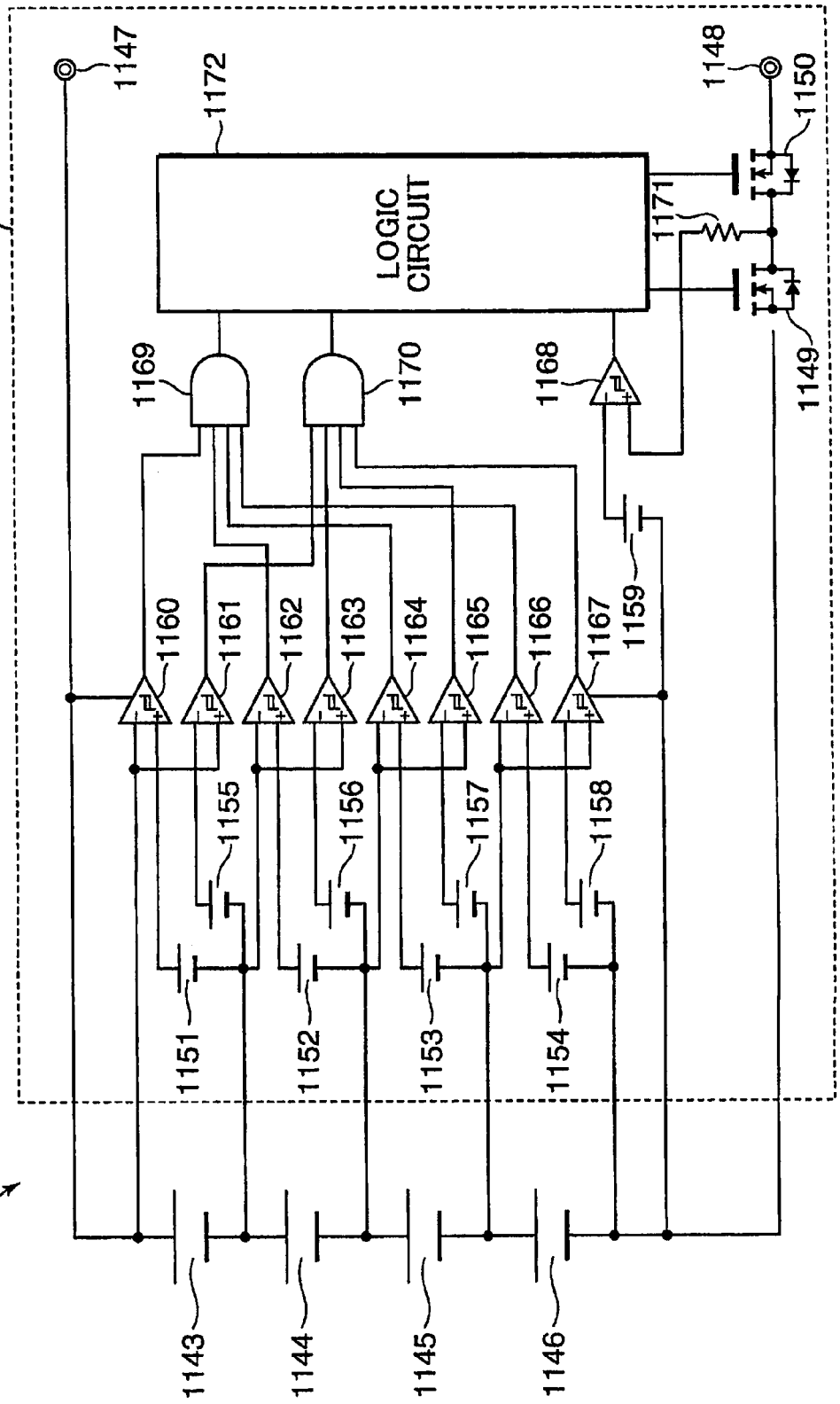
FIG. 54 is a circuit diagram showing the construction of a battery pack according to a related art.

In this case, in a protection circuit 5b shown in FIG. 9, the bimetal switch SW1 is used in place of the FETs 1149, 1150 in the protection circuit 1142 shown in FIG. 54. Since the bimetal switch SW1 can easily control large currents, the FETs 1149, 1150 can be easily replaced with the bimetal switch SW1. Further, the transistor Q1 needs not flow a load current, and a small-size switching element capable of flowing a current to cause the heat generation of the heater R2 can be used as such.

Thus, in the protection circuit 5b shown in FIG. 9, the secondary batteries 62 to 65 can be protected from overcharging and excessive discharge current without using the FETs 1149, 1150 having large current rating, thus large outer shapes in the protection circuit 1142 shown in FIG. 54, wherefore the circuitry of the protection circuit 5b can be simplified and the protection circuit 5b can be easily miniaturized. Further, since the FETs 1149, 1150 having a high withstand voltage and a small on-resistance are not used, cost can be easily reduced at the same time power loss in the protection circuit 5b can be reduced.

In the battery pack 1 shown in FIG. 1, the secondary battery 6 is accommodated in the bottomed container 2 made of steel sheet having nickel plating applied to the outer surfaces thereof, the opening of the container 2 and a sealing plate are sealed by caulking, the projection-shaped positive electrode terminal 6a projects through the opening end of the container 2, and the negative electrode of the secondary battery 6 is connected with the container 2 inside the container 2. If a secondary battery is accommodated in a bottomed container 2 made of aluminum alloy, the opening of the container 2 and a sealing plate are laser-sealed, a projection-shaped negative electrode terminal provided on the sealing plate projects through the opening end of the container 2, and a positive electrode of the secondary battery 6 is connected with the sealing plate while being insulated from the negative electrode terminal, protection of the secondary battery can be easily realized by reversing the connection with the protection circuit.

Fourth Embodiment

Next, a battery pack according to a fourth embodiment of the present invention is described. The external appearance of a battery pack 1c according to the fourth embodiment of the present invention is similar to that of the battery pack 1 shown in FIG. 1.

Figure 10:
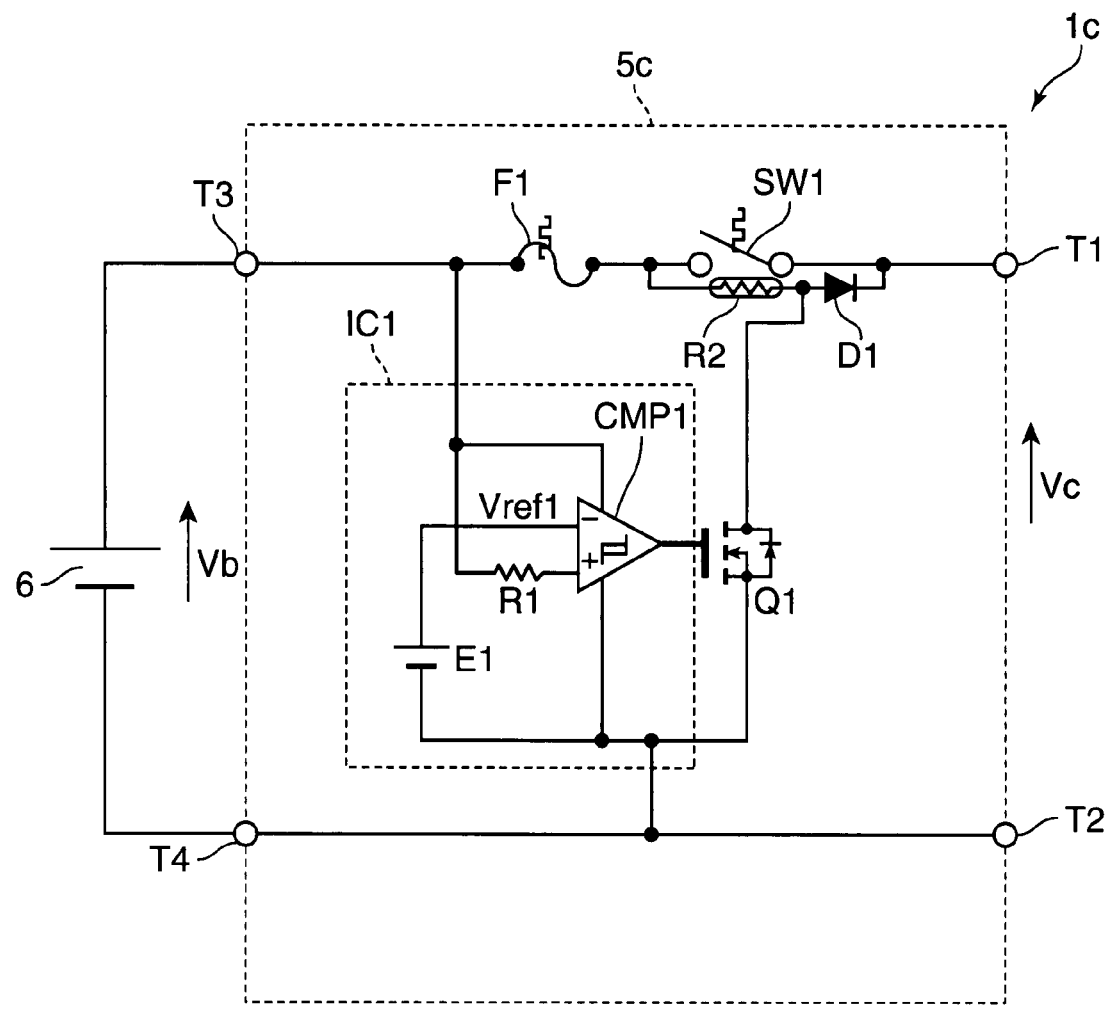
FIG. 10 is a circuit diagram showing one example of the electrical construction of a battery pack according to a fourth embodiment of the invention, FIG. 11 are schematic diagrams showing the mechanical construction of the protection circuit shown in FIG. 10, FIG. 12 are schematic diagrams showing the mechanical construction of the protection circuit shown in FIG. 10.

FIG. 10 is a circuit diagram showing one example of the electrical construction of the battery pack 1c according to the fourth embodiment of the present invention. The battery pack 1c shown in FIG. 1 is provided with a protection circuit 5c and a secondary battery 6. The secondary battery 6 is a rechargeable secondary battery such as a lithium ion secondary battery, a lithium polymer secondary battery, a nickel-metal-hydride secondary battery or a nickel-cadmium secondary battery. The protection circuit 5c is for protecting the secondary battery 6 from overcharging and excessive discharge current.

The protection circuit 5c is arranged inside an external connection terminal unit 3 and includes a connection terminal T1 (first connection terminal), a connection terminal T2 (second connection terminal), a connection terminal T3 (third connection terminal), a connection terminal T4 (fourth connection terminal), a bimetal switch SW1, a temperature fuse F1, a comparator CMP1 (detector), a reference voltage generator E1, a resistor R1, a transistor Q1 (switching device), a heater R2 (first heater), and a diode D1 (first rectifying element). The connection terminals T3, T4 are respectively connected with both electrodes of the secondary battery 6.

The connection terminals T1 and T2 are for the connection of an unillustrated charging device for charging the secondary battery 6 and/or load devices driven by a discharge current from the secondary battery 6. The load devices are various battery-driven electric devices such as a mobile phone, a digital camera, a video camera, a portable personal computer and an electric tool.

The temperature fuse F1 and the bimetal switch SW1 are not described here since they have the same constructions as those of the first embodiment.

The connection terminal T1 is connected to a positive electrode of the secondary battery 6 via the bimetal switch SW1, the temperature fuse F1 and the connection terminal T3, and a negative electrode of the secondary battery 6 is connected to the connection terminal T2 via the connection terminal T4. The connection terminal T3 is connected to a power supply terminal of the comparator CMP1 and the connection terminal T4 is connected to a ground terminal of the comparator CMP1 so that a supply voltage for the operation of the comparator CMP1 is supplied from the secondary battery 6.

Further, a series circuit of the heater R2 and the diode D1 is connected in parallel with the bimetal switch SW1. The diode D1 is provided between the heater R2 and the connection terminal T1 and the forward direction thereof is set to such a direction as to flow the discharge current of the secondary battery 6, i.e. a direction from the heater R2 to the connection terminal T1. A transistor Q1 is also provided to open and close the connection between a connection point of the heater R2 and the diode D1 and the connection terminal T2.

The connection terminal T3 is connected to a plus terminal of the comparator CMP1 via the resistor R1; the connection terminal T4 is connected to a negative electrode of the reference voltage generator E1; a positive electrode of the reference voltage generator E1 is connected to a minus terminal of the comparator CMP1; and an output terminal of the comparator CMP1 is connected to a gate terminal of the transistor Q1.

The reference voltage generator E1 is a voltage generating circuit for outputting a reference voltage Vref1 that serves as a judgment standard for detecting the overcharging of the secondary battery 6. Thus, when the reference voltage Vref1 is applied to the minus terminal of the comparator CMP1 and a voltage Vb as a terminal voltage between the connection terminals T3 and T4 exceeds the reference voltage Vref1, the comparator CMP1 sets a gate voltage of the transistor Q1 to high level, thereby turning the transistor Q1 on to cause the heater to generate heat.

Further, a comparator whose input voltage has hysteresis characteristic is used as the comparator CMP1 in order to reduce the influence of noise when the voltage Vb is in the neighborhood of the reference voltage Vref1. The comparator CMP1, the resistor R1 and the reference voltage generator E1 are, for example, integrated into an integrated circuit IC1. In this case, the integrated circuit IC1 and the transistor Q1 correspond to one example of a protection controller.

Figure 11A:
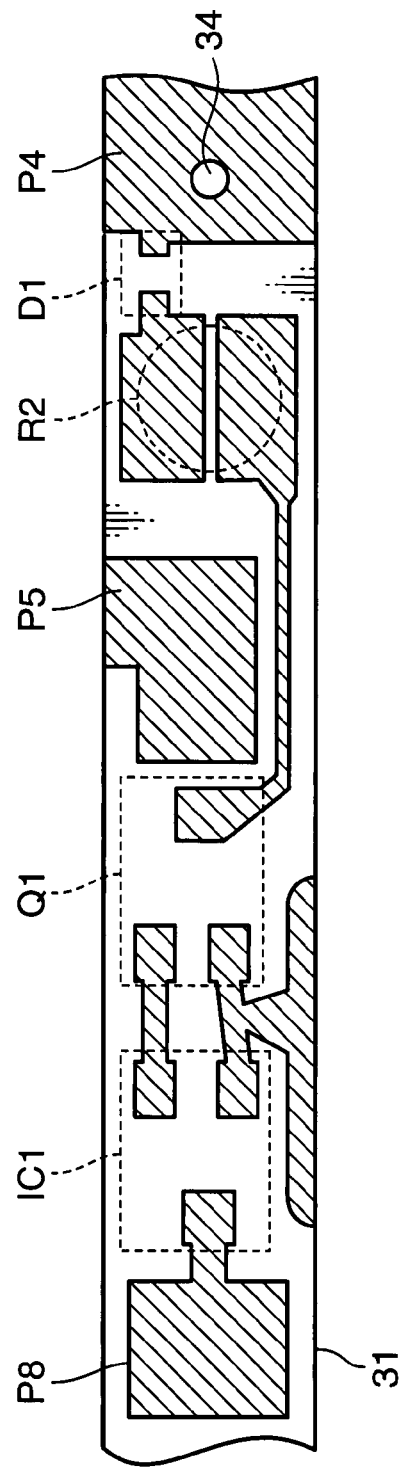
Figure 11B:
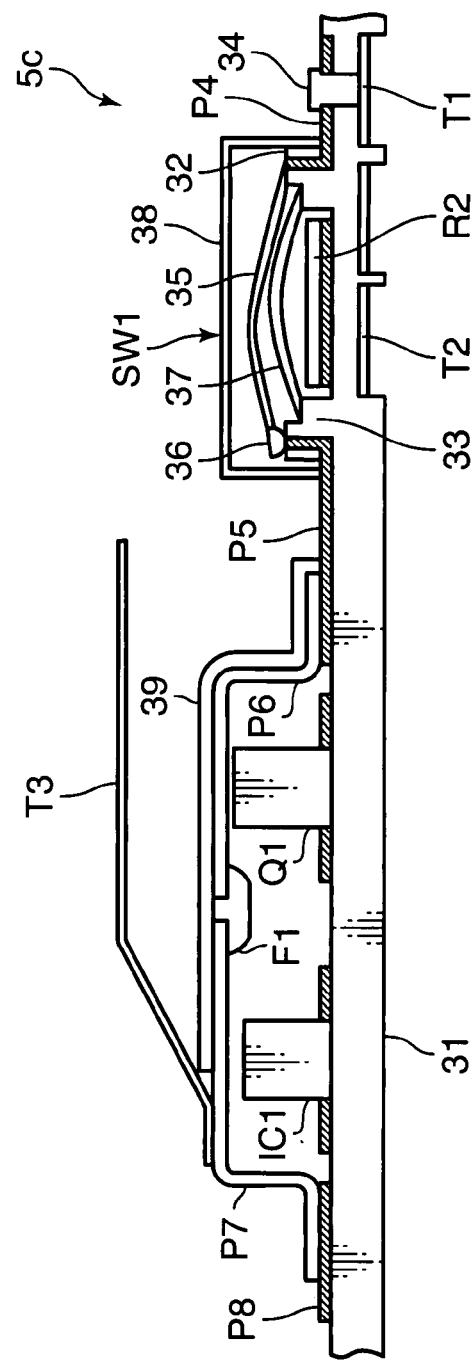

FIG. 11 are schematic diagrams showing the mechanical construction of the protection circuit 5c shown in FIG. 10, wherein FIG. 11A is a diagram showing wiring patterns used to mount parts of the protection circuit 5c and FIG. 11B is a section showing one example of the mechanical construction of the protection circuit 5c. In FIG. 11, mount positions of the parts are shown in broken line. FIG. 11A is a top view of the protection circuit 5 shown in FIG. 11B and FIG. 12B shows the same section as FIG. 11B for comparison.

The wiring patterns shown in FIG. 11A are printed on an inner surface of the casing 31 of the external connection terminal unit 3, i.e. on a surface thereof facing the secondary battery 6 accommodated in the container 2 when the external connection terminal unit 3 and the container 2 are assembled, using an electroconductive wiring material in paste form made, for example, of metal fine particles, and the integrated circuit IC1, the transistor Q1 and the heater R2 are directly secured to the inner surface of the casing 31 where the wiring patterns are printed without using any printed-wiring board.

In this way, the protection circuit 5 can be constructed without using any printed-wiring board, it can be miniaturized by the thickness of the printed-wiring board.

Further, as shown in FIG. 11B, projection-shaped supporting members 32, 33 are formed on the inner surface of the casing 31 of the external connection terminal unit 3, for example, by being integrally molded with the casing 31. A wiring pattern P4 drawn from the top of the supporting member 32 is connected to the connection terminal T1 provided on the outer surface of the casing 31, for example, via a cylindrical metal member 34 penetrating through the casing 31. Further, at the top of the supporting member 32, one end of a movable section 35 constituting the bimetal switch SW1 is connected with and fixed to the wiring pattern P4, for example, by spot welding. A contact 36 is provided at the other end of the movable section 35 and in contact with a wiring pattern P5 formed at the top of the supporting member 33.

Figure 13:
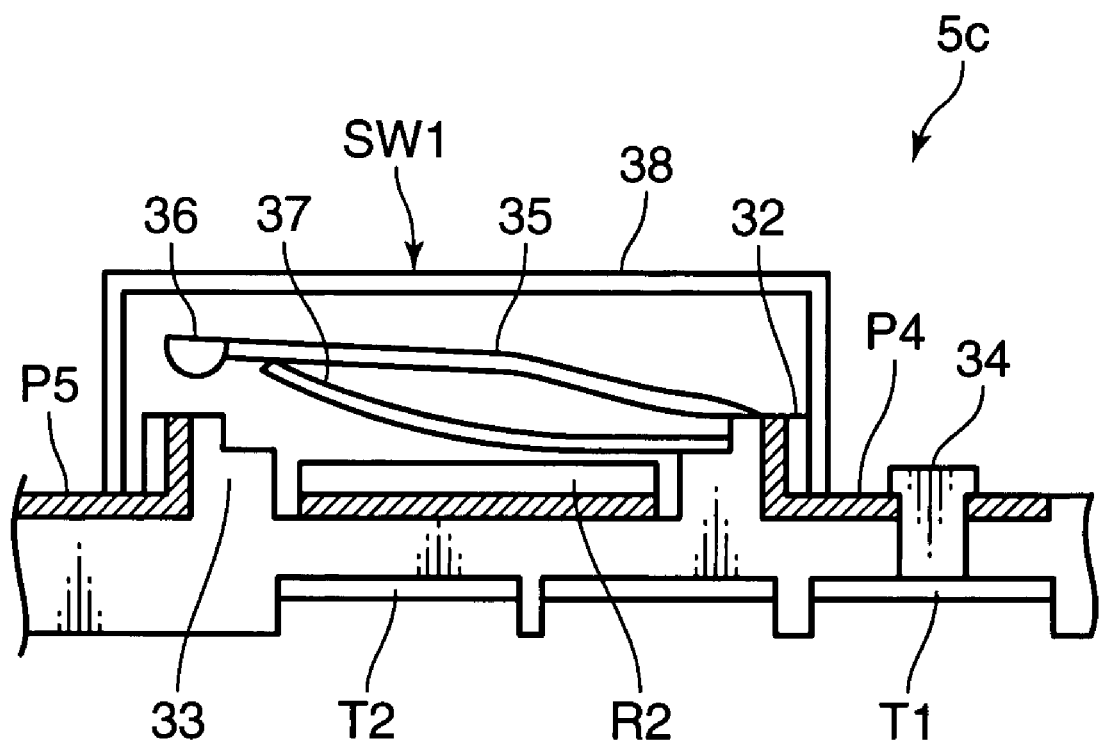
FIG. 13 is a schematic diagram showing the mechanical construction of the protection circuit shown in FIG. 10.

An arched bimetal 37 spans between the supporting members 32, 33 below the movable section 35. Upon reaching an operating temperature Tsw1, the bimetal 37 warps in an opposite direction as shown in FIG. 13 to move the movable section 35 upward, thereby separating the contact 36 from the wiring pattern P5. The bimetal switch SW1 is constructed by the supporting members 32, 33, the movable section 35, the bimetal 37 and the wiring patterns P4, P5. A switch cover 38 for dust-proof and insulation purpose is so secured as to cover the thus constructed bimetal switch SW1. A heater R2 substantially in the form of a rectangular plate is disposed below the bimetal 37, so that the bimetal 37 is heated when the heater R2 generates heat.

In this way, since the bimetal switch SW1 can be constructed using the supporting members 32, 33 integrally molded with the casing 31, cost can be more easily reduced than in the case of using the bimetal switch SW1 constructed as an individual component. Further, since the bottom part of the casing in the case of constructing the bimetal switch SW1 as an individual component is not necessary, the bimetal switch SW1 can be miniaturized.

Further, conductor leads P6, P7 constructing connection terminals of the temperature fuse F1 are, for example, in the form of wide plates, and the temperature fuse F1 is so mounted as to cover the integrated circuit IC1 and the transistor Q1 together with the conductor leads P6, P7 by bending the conductor leads P6, P7. Wiring patterns P5, P8 provided at the opposite sides of the integrated circuit IC1 and the transistor Q1 are connected to each other via the conductor lead P6, the temperature fuse F1 and the conductor lead P7 while bypassing the integrated circuit IC1 and the transistor Q1.

The outer surfaces of the temperature fuse F1 and the conductor leads P6, P7 and the both side surfaces of the conductor leads P6, P7 are covered, for example, by a sheet member 39 for insulation and dust-proof purpose.

Thus, the temperature fuse F1, the conductor leads P6, P7 and the sheet member 39 function as a cover for covering the integrated circuit IC1 and the transistor Q1, and a mounting area for the temperature fuse F1 on the surface of the casing 31 can be reduced and the protection circuit 5 can be miniaturized as compared to the case where a cover is provided in addition to the temperature fuse F1 and the conductor leads P6, P7.

Further, since the temperature fuse F1, the conductor leads P6, P7 and the sheet member 39 are used as a jumper wiring for causing a current to flow between the wiring patterns P5 and P8 while bypassing the integrated circuit IC1 and the transistor Q1, an area on the surface of the casing 31 taken up by the wiring patterns can be reduced and the protection circuit 5c can be easily miniaturized.

The connection terminal T1 is mounted on the conductor lead P7, for example, by spot welding, whereby no area on the surface of the casing 31 is taken up to mount the connection terminal T1. Therefore, the external connection terminal unit 3 can be easily miniaturized.

If the temperature fuse F1 and the conductor leads P6, P7 are mounted after the external connection terminal unit 3 is heated and the electroconductive wiring material is cured, with components excluding the temperature fuse F1 and the conductor leads P6, P7 mounted on the wiring patterns printed using the electroconductive wiring material, there is no likelihood of melting or degrading the temperature fuse F1 at the time of production even if the curing temperature of the electroconductive wiring material is higher than the operating temperature Tfuse1 of the temperature fuse F1.

Figure 14:
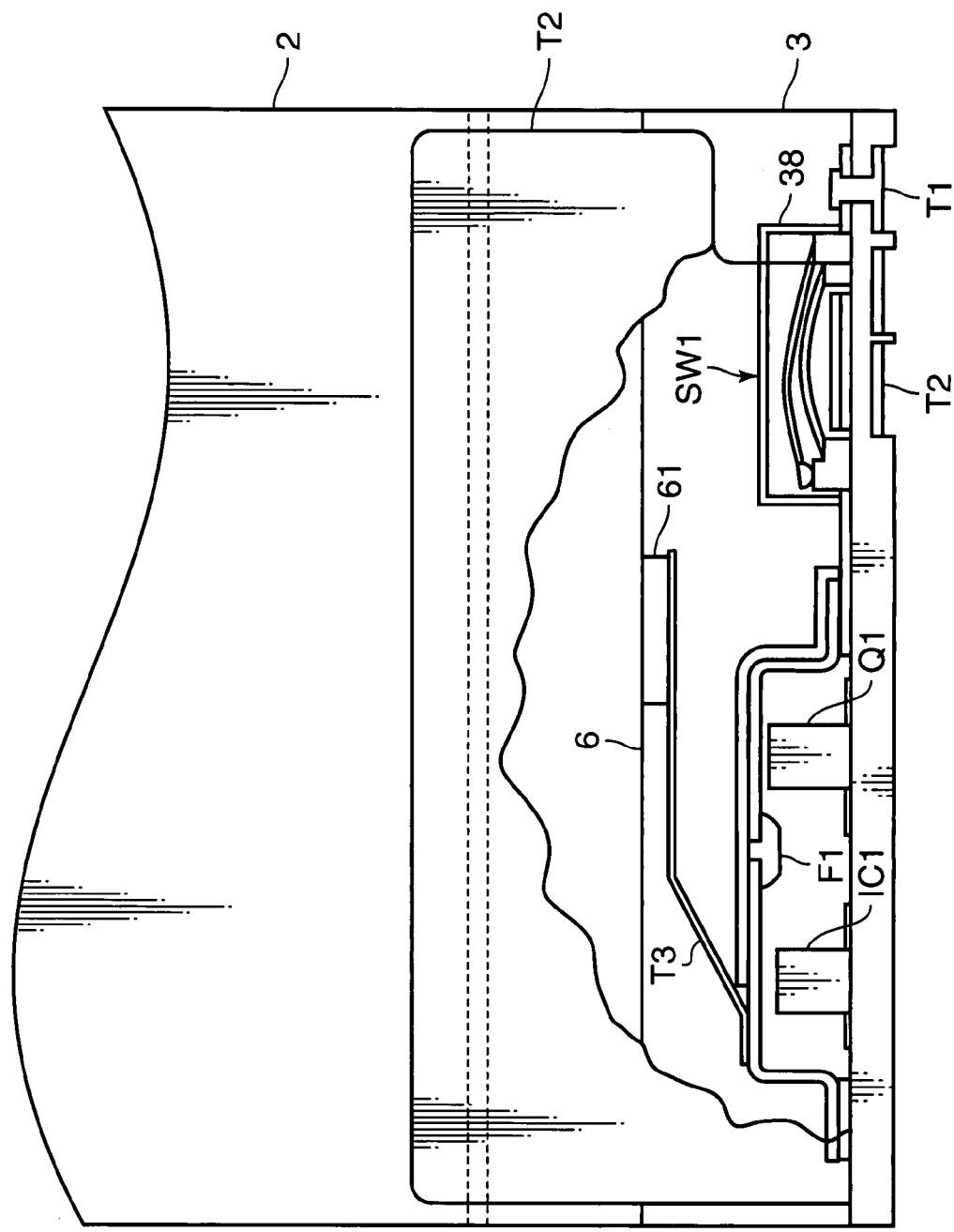
FIG. 14 is a schematic diagram showing a state where a container and an external connection terminal unit are assembled.

FIG. 14 is a schematic diagram showing a state where the container 2 and the external connection terminal unit 3 are assembled. As shown in FIG. 14, the bimetal switch SW1 and the temperature fuse F1 are arranged at positions facing and in proximity to the secondary battery 6 accommodated in the container 2 with the container 2 and the external connection terminal unit 3 assembled.

Next, the operation of the protection circuit 5c constructed as above is described. First, a protecting operation of the protection circuit 5c from overcharging is described. First, when an unillustrated charging device is connected with the connection terminals T1, T2 to apply a voltage Vc between the connection terminals T1 and T2 with the bimetal switch SW1 turned on, the secondary battery 6 is charged with the voltage Vb via the bimetal switch SW1, the temperature fuse F1 and the connection terminal T3.

The voltage Vb is normally up to, for example, 4.2 V. The reference voltage generator E1 is set to output, for example, 4.3 V as the reference voltage Vref1 to the comparator CMP1.

If the voltage Vb exceeds 4.3 V, for example, because the unillustrated charging device breaks down or the output voltage accuracy thereof is low, the transistor Q1 is turned on by the comparator CMP1 to cause a current to flow into the heater R2 from the connection terminal T1 via the bimetal switch SW1 to heat the bimetal switch SW1. When the temperature of the bimetal switch SW1 reaches the operating temperature Tsw1, the bimetal switch SW1 is turned off to cut off the charge current, thereby protecting the secondary battery 6 from overcharging.

Subsequently, if the voltage Vb falls to or below the reference voltage Vref1 by the bimetal switch SW1 being turned off to cut off the charge current, the transistor Q1 is turned off by the comparator CMP1 to zero the current flowing into the heater R2. When the temperature of the bimetal switch SW1 falls below a return temperature by natural cooling, the bimetal switch SW1 is turned on to return from an overcharging protecting state to a normal state.

Since overcharging is detected by the comparator CMP1 and the bimetal switch SW1 is heated by the heater R2 to be turned off in this case, accuracy in detecting overcharging can be improved as compared, for example, to the case where protection from overcharging is carried out only by the temperature switch connected in series with the secondary battery as shown in FIGS. 52 and 53. Therefore, likelihood of overcharging the secondary battery 6 without performing the overcharging protection, degrading the characteristics of the secondary battery 6 or causing the expansion or deformation of the secondary battery 6 can be reduced.

Next, a protecting operation of the protection circuit 5c in the case where discharge current from the secondary battery 6 becomes excessive is described. First, when the connection terminals T1, T2 are short-circuited or a resistance value between the connection terminals T1 and T2 becomes low with the bimetal switch SW1 turned on, for example, because a metal piece touches the connection terminals T1, T2 or an unillustrated mobile phone or like load device connected with the connection terminals T1, T2 breaks down, a current discharged from the secondary battery 6 via the temperature fuse F1 and the bimetal switch SW1 increases and the bimetal switch SW1 is heated by the contact resistance thereof.

When the temperature of the bimetal switch SW1 reaches the operating temperature Tsw1, the bimetal switch SW1 is turned off to cut off the discharge current of the secondary battery 6, thereby protecting the secondary battery 6 from excessive discharge current. When the bimetal switch SW1 is turned off, the discharge current of the secondary battery 6 flows from the connection terminal T3 into the unillustrated load device (or short-circuited part) connected with the connection terminals T1, T2 via the temperature fuse F1, the heater R2, the diode D1 and the connection terminal T1 and the heater R2 generates heat to heat the bimetal switch SW1.

In this case, the operating conditions of the bimetal switch SW1 are set such that the bimetal switch SW1 is turned off earlier than the temperature fuse F1 and the secondary battery 6 can be protected from overcharging and excessive discharge current by the bimetal switch SW1, which is a return-type heat-sensitive switch, without melting the temperature fuse F1, which is a nonreturn-type heat-sensitive switch. Thus, the battery pack 1c can be repeatedly used without replacing the temperature fuse F1 after removing the cause of overcharging and excessive discharge current, for example, by detaching the battery pack 1c from the charging device or the load device, wherefore convenience can be improved.

Even if the bimetal switch SW1 cannot be turned off at the time of overcharging, for example, because the contact of the bimetal switch SW1 melts to cause a short-circuit problem or any one of the integrated circuit IC1, the transistor Q1 and the heater R2 breaks down, the temperature fuse F1 melts upon the heat generation of the secondary battery 6 by overcharging or excessive discharge current, whereby the secondary battery 6 can be protected. Therefore, the reliability of the protection circuit 5c can be improved.

Further, even if the bimetal switch SW1 is turned off and does not generate heat any longer, the heater R2 is heated by a current flowing into the unillustrated load device or the like and the bimetal switch SW1 is heated by the heater R2. Thus, the bimetal switch SW1 can be kept off until the cause of excessive discharge current is removed, for example, by detaching the load device or the like having a short-circuit problem.

This can suppress an occurrence of chattering of repeatedly turning the bimetal switch SW1 on and off as in the case where the bimetal switch SW1 is turned on by natural cooling, for example, because the bimetal switch SW1 is turned off and does not generate heat any longer, and the excessive discharge current of the secondary battery 6 flows through the bimetal switch SW1 again to turn the bimetal switch SW1 off.

Further, since the secondary battery 6 can be protected from overcharging and excessive discharge current using the bimetal switch SW1 that is a heat-sensitive switch, the FET 1006 for cutting off the discharge current, the FET 1007 for cutting off the charge current, the reference voltage generator 1009 for detecting an excessive discharge current, the comparator 1111, the resistor 1112 and the logic circuit 1013 for on-off controlling the two FETs 1006, 1007 are not necessary unlike the protection circuit 1002 according to background art shown in FIG. 51, wherefore the protection circuit 5c can be simplified and can be easily miniaturized.

Since the bimetal switch SW1 and the temperature fuse F1 are arranged at positions facing and in proximity to the secondary battery 6 accommodated in the container 2 with the container 2 and the external connection terminal unit 3 assembled as shown in FIG. 14, thermal coupling between the bimetal switch SW1, the temperature fuse F1 and the secondary battery 6 is strengthened. Thus, the charge current and the discharge current of the secondary battery 6 can be cut off by the bimetal switch SW1 and the temperature fuse F1 if the secondary battery 6 excessively generates heat.

Thus, even if the heater R2 cannot be caused to generate heat during the overcharging of the secondary battery 6, for example, because of the breakdown of the integrated circuit IC1, the transistor Q1, the heater R2 or the like, the bimetal switch SW1 and the temperature fuse F1 are heated when the secondary battery 6 generates heat due to overcharging. When the temperature of the bimetal switch SW1 reaches the operating temperature Tsw1, the bimetal switch SW1 is turned off to cut off the charge current. Therefore, the secondary battery 6 can be protected from overcharging even if the integrated circuit IC1, the transistor Q1, the heater R2 or the like breaks down.

In the case of a short-circuit problem caused, for example, by the melting of the contact of the bimetal switch SW1, the bimetal switch SW1 cannot be turned off even if the temperature of the bimetal switch SW1 reaches the operating temperature Tsw1. However, if the temperature fuse F1 is heated by the heat generation of the secondary battery 6 and the temperature of the temperature fuse F1 reaches the operating temperature Tfuse1, the temperature fuse F1 melts to cut off the charge current. Therefore, the secondary battery 6 can be protected from overcharging even if the bimetal switch SW1 breaks down.

Further, since the temperature fuse F1 is arranged also in proximity to both the integrated circuit IC1 and the transistor Q1, the charge current and the discharge current of the secondary battery 6 can be easily cut off by the temperature fuse F1 when the integrated circuit IC1 or the transistor Q1 excessively generates heat.

Although the wiring patterns constructing the protection circuit 5c are shown to be printed on the surface of the external connection terminal unit 3 facing the secondary battery 6 accommodated in the container 2, they may be formed on a printed-wiring board instead of being printed on the surface of the sealing portion, and the integrated circuit IC1, the transistor Q1, the bimetal switch SW1 and the diode D1 constructing the protection circuit 5c may be arranged on this printed-wiring board. In this case, the supporting members 32, 33 may be passed through through holes formed in the printed-wiring board to support the movable section 35 and the bimetal 37 on the printed-wiring board.

The supporting members 32, 33 are not limited to those integrally molded with the casing 31 and may be formed, for example, by embedding cylindrical metal members in the casing 31. Further, the conductor leads P6, P7 may be short-circuited with each other without providing the temperature fuse F1. Furthermore, the switch cover 38 and the sheet member 39 may be integrally molded into one part.

Although the protection circuit 5c is shown to be incorporated into the battery pack 1c, it is not limited to incorporation into the battery pack 1c and may be incorporated, for example, into a load device and used as a protection circuit for a secondary battery built in the load device.

A secondary battery such as a lithium ion secondary battery, a lithium polymer secondary battery, a nickel-metal-hydride secondary battery or a nickel-cadmium secondary battery may enter an excessive discharge state to have the characteristics thereof such as cycle life degraded if discharge further continues after discharge progresses and the output voltage falls to or below a specified discharge final voltage. Accordingly, in a load device such as a mobile phone connected with the connection terminals T1, T2, it is desirable to detect the output voltage between the connection terminals T1 and T2 and to cut off the output current from the connection terminals T1, T2 if the output voltage between the connection terminals T1 and T2 falls to or below a specified discharge final voltage. This can suppress an occurrence of characteristic degradation caused by the excessive discharge of the secondary battery 6.

Fifth Embodiment

Figure 15:
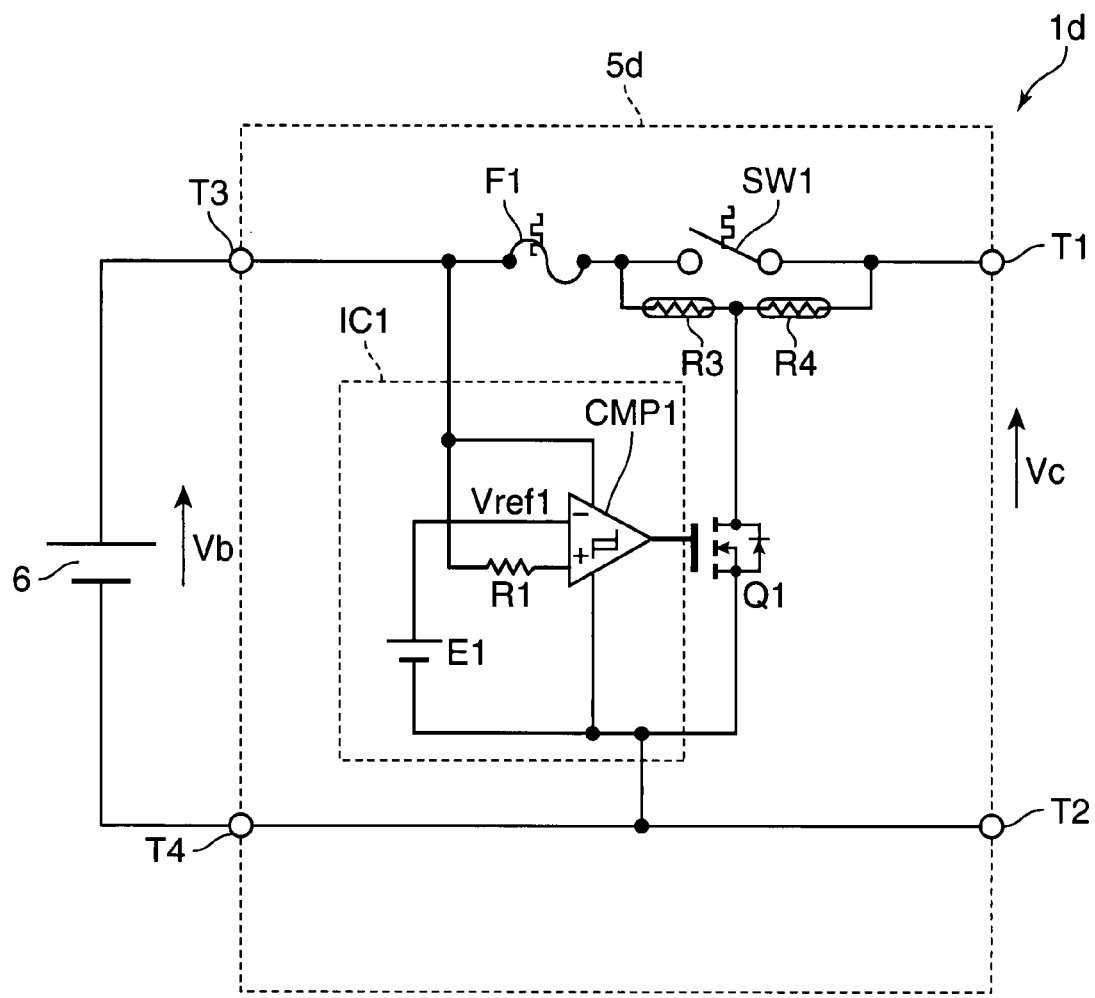
FIG. 15 is a circuit diagram showing one example of the electrical construction of a battery pack according to a fifth embodiment of the invention.

Next, a battery pack provided with a protection circuit according to a fifth embodiment of the present invention is described. The external appearance of a battery pack 1d according to the fifth embodiment of the present invention is similar to that of the battery pack 1 shown in FIG. 1. FIG. 15 is a circuit diagram showing one example of the electrical construction of the battery pack 1d according to the fifth embodiment of the present invention. The battery pack 1d shown in FIG. 15 differs from the battery pack 1c shown in FIG. 10 in the construction of a protection circuit 5c. Specifically, in a protection circuit 5d shown in FIG. 15, a series circuit of a heater R3 (second heater) and a heater R4 (third heater) is connected in parallel with a bimetal switch SW1 in place of the series circuit of the heater R2 and the diode D1. A connection point of the heaters R3, R4 is connected to a connection terminal T4 via a transistor Q1.

Figure 16:
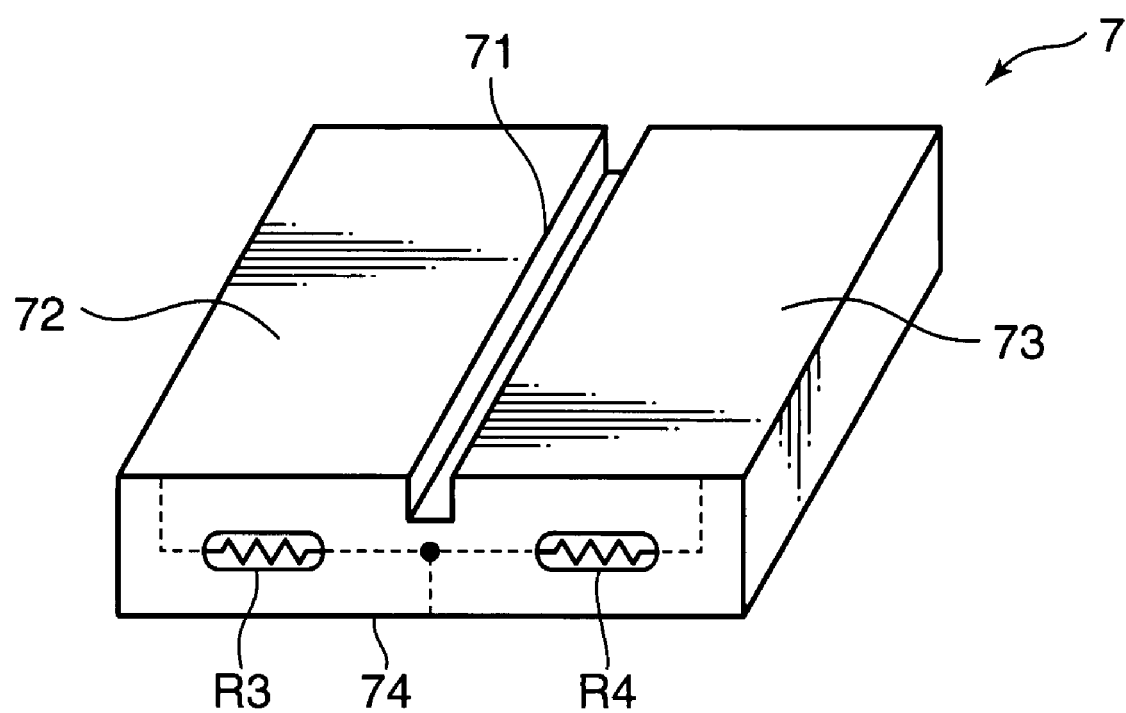

The other construction is not described here since it is similar to that of the battery pack 1c shown in FIG. 10, and characteristic points of this embodiment are described below. FIG. 16 is a schematic diagram showing one example of the construction of the series circuit of the heaters R3, R4 used in the protection circuit 5d shown in FIG. 15. The series circuit of the heaters R3, R4 shown in FIG. 16 is constructed using one thermistor 7.

The thermistor 7 is a PTC thermistor having, for example, a positive temperature characteristic, i.e. whose resistance value increases and decreases as temperature rises and falls, and has a plate-like shape whose longitudinal and transverse dimensions can be physically determined such as a substantially quadratic shape including a square shape or a rectangular shape, an elliptic shape, a rhombic shape or a circular shape partly having notches or projections. A groove 71 formed to divide one surface of the thermistor 7 into two areas is formed in this surface of the thermistor 7.

One area divided by the groove 71 is used as a first electrode 72 (first electrode), the other area is used as a second electrode 73 (second electrode), and the other surface of the thermistor 7 is used as a third electrode 74 (third electrode). In this case, the first and third electrodes 72, 74 are used as connection terminals at the opposite ends of the heater R3, and a section between the first and third electrodes 72 and 74 functions as the heater R3. Further, the third and second electrodes 74, 73 are used as connection terminals at the opposite ends of the heater R4, and a section between the third and second electrodes 74 and 73 functions as the heater R4.

Since the heaters R3, R4 can be constructed using one thermistor 7 in this way, the protection circuit 5d can be made smaller and cost can be more reduced as compared to the case where each of the heaters R3, R4 is constructed by one thermistor.

Figure 17A:
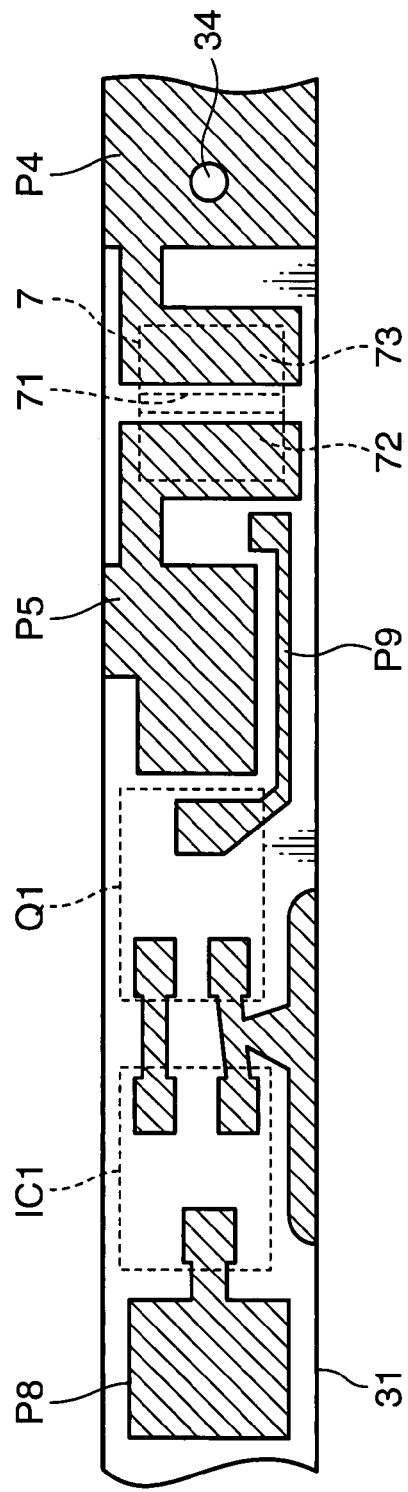
FIG. 17A is a diagram showing wiring patterns used to mount components of the protection circuit and FIG. 17B is a section showing one example of the mechanical construction of the protection circuit.
Figure 17B:
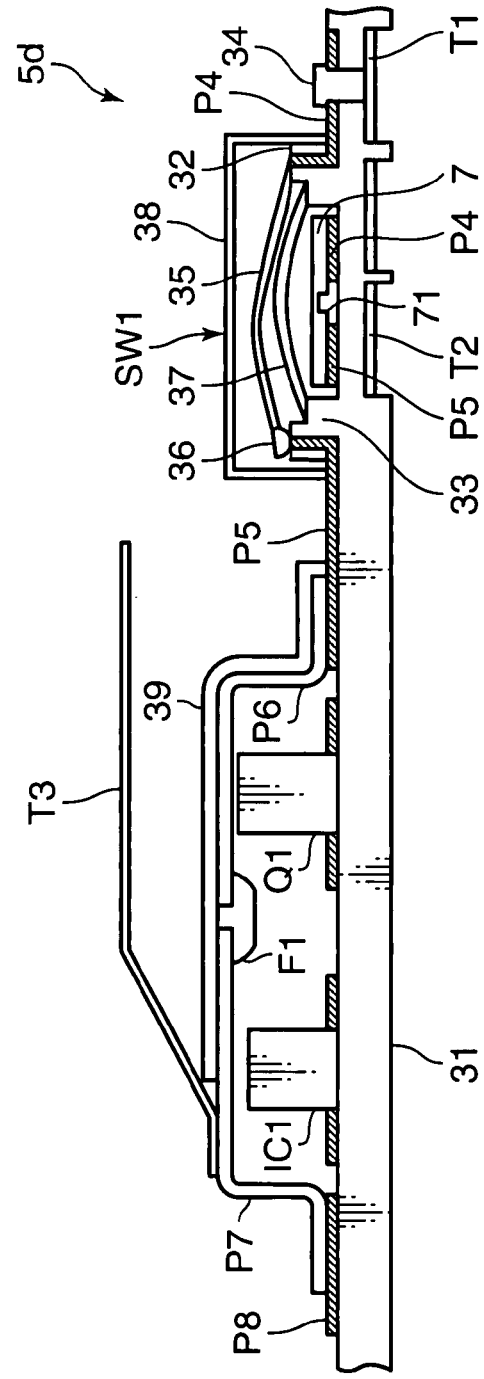

FIGS. 17 and 18 are schematic diagrams showing the mechanical construction of the protection circuit 5d shown in FIG. 15. FIG. 17A is a diagram showing wiring patterns used to mount components of the protection circuit 5d, and FIG. 17B is a section showing one example of the mechanical construction of the protection circuit 5d. In FIG. 17, mount positions of the components are shown in broken line. FIG. 18A is a top view of the protection circuit 5d shown in FIG. 17B. FIG. 18B shows the same section as FIG. 17B for comparison. The protection circuit 5d shown in FIGS. 17, 18 differs from the protection circuit 5c shown in FIGS. 11, 12 in the mounting method of the thermistor 7 on a casing 31 where the wiring patterns are formed.

The thermistor 7 is such that the second electrode 73 is connected to a wiring pattern P4 connected to a connection terminal T1 and the first electrode 72 is connected to a wiring pattern P5 connecting the bimetal switch SW1 and a temperature fuse F1. In this case, the thermistor 7 needs to be mounted on the casing 31 such that a section between the wiring patterns P4 and P5 conforms to the groove 71 of the thermistor 7. Since the thermistor 7 has a quadratic shape, it is easier to conform the direction of the groove 71 to that of the section between the wiring patterns P4 and P5, for example, as compared to the case where the thermistor 7 has a disk shape. Therefore, operability in the assembling process of the protection circuit 5d can be improved.

Figure 19:
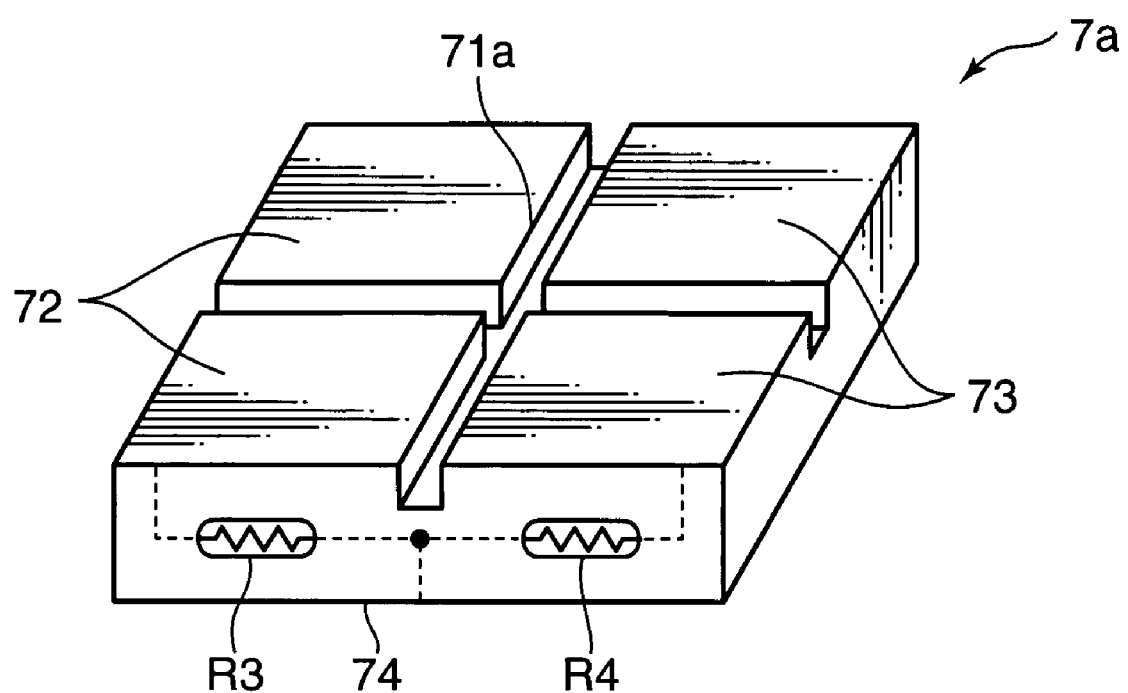
FIG. 19 is a schematic diagram showing one example of the construction of a thermistor used as a heater shown in FIG. 15.
Figure 20:
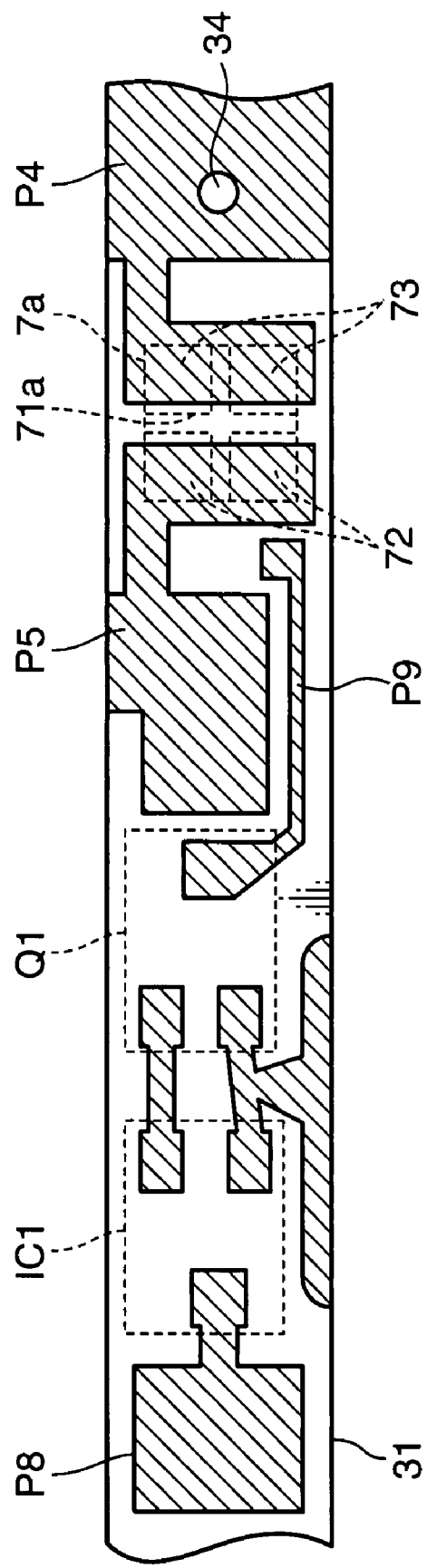
FIG. 20 is a schematic diagram showing the mechanical construction of a protection circuit using the thermistor shown in FIG. 19.

As shown in FIG. 19, a crisscross groove 71a may be formed to divide one surface of a thermistor 7a into four areas. Then, as shown in FIG. 20, two adjacent one of the four areas divided by the groove 71a may be used as a first electrode 72 by being connected to the wiring pattern P5, and the areas other than the two used as the first electrode 72 may be used as a second electrode 73.

Thus, even if the thermistor 7a is mounted while being rotated by 90° in the same plane upon connecting the thermistor 7a formed with the groove 71a with the wiring patterns P4, P5, the thermistor 7a normally functions as the heaters R3, R4. Therefore, restriction in the mounting direction of the thermistor 7a is reduced and operability in the assembling process of the protection circuit 5d can be further improved.

Further, the third electrode 74 of the thermistor 7 (7a) and a wiring pattern P9 connected with a drain of the transistor Q1 are connected in the air, for example, using a jumper wire 75 as shown in FIG. 18A.

The other construction is not described since it is similar to that of the protection circuit 5c shown in FIGS. 11 and 12, and the operation of the protection circuit 5d shown in FIG. 15 is described. First, a protecting operation of the protection circuit 5d from overcharging is described. First, when an unillustrated charging device is connected with the connection terminals T1, T2 to apply a voltage Vc between the connection terminals T1 and T2 with the bimetal switch SW1 turned on, the secondary battery 6 is charged with a voltage Vb via the bimetal switch SW1, the temperature fuse F1 and a connection terminal T3.

The voltage Vb is normally up to, for example, 4.2 V. A reference voltage generator E1 is set to output, for example, 4.3 V as a reference voltage Vref1 to a comparator CMP1.

If the voltage Vb exceeds 4.3 V, for example, because the unillustrated charging device breaks down or the output voltage accuracy thereof is low, the transistor Q1 is turned on by the comparator CMP1 to cause a current to flow into the heater R4 from the connection terminal T1 and to cause a current to flow into the heater R3 from the secondary battery 6 via the connection terminal T3 and the temperature fuse F1, whereby the heaters R3, R4 generate heat to heat the bimetal switch SW1. When the temperature of the bimetal switch SW1 reaches an operating temperature Tsw1, the bimetal switch SW1 is turned off to cut off a charge current, thereby protecting the secondary battery 6 from overcharging.

In this case, current supply to the heaters R3, R4 continues even if the bimetal switch SW1 is turned off and the bimetal switch SW1 continues to be heated by the heaters R3, R4, wherefore the bimetal switch SW1 is kept off to continue the overcharging protecting operation. Further, by adjusting the position of the groove 71 of the thermistor 7, for example, to make the resistance value of the heater R3 larger than that of the heater R4 or by using one thermistor as each of the heaters R3, R4 in such a manner that the resistance of the heater R3 is larger than that of the heater R4, the discharge current of the secondary battery 6 when the transistor Q1 is turned on can be reduced and the heater R4 can be heated mainly by the current supplied from the unillustrated charging device connected with the connection terminals T1, T2 to keep the bimetal switch SW1 off.

Further, if the current continues to flow from the secondary battery 6 into the heater R3 via the connection terminal T1 and the temperature fuse F1 and an output voltage of the secondary battery 6 falls to or below the reference voltage Vref1 by the discharge of the secondary battery 6, the transistor Q1 is turned off by the comparator CMP1. Then, since the output voltage of the charging device connected with the connection terminals T1, T2 is higher than the output voltage of the secondary battery 6, a small current flows from the connection terminal T1 into the secondary battery 6 via the heaters R4, R3, the temperature fuse F1 and the connection terminal T3 and the heaters R3, R4 continue to generate heat, whereby the bimetal switch SW1 is kept off to continue the overcharging protecting operation.

If the secondary battery 6 is charged with the charge current flowing via the heaters R4, R3 and the voltage Vb exceeds 4.3 V again, the transistor Q1 is turned on by the comparator CMP1, whereby a current flows from the connection terminal T1 to the heater R4 and a current flows into the heater R3 from the secondary battery 6 via the connection terminal T3 and the temperature fuse F1. The heaters R3, R4 generate heat to heat the bimetal switch SW1, and the bimetal switch SW1 is kept off to continue the overcharging protecting operation.

As described above, the bimetal switch SW1 is kept off and the operation of protecting the secondary battery 6 from overcharging is continued by repeatedly turning the transistor Q1 on and off according to the charging and discharging operations of the secondary battery 6. Thus, even if the bimetal switch SW1 is turned off, the output voltage of the secondary battery 6 falls due to the discharge of the secondary battery 6 and the transistor Q1 is turned off by the comparator CMP1, for example, as the overcharging protecting operation is performed, no current flows into the heaters, thereby hindering the bimetal switch SW1 from being turned on. Therefore, an occurrence of chattering of repeatedly turning the bimetal switch SW1 on and off according to the charging and discharging operations of the secondary battery 6 can be suppressed.

Next, a protecting operation of the protection circuit 5d in the case where a discharge current from the secondary battery 6 becomes excessive is described. First, when the connection terminals T1, T2 are short-circuited or a resistance value between the connection terminals T1 and T2 becomes low with the bimetal switch SW1 turned on, for example, because a metal piece touches the connection terminals T1, T2 or an unillustrated mobile phone or like load device connected with the connection terminals T1, T2 breaks down, a current discharged from the secondary battery 6 via the temperature fuse F1 and the bimetal switch SW1 increases and the bimetal switch SW1 is heated by the contact resistance thereof.

When the temperature of the bimetal switch SW1 reaches the operating temperature Tsw1, the bimetal switch SW1 is turned off to cut off the discharge current of the secondary battery 6, thereby protecting the secondary battery 6 from excessive discharge current. When the bimetal switch SW1 is turned off, the discharge current of the secondary battery 6 flows from the connection terminal T3 into the unillustrated load device (or short-circuited part) connected with the connection terminals T1, T2 via the temperature fuse F1, the heaters R3, R4 and the connection terminal T1, and the heaters R3, R4 generate heat to heat the bimetal switch SW1.

In this case, even if the bimetal switch SW1 is turned off and does not generate heat any longer, the heaters R3, R4 are heated by the current flowing into the unillustrated load device or the like and the bimetal switch SW1 is heated by the heaters R3, R4. Thus, the bimetal switch SW1 can be kept off until the cause of excessive discharge current is removed, for example, by detaching the load device or the like having a short-circuit problem.

Sixth Embodiment

Figure 21:
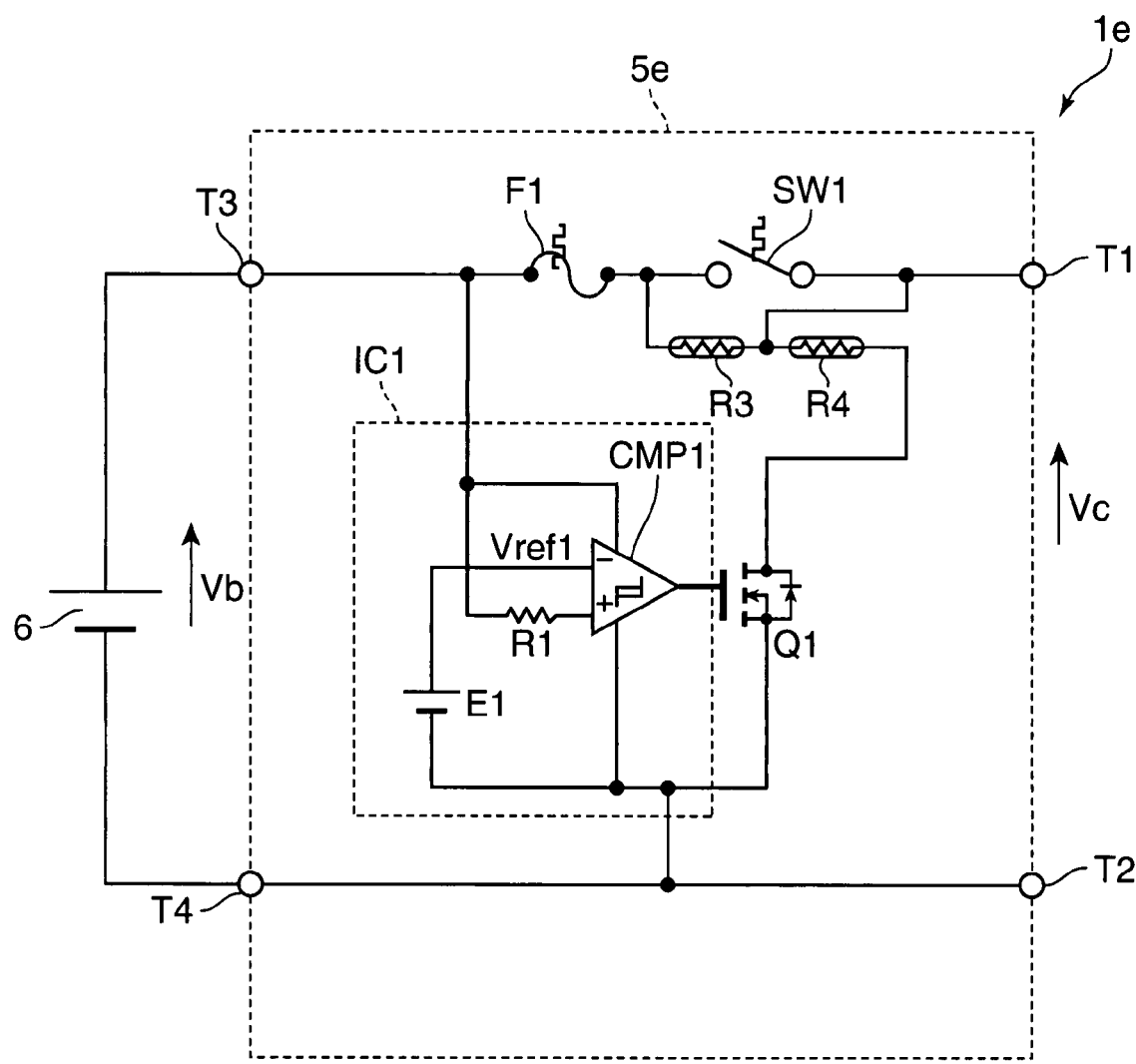

Next, a battery pack provided with a protection circuit according to a sixth embodiment of the present invention is described. The external appearance of a battery pack 1e according to the sixth embodiment of the present invention is similar to that of the battery pack 1 shown in FIG. 1. FIG. 21 is a circuit diagram showing one example of the electrical construction of the battery pack 1e according to the sixth embodiment of the present invention. The battery pack 1e shown in FIG. 21 differs from the battery pack 1d shown in FIG. 15 in the construction of a protection circuit 5e. Specifically, in the protection circuit 5e shown in FIG. 21, a heater R3 (first heater) is connected in parallel with a bimetal switch SW1. A connection point of the heaters R3, R4 is connected to a connection terminal T1, and the other end is connected to a connection terminal T2 via a transistor Q1. In this case, the heater R4 corresponds to a fourth heater having one end connected to the connection terminal T1 and adapted to heat the bimetal switch SW1.

FIGS. 22 and 23 are schematic diagrams showing the mechanical construction of the protection circuit 5e shown in FIG. 21. FIG. 22A is a diagram showing wiring patterns used to mount components of the protection circuit 5e and FIG. 22B is a section showing one example of the mechanical construction of the protection circuit 5e. In FIG. 22, mount positions of the components are shown in broken line. FIG. 23A is a top view of the protection circuit 5e shown in FIG. 22B and FIG. 23B shows the same section as FIG. 22B for comparison. The protection circuit 5e shown in FIGS. 22, 23 differs from the protection circuit 5d shown in FIGS. 17, 18 in the mounting method of a thermistor 7a on the casing 31 where the wiring patterns are formed.

The two adjacent areas of the four areas of the thermistor 7a divided by a groove 71a is connected with a wiring pattern P5 connecting a bimetal switch SW1 and a temperature fuse F1 as a first electrode 72, and the areas other than the two used as the first electrode 72 are connected with a wiring pattern P9 connected with a drain of a transistor Q1 as a second electrode 73. Further, a third electrode 74 of the thermistor 7a and a wiring pattern P4 connected with a connection terminal T3 are connected in the air using a jumper wire 76.

The other construction is not described since it is similar to that of the protection circuit 5d shown in FIGS. 15, 17, 18 and the operation of the protection circuit 5e shown in FIG. 21 is described. First, a protecting operation of the protection circuit 5e from overcharging is described. First, when an unillustrated charging device is connected with the connection terminals T1, T2 to apply a voltage Vc between the connection terminals T1 and T2 with the bimetal switch SW1 turned on, the secondary battery 6 is charged with a voltage Vb via the bimetal switch SW1, the temperature fuse F1 and the connection terminal T3.

The voltage Vb is normally up to, for example, 4.2 V. A reference voltage generator E1 is set to output, for example, 4.3 V as a reference voltage Vref1 to a comparator CMP1.

If the voltage Vb exceeds 4.3 V, for example, because the unillustrated charging device breaks down or the output voltage accuracy thereof is low, the transistor Q1 is turned on by the comparator CMP1 to cause a current to flow into the heater R4 from the connection terminal T1, whereby the heater R4 generates heat to heat the bimetal switch SW1. When the temperature of the bimetal switch SW1 reaches an operating temperature Tsw1, the bimetal switch SW1 is turned off to cut off a charge current, thereby protecting the secondary battery 6 from overcharging.

In this case, current supply from the unillustrated charging device connected with the connection terminal T1 to the heater R4 continues even if the bimetal switch SW1 is turned off and the bimetal switch SW1 continues to be heated by the heater R4, wherefore the bimetal switch SW1 is kept off to continue the overcharging protecting operation.

Further, since an output voltage of the unillustrated charging device connected with the connection terminal T1 is higher than an output voltage of the secondary battery 6, no current flows from the secondary battery 6 into the heater R3 and the secondary battery 6 does not discharge even if the transistor Q1 is turned on. This can suppress an occurrence of chattering of repeatedly turning the bimetal switch SW1 on and off according the charging and discharging operations of the secondary battery 6, for example, by repeating an operation of turning the bimetal switch SW1 off as the overcharging protecting operation is performed and an operation of turning the bimetal switch SW1 on to charge the secondary battery 6 again because the output voltage of the secondary battery 6 decreases by the discharge of the secondary battery 6 and the transistor Q1 is turned off by the comparator CMP1 to cause no current to flow into the heater.

Next, a protecting operation of the protection circuit 5e in the case where a discharge current from the secondary battery 6 becomes excessive is described. First, when the connection terminals T1, T2 are short-circuited or a resistance value between the connection terminals T1 and T2 becomes low with the bimetal switch SW1 turned on, for example, because a metal piece touches the connection terminals T1, T2 or an unillustrated mobile phone or like load device connected with the connection terminals T1, T2 breaks down, a current discharged from the secondary battery 6 via the temperature fuse F1 and the bimetal switch SW1 increases and the bimetal switch SW1 is heated by the contact resistance thereof.

When the temperature of the bimetal switch SW1 reaches the operating temperature Tsw1, the bimetal switch SW1 is turned off to cut off the discharge current of the secondary battery 6, thereby protecting the secondary battery 6 from excessive discharge current. When the bimetal switch SW1 is turned off, the discharge current of the secondary battery 6 flows from the connection terminal T3 into the unillustrated load device (or short-circuited part) connected with the connection terminals T1, T2 via the temperature fuse F1, the heater R3 and the connection terminal T1, whereby the heater R3 generates heat to heat the bimetal switch SW1.

In this case, even if the bimetal switch SW1 is turned off and does not generate heat any longer, the heater R3 is heated by the current flowing into the unillustrated load device or the like and the bimetal switch SW1 is heated by the heater R3. Thus, the bimetal switch SW1 can be kept off until the cause of excessive discharge current is removed, for example, by detaching the load device or the like having a short-circuit problem.

As described above, the protection circuit 5e shown in FIG. 21 causes the heater R4 to generate heat by the current supplied from the unillustrated charging device connected with the connection terminals T1, T2 in the case of protecting the secondary battery 6 from overcharging while causing the heater R3 to generate heat by the current supplied from the secondary battery 6 in the case of protecting the secondary battery 6 from excessive discharge current. In this case, since the operating temperature Tsw1 at which the bimetal switch SW1 operates is constant, a heat value of the heater R4 at the time of protection from the overcharging and that of the heater R3 at the time of protection from excessive discharge current are preferably equal to each other.

If Vcmax, Vb, R3 and R4 denote the maximum output voltage of the charging device, the output voltage of the secondary battery 6, the resistance value of the heater R3 and the resistance value of the heater R4, respectively, R3, R4 are preferably so set as to satisfy the following Equation (2).

$$Vcmax \times Vcmax + R4 = Vb \times Vb + R3 \quad (2)$$

In this way, the heat value of the heater R4 at the time of protection from the overcharging and that of the heater R3 at the time of protection from excessive discharge current can be set equal to each other. In this case, the resistance values of the heaters R3, R4 may be so set as to satisfy the above Equation (2), for example, by constructing the heaters R3, R4 by different thermistors or by adjusting the position of the groove 71 using the thermistor 7 shown in FIG. 16.

Figure 24:
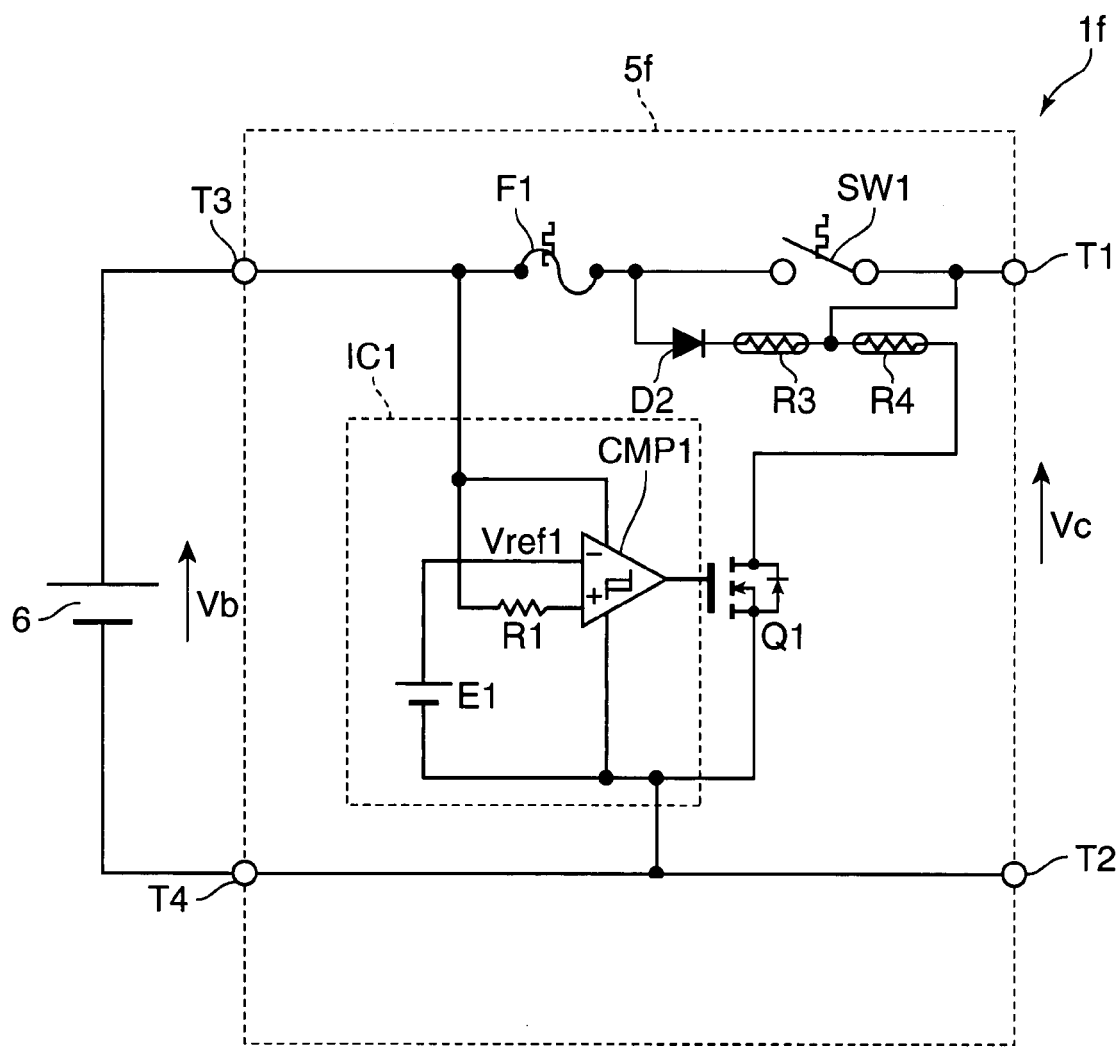
FIG. 24 is a circuit diagram showing a modification of the electrical construction of the battery pack shown in FIG. 21.

As in a protection circuit 5f shown in FIG. 24, a diode D2 (second rectifying element) as a rectifying element may be provided between the temperature fuse F1 and the heater R3 in the protection circuit 5e shown in FIG. 21. An anode of the diode D2 is connected to the connection terminal T3 via the temperature fuse F1, and a cathode thereof is connected to the connection terminal T3 via the heater R3. In other words, the diode D2 is connected such that the forward direction thereof is set to such a direction as to flow the discharge current of the secondary battery 6 connected to the connection terminal T3.

Thus, after the bimetal switch SW1 is turned off to protect the secondary battery 6 from overcharging by the unillustrated charging device connected with the connection terminals T1, T2 in the protection circuit 5f shown in FIG. 24, the application of the charging voltage from the connection terminal T3 to the secondary battery 6 via the heater R3 can be blocked by the diode D2, wherefore the effect of protecting the secondary battery 6 from overcharging can be improved.

Seventh Embodiment

Figure 25:
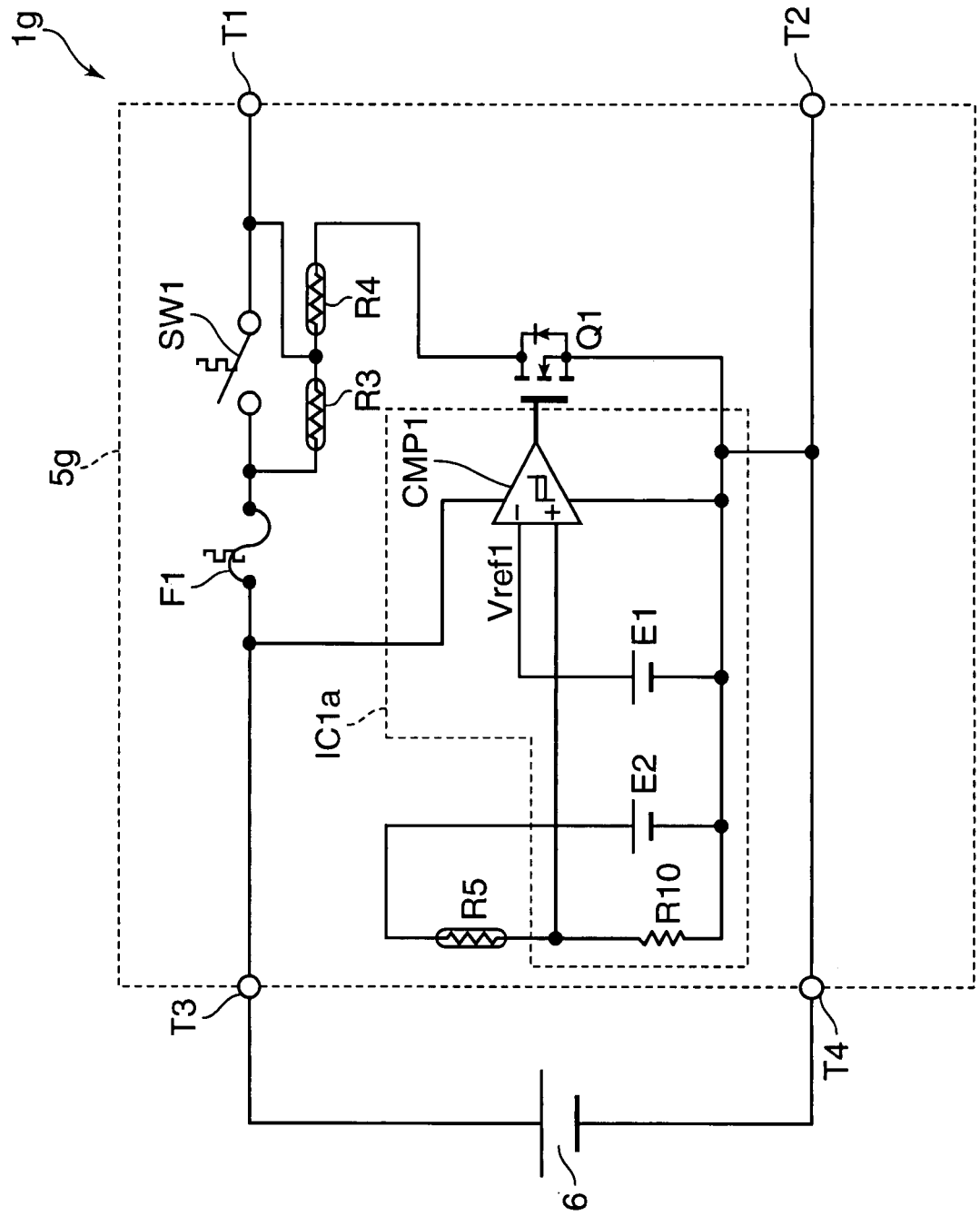
FIG. 25 is a circuit diagram showing one example of the electrical construction of a battery pack according to a seventh embodiment.

Next, a battery pack provided with a protection circuit according to a seventh embodiment of the present invention is described. The external appearance of a battery pack 1g according to the seventh embodiment of the present invention is similar to that of the battery pack 1 shown in FIG. 1. FIG. 25 is a circuit diagram showing one example of the electrical construction of the battery pack 1g according to the seventh embodiment of the present invention. The battery pack 1g shown in FIG. 25 differs from the battery pack 1e shown in FIG. 21 in the construction of a protection circuit 5g. Specifically, the protection circuit 5g shown in FIG. 25 differs in that a thermistor R5 (detector), a resistor R10 and a reference voltage generator E2 are additionally provided and that an integrated circuit IC1a is provided in place of the integrated circuit IC1.

The thermistor R5 is, for example, a thermistor whose resistance value decreases as temperature increases and used as a temperature sensor. The thermistor R5 is arranged in proximity to a secondary battery 6 or attached thereto with an insulating material held therebetween, and produces a resistance value according to the temperature of the secondary battery 6. A series circuit of the thermistor R5 and the resistor R10 is connected between the opposite electrodes of the reference voltage generator 2, and a connection point of the thermistor R5 and the resistor R10 is connected to a plus terminal of a comparator CMP1.

The reference voltage generator E2 is a constant-voltage generator for outputting a reference voltage used to obtain the resistance value of the thermistor R5 in the form of a voltage. Thus, the resistance value of the thermistor R5, i.e. the temperature of the secondary battery 6 is inputted to the plus terminal of the comparator CMP1. An output voltage of the reference voltage generator E2 is preset, for example, to such a value that a voltage at the connection point of the thermistor R5 and the resistor R10 exceeds a reference voltage Vref1 when the temperature of the secondary battery 6 comes to adversely affect the characteristics of the secondary battery 6. For example, the comparator CMP1, reference voltage generators E1, E2 and the resistor R10 are integrated into the integrated circuit IC1a.

Next, the operation of the protection circuit 5g constructed as above is described. First, an unillustrated charging device is connected with connection terminals T1, T2 with a bimetal switch SW1 turned on and the temperature of the secondary battery 6 rises when the secondary battery 6 is overcharged.

The resistance value of the thermistor R5 decreases as the temperature of the secondary battery 6 increases, whereby the voltage at the connection point of the thermistor R5 and the resistor R10 increases. When the voltage at the connection point of the thermistor R5 and the resistor R10 further increases to exceed the reference voltage Vref1, i.e. the temperature of the secondary battery 6 comes to, for example, adversely affect the characteristics of the secondary battery 6, a transistor Q1 is turned on by the comparator CMP1 and a current flows into a heater R4 from the connection terminal T1 to heat the bimetal switch SW1.

When the temperature of the bimetal switch SW1 reaches an operating temperature Tsw1, the bimetal switch SW1 is turned off to cut off a charge current, thereby protecting the secondary battery 6 from overcharging.

If an excessive discharge current flows because of the connection of an electric device, which becomes an electric load, with the connection terminals T1, T2 or an occurrence of a short-circuit problem with the bimetal switch SW1 turned on, the temperature of the secondary battery 6 increases. If the temperature of the secondary battery 6 increases to, for example, adversely affect the characteristics of the secondary battery 6 as described above before the bimetal switch SW1 is turned off due to the heat generation thereof, the voltage at the connection point of the thermistor R5 and the resistor R10 increases to exceed the reference voltage Vref1, whereby the transistor Q1 is turned on by the comparator CMP1 and a current flows from the secondary battery 6 to the heaters R3, R4 via a connection terminal T3 and a temperature fuse F1 to heat the bimetal switch SW1.

When the temperature of the bimetal switch SW1 reaches the operating temperature Tsw1, the bimetal switch SW1 is turned off to cut off a discharge current, thereby protecting the secondary battery 6 from heat generation caused by excessive discharge current.

Even after the bimetal switch SW1 is turned off, the current flows from the secondary battery 6 into the heaters R3, R4 via the connection terminal T3 and the temperature fuse F1 to heat the bimetal switch SW1, whereby the bimetal switch SW1 is kept off.

In this way, since the discharge current and the charge current can be cut off by one bimetal switch SW1 in the case of the excessive heat generation of the secondary battery 6, the secondary battery 6 can be protected from excessive heat generation caused by overcharging and excessive discharge current using a simple circuit.

Further, there can be suppressed an occurrence of chattering of repeatedly turning the bimetal switch SW1 on and off as in the case where the bimetal switch SW1 is turned on by natural cooling, for example, because the bimetal switch SW1 is turned off and does not generate heat any longer, and the charge current or discharge current of the secondary battery 6 flows into the bimetal switch SW1 again to turn the bimetal switch SW1 off.

Since the other construction and operation are similar to those of the battery pack 1e shown in FIG. 21, they are not described. It should be noted that the thermistor R5 and the integrated circuit IC1a shown in FIG. 25 may be provided in place of the integrated circuit 1 in the battery packs 1 to 1f.

Eighth Embodiment

Figure 26:
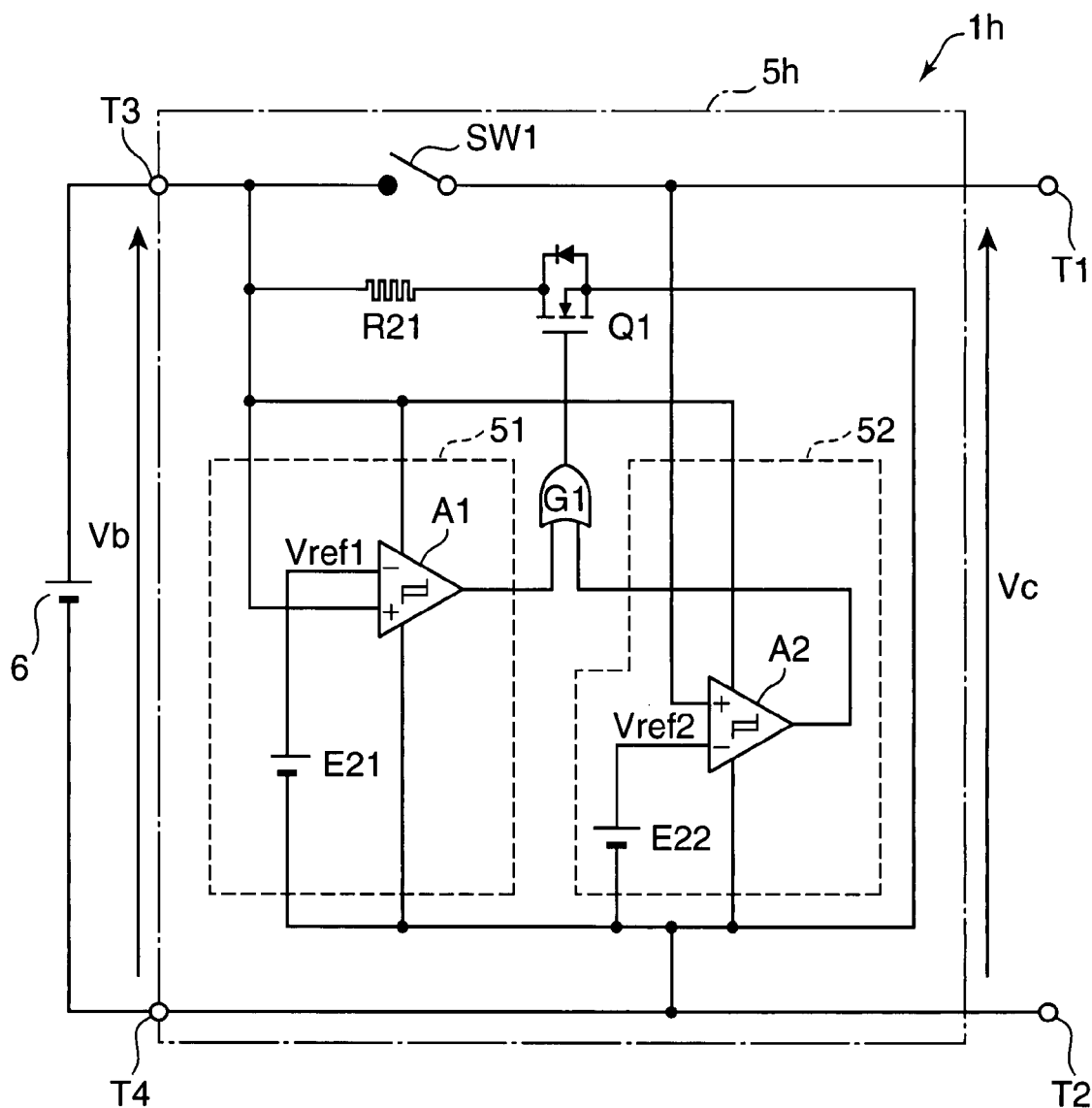
FIG. 26 is a circuit diagram of a battery pack according to an eighth embodiment.

Next, a battery pack provided with a protection circuit according to an eighth embodiment of the present invention is described. The external appearance of a battery pack 1h according to the eighth embodiment of the present invention is similar to that of the battery pack 1 shown in FIG. 1. FIG. 26 is a circuit diagram of the battery pack 1h according to the eighth embodiment of the present invention. The battery pack 1h is provided with a protection circuit 5h and a secondary battery 6. The secondary battery 6 is, for example, a rechargeable secondary battery such as a lithium ion secondary battery, a lithium polymer secondary battery, a nickel-metal-hydride secondary battery or a nickel-cadmium secondary battery. The protection circuit $5h$ is for protecting the secondary battery 6 from overcharging and overcurrent.

The protection circuit $5h$ is installed in an external terminal connecting unit 3 and provided with connection terminals T1 to T4 (first to fourth connection terminals), a bimetal switch (heat-sensitive switch) SW1, an overcharging protector (first overcharging protector) 51, a chattering preventing device (second overcharging protector) 52, a heater R21, a transistor (switching device) Q1, and an OR gate (switching device) G1. The connection terminals T1 and T2 are for the connection of an unillustrated charging device for charging the secondary battery 6 and/or load devices driven by a discharge current from the secondary battery 6. The load devices are various battery-driven electric devices such as a mobile phone, a digital camera, a video camera, a portable personal computer and an electric tool.

The connection terminal T3 is connected to a positive electrode of the secondary battery 6 and the connection terminal T4 is connected to a negative electrode of the secondary battery 6. The bimetal switch SW1 is connected between the connection terminals T1 and T3. The heater R21 has one end thereof connected to the connection terminal T3 and the other end thereof connected to a drain of the transistor Q1. A gate of the transistor Q1 is connected to an output terminal of the OR gate G1, and a source thereof is connected to the connection terminals T2, T4.

The overcharging preventing device 51 includes a comparator A1 and a reference voltage generator E21, and the chattering preventing device 52 includes a comparator A2 and a reference voltage generator E22. A minus terminal of the comparator A1 is connected with a positive electrode of the reference voltage generator E21, a plus terminal thereof is connected to the connection terminal T3, an output terminal thereof is connected to an input terminal of the OR gate G1, a power supply terminal thereof is connected to the connection terminal T3 and a ground terminal thereof is connected to the connection terminals T2, T4. A negative electrode of the reference voltage generator E21 is connected to the connection terminals T2, T4.

A plus terminal of the comparator A2 is connected with the connection terminal T1, a minus terminal thereof is connected to a positive electrode of the reference voltage generator E22, an output terminal thereof is connected to an input terminal of the OR gate G1, a power supply terminal thereof is connected to the connection terminal T3 and a ground terminal thereof is connected to the connection terminals T2, T4. A negative electrode of the reference voltage generator E22 is connected to the connection terminals T2, T4.

The bimetal switch SW1 is a heat-sensitive switch that is turned off if temperature exceeds a specified operating temperature Tsw1 set beforehand, and a maximum temperature of such a temperature range as not to degrade the characteristics of the secondary battery 6 is, for example, set as the operating temperature Tsw1.

The bimetal switch SW1 is a return-type heat-sensitive switch that is turned on again if temperature decreases after being turned off due to a temperature increase. Instead of the bimetal switch, a switch using a shape-memory alloy (e.g. those disclosed in Japanese Examined Utility Model Publication No. H07-4770 and Japanese Unexamined Patent Publication No. H11-224579) or a switch using a shape-memory resin can be similarly used as the heat-sensitive switch.

Any shape-memory alloy such as a nickel-titanium alloy or a copper-zinc-aluminum alloy will do provided that it has a restoring force resulting from the thermoelastic martensitic transformation and reverse transformation. Shape change temperature ranges within which these alloys change their shapes from the transformed shapes to the restored shapes can be changed by suitably choosing the composition of the shape-memory alloy or by changing a heating process.

A polyester, a polyurethane, a styrene butadiene, a transpolyisoprene and like resins in which cross-linked or partially crystallized stationary phase and reversible phase are mixedly present can be used as the shape-memory resin.

A PTC (Positive Temperature Coefficient) thermistor having a positive temperature characteristic, i.e. whose resistance value increases and decreases with temperature is used as the heater R1. Thus, if a voltage is applied to the heater R21, the resistance value of the heater R21 increases due to the heat generation of the heater R21 itself, thereby decreasing a current flowing through the heater R21, with the result that the temperature of the heater R21 finally stabilizes at a finally attained temperature. The finally attained temperature is set at such a temperature that is above the operating temperature Tsw1 of the bimetal switch SW1 and does not damage the secondary battery 6 and the protection circuit $5h$. This can suppress the damage of the secondary battery 6 and the protection circuit $5h$ due to the heat generation of the heater R21.

The overcharging preventing device 51 detects the overcharging of the secondary battery 6 and causes the charge current to the secondary battery 6 to cut off, thereby setting the secondary battery 6 in an overcharging protecting state. The chattering preventing device 52 prevents the chattering of the bimetal switch SW1 that occurs in the overcharging protecting state.

The reference voltage generator E21 is a voltage generating circuit for outputting a reference voltage (overcharging protecting voltage) Vref1 that serves as a judgment standard for detecting the overcharging of the secondary battery 6. The reference voltage generator E22 is a voltage generating circuit for outputting a reference voltage (overcharging protecting voltage) Vref2 used to prevent the chattering of the bimetal switch SW1.

In this embodiment, the reference voltages Vref1, Vref2 are substantially equal to each other. Specifically, reference voltage Vref1=reference voltage Vref2=4.3 V.

The comparator A1 has the reference voltage Vref1 applied to the minus terminal thereof, and outputs a high-level signal if a voltage between the connection terminals T3 and T4, i.e. a voltage Vb of the secondary battery 6 exceeds the reference voltage Vref1 while outputting a low-level signal if the voltage Vb is equal to or below the reference voltage Vref1.

The comparator A2 has the reference voltage Vref2 applied to the minus terminal thereof, and outputs a high-level signal if a voltage between the connection terminals T1 and T2, i.e. a voltage Vc of a charging device or a load device connected with the connection terminals T1, T2 exceeds the reference voltage Vref2 while outputting a low-level signal if the voltage Vc is equal to or below the reference voltage Vref2.

In this embodiment, comparators whose input voltages have a hysteresis characteristic are employed as the comparators A1, A2 to reduce the influence of noise.

The OR gate G1 outputs a high-level signal to the gate of the transistor Q1 if the high-level signal is outputted from either one of the comparators A1, A2 while outputting a low-level signal to the gate of the transistor Q1 if the low-level signal is outputted from the both comparators.

An n-channel FET (field-effect transistor) is employed as the transistor Q1, which is turned on to energize and heat the heater R21, thereby turning the bimetal switch SW1 off if the high-level signal is outputted from the OR gate G1 while being turned off to deenergize the heater R21 to stop heating the heater R21, thereby turning the bimetal switch SW1 on if the low-level signal is outputted from the OR gate G1.

Next, the operation of the protection circuit 5*h* is described. First, an overcharging protecting operation of the protection circuit 5*h* is described. When an unillustrated charging device is connected with the connection terminals T1, T2 and the voltage Vc is applied between the connection terminals T1 and T2 from the charging device, the bimetal switch SW1 is turned on to charge the secondary battery 6 in a normal state where the voltages Vc, Vb are both equal to or below the reference voltages Vref1, Vref2. Here, the voltage Vc is normally up to, for example, 4.2 V.

If the voltage control is not possible any longer, for example, due to the breakdown of the unillustrated charging device, the voltage Vb exceeds the reference voltage Vref1. Then, the high-level signal is outputted form the comparator A1 and the high-level signal is outputted from the OR gate G1 to turn the transistor Q1 on, whereby a current flows into the heater R21 from the connection terminal T3 to heat the bimetal switch SW1. When the temperature of the bimetal switch SW1 reaches the operating temperature Tsw1, the bimetal switch SW1 is turned off to cut off the charging voltage to enter the overcharging protecting state. In this way, the secondary battery is protected from overcharging.

If the electric power of the secondary battery 6 is consumed by the heater R21 in the overcharging protecting state, the voltage Vb falls and the output of the comparator A1 becomes low level. Here, a case where the chattering preventing device 52 is absent is assumed. Then, the transistor Q1 is turned off to flow no current into the heater R21, and the bimetal switch SW1 stops being heated. When the bimetal switch SW1 is naturally cooled and the temperature thereof falls to or below the operating temperature Tsw1, the bimetal switch SW1 is turned on again to flow the charge current from the charging device to charge the secondary battery 6 again. If the charging of the secondary battery 6 is continued, the voltage Vb exceeds the reference voltage Vref1 and the bimetal switch SW1 is turned off again. Thus, chattering occurs if the charging device is kept connected between the connection terminals T1, T2 in the overcharging protecting state.

However, the protection circuit 5*h* of this embodiment includes the chattering preventing device 52. Thus, even if the charging device is kept connected between the connection terminals T1, T2 in the overcharging protecting state and the voltage Vc exceeds the reference voltage Vref2, the high-level signal is outputted from the comparator A2 and the high-level signal is outputted from the OR gate G1 to turn the transistor Q1 on, whereby a current flows into the heater R1 from the connection terminal T3 to continuously heat the bimetal switch SW1 and keep it off. In this way, the chattering of the bimetal switch SW1 that occurs when the charging device is kept connected in the overcharging protecting state can be prevented.

Next, protection from overcurrent by the protection circuit 5*h* is described. First, when the connection terminals T1, T2 are short-circuited or a resistance value between the connection terminals T1 and T2 becomes low with the bimetal switch SW1 turned on, for example, because a metal piece touches the connection terminals T1, T2 or an unillustrated mobile phone or like load device connected with the connection terminals T1, T2 breaks down, an overcurrent flows from the secondary battery 6 via the bimetal switch SW1. The bimetal switch SW1 is heated by the contact resistance if the overcurrent flows.

When the temperature of the bimetal switch SW1 reaches the operating temperature Tsw1, the bimetal switch SW1 is turned off to cut off the discharge current of the secondary battery 6, whereby the protection circuit 5*h* enters the overcurrent protecting state to protect the secondary battery 6 from overcurrent. When the overcurrent protecting state continues, the bimetal switch SW1 is naturally cooled since the outputs of the comparators A1, A2 are both at low level and the heating of the heater R21 is stopped. The bimetal switch SW1 is turned on again when the temperature thereof falls to or below the operating temperature Tsw1, whereby the protection circuit 5*h* returns from the overcurrent protecting state to the normal state.

As described above, according to the protection circuit 5*h* according to the eighth embodiment, since the secondary battery 6 can be protected from overcharging and overcurrent using the bimetal switch SW1 that is a heat-sensitive switch, the FET 1006 for cutting off the discharge current, the FET 1007 for cutting off the charge current, the reference voltage generator 1009 for detecting the overcurrent, the comparator 1011, the resistor 1112 and the logic circuit 1013 for on-off controlling the two FETs 1006, 1007 are not necessary unlike the protection circuit 1002 according to background art shown in FIG. 51, wherefore the circuitry of the protection circuit 5*h* can be simplified and the protection circuit 5*h* can be easily miniaturized.

Further, since overcharging is detected by the comparator A1 and the bimetal switch SW1 is heated by the heater R21 to be turned off in this case, accuracy in detecting overcharging can be improved as compared, for example, to the case where protection from overcharging is carried out only by the bimetal switch SW1 or the PTC element 1032 connected in series with the secondary battery 1022 as shown in FIGS. 52 and 53. Therefore, likelihood of overcharging the secondary battery 6 without performing the overcharging protection, degrading the characteristics of the secondary battery 6 or causing the expansion or deformation of the secondary battery 6 can be reduced.

Further, since the chattering preventing device 52 is provided, transistor Q1 is kept on even if the charging device is kept connected in the overcharging protecting state, the voltage Vc between the connection terminals T1 and T2 exceeds the reference voltage Vref2 and the voltage Vb falls to or below the reference voltage Vref1. Thus, the heating of the bimetal switch SW1 is continued and the bimetal switch SW1 is kept off, with the result that the chattering of the bimetal switch SW1 can be prevented to prevent the degradation of the bimetal switch SW1.

Although the heater R21 is used in the eighth embodiment, the present invention is not limited thereto. The overcharging preventing device 51, the chattering preventing device 52, the OR gate G1 and the transistor Q1 may be integrated into an integrated circuit and the bimetal switch SW1 may be heated utilizing the heat of the integrated circuit generated mainly when the transistor Q1 is turned on. In this case, the heater R21 is unnecessary and the number of parts can be reduced.

Ninth Embodiment

Figure 27:
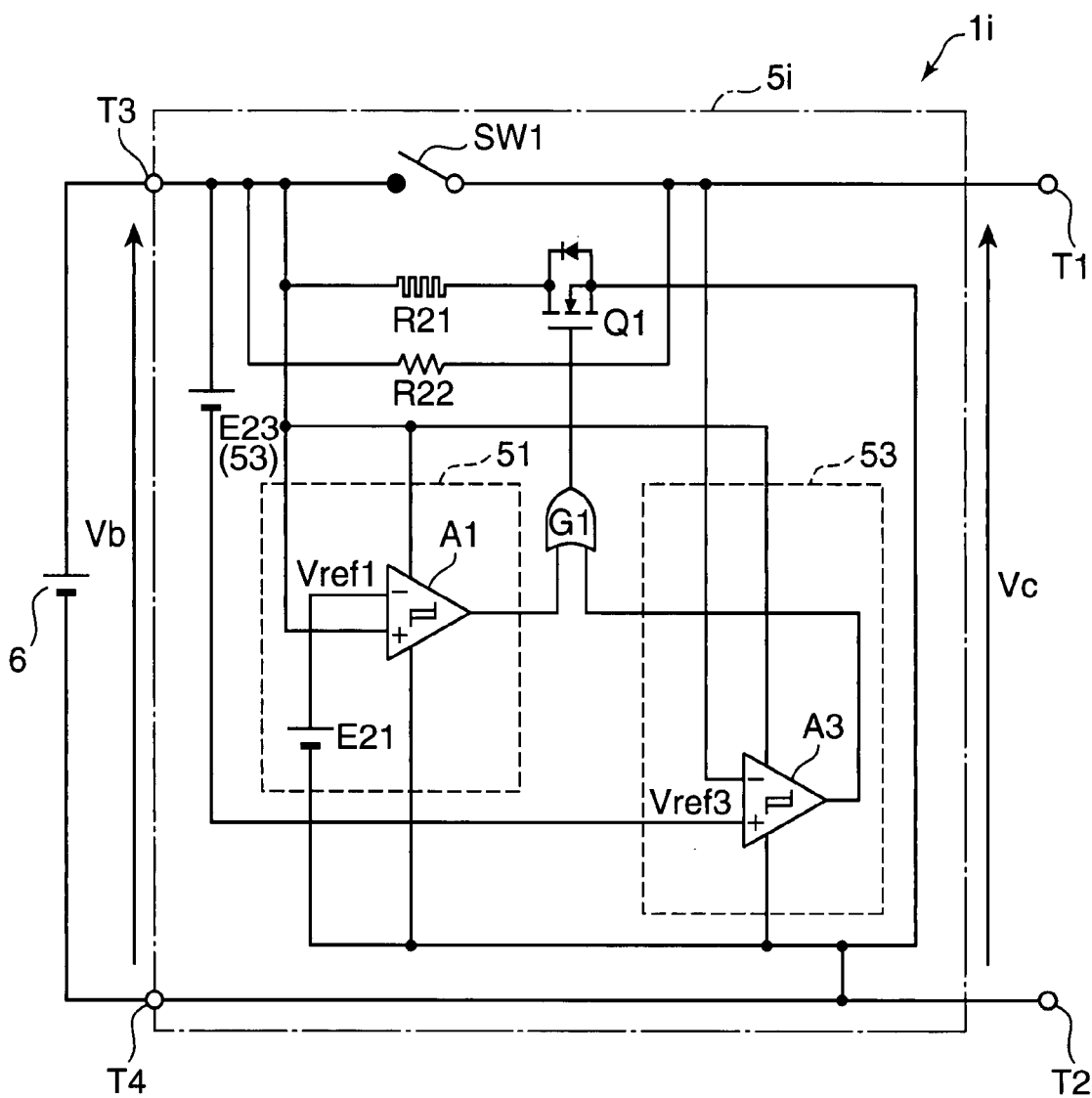
FIG. 27 is a circuit diagram of a battery pack according to a ninth embodiment.

Next, a battery pack according to a ninth embodiment of the present invention is described. The external appearance of a battery pack 1*i* according to the ninth embodiment of the present invention is similar to that of the battery pack 1 shown in FIG. 1. FIG. 27 is a circuit diagram of the battery pack 1*i* according to the ninth embodiment of the present invention. The battery pack 1*i* is characterized by omitting the chattering preventing device 52 from and adding a short-circuit preventing device 53 and a resistor R22 to the protection circuit 5*h* according to the eighth embodiment. The same elements of the ninth embodiment as those of the eighth embodiment are identified by the same reference numerals and are not described.

The short-circuit preventing device 53 is comprised of a comparator A3 and a reference voltage generator E23. A minus terminal of the comparator A3 is connected with a connection terminal T1, a plus terminal thereof is connected to the reference voltage generator E23, an output terminal thereof is connected to an input terminal of an OR gate G1, a power supply terminal thereof is connected to a connection terminal T3 and a ground terminal thereof is connected to connection terminals T2, T4.

A positive electrode of the reference voltage generator E23 is connected to the connection terminal T3, and a negative electrode thereof is connected to the plus terminal of the comparator A3. The resistor R22 is connected in parallel with a bimetal switch SW1.

The comparator A3 detects whether or not a voltage Vb of a secondary battery 6 exceeds a sum of a voltage Vc between the connection terminals T1 and T2 and a reference voltage Vref3, judges that such a load as to cause an overcurrent is connected with the connection terminals T1, T2 or the connection terminals T1, T2 are short-circuited in an overcurrent protecting state if the voltage Vb exceeds the sum of the reference voltage (overcurrent protection voltage) Vref3 and the voltage Vc (Vb>Vref3+Vc), and outputs a high-level signal. It should be noted that the comparator A3 is a comparator whose input voltage has a hysteresis characteristic similar to the comparators A1, A2. In the ninth embodiment, 1 V is set as the reference voltage Vref3. In other words, if a difference calculated by subtracting the voltage Va from the voltage Vb exceeds 1 V, it is judged that such a load as to cause an overcurrent is connected with the connection terminals T1, T2 or the connection terminals T1, T2 are short-circuited in an overcurrent protecting state.

Next, a short-circuit protecting operation in the overcurrent protecting state by the protection circuit 5i is described. Since the process up to the overcurrent protecting state is the same as with the protection circuit 5 of the first embodiment, it is not described. A case where the short-circuit preventing device 53 is absent in the overcurrent protecting state is assumed. In this case, since no current flows through the bimetal switch SW1 and the heating by the heater R22 is stopped, the bimetal switch SW1 is naturally cooled and turned on when the temperature thereof falls to or below an operating temperature Tsw1. Here, if the connection terminals T1, T2 are kept short-circuited with each other, an overcurrent from the secondary battery 6 flows into the bimetal switch SW1, thereby turning the bimetal switch SW1 off again. The bimetal switch SW1 is turned on again after natural cooling in its off-state.

In this way, the bimetal switch SW1 is repeatedly turned on and off to chatter if the connection terminals T1, T2 are kept short-circuited in the overcurrent protecting state.

However, the protection circuit 5i of this embodiment includes the short-circuit preventing device 53. Thus, if the connection terminals T1, T2 are kept short-circuited in the overcurrent protecting state, a high-level signal is outputted from the comparator A3 to turn the transistor Q1 on, the resistor R1 is kept heated and the bimetal switch SW1 is kept heated and kept off since the voltage Vb exceeds the sum of the voltage Vc and the reference voltage Vref3 in the overcurrent protecting state. In this way, the chattering of the bimetal switch SW1 caused by the connection terminals T1, T2 being kept short-circuited in the overcurrent protecting state can be prevented, and the flow of an overcurrent when the bimetal switch SW1 is turned on by the chattering can be prevented.

When the short circuit between the connection terminals T1 and T2 is removed, a minute electric current flows from the secondary battery 6 to the connection terminal T1 via the resistor R22. At this time, since no load is connected between the connection terminals T1 and T2, the voltages Vc, Vb take substantially the same value, whereby the difference between the voltages Vb and Vc decreases to or below the reference voltage Vref3. Thus, the comparator A3 outputs a low-level signal. At this time, since the comparator A1 is also outputting a low-level signal, the transistor Q1 is turned off and the heating of the bimetal switch SW1 is stopped. The bimetal switch SW1 is turned on again if the temperature thereof falls to or below the operating temperature Tsw1 by natural cooling, whereby the protection circuit 5i quickly returns from the overcurrent protecting state to the normal state. It should be noted that protection from overcharging by the overcharging preventing device 51 is not described since being similar to that of the eighth embodiment.

As described above, according to the protection circuit 5i of the ninth embodiment, the secondary battery 6 can be protected from overcharging and overcurrent similar to the protection circuit 5h of the eighth embodiment and, in addition, the occurrence of the chattering in the overcurrent protecting state can be prevented since the short-circuit preventing device 53 is provided. Therefore, the degradation of the bimetal switch SW1 can be prevented.

Although the heater R1 is used in the ninth embodiment, the present invention is not limited thereto. The overcharging preventing device 51, the short-circuit preventing device 53, the OR gate G1, the transistor Q1 and the resistor R22 may be integrated into an integrated circuit and the bimetal switch SW1 may be heated utilizing the heat of the integrated circuit generated mainly when the transistor Q1 is turned on. In this case, the heater R21 is unnecessary and the number of parts can be reduced.

Tenth Embodiment

Figure 28:
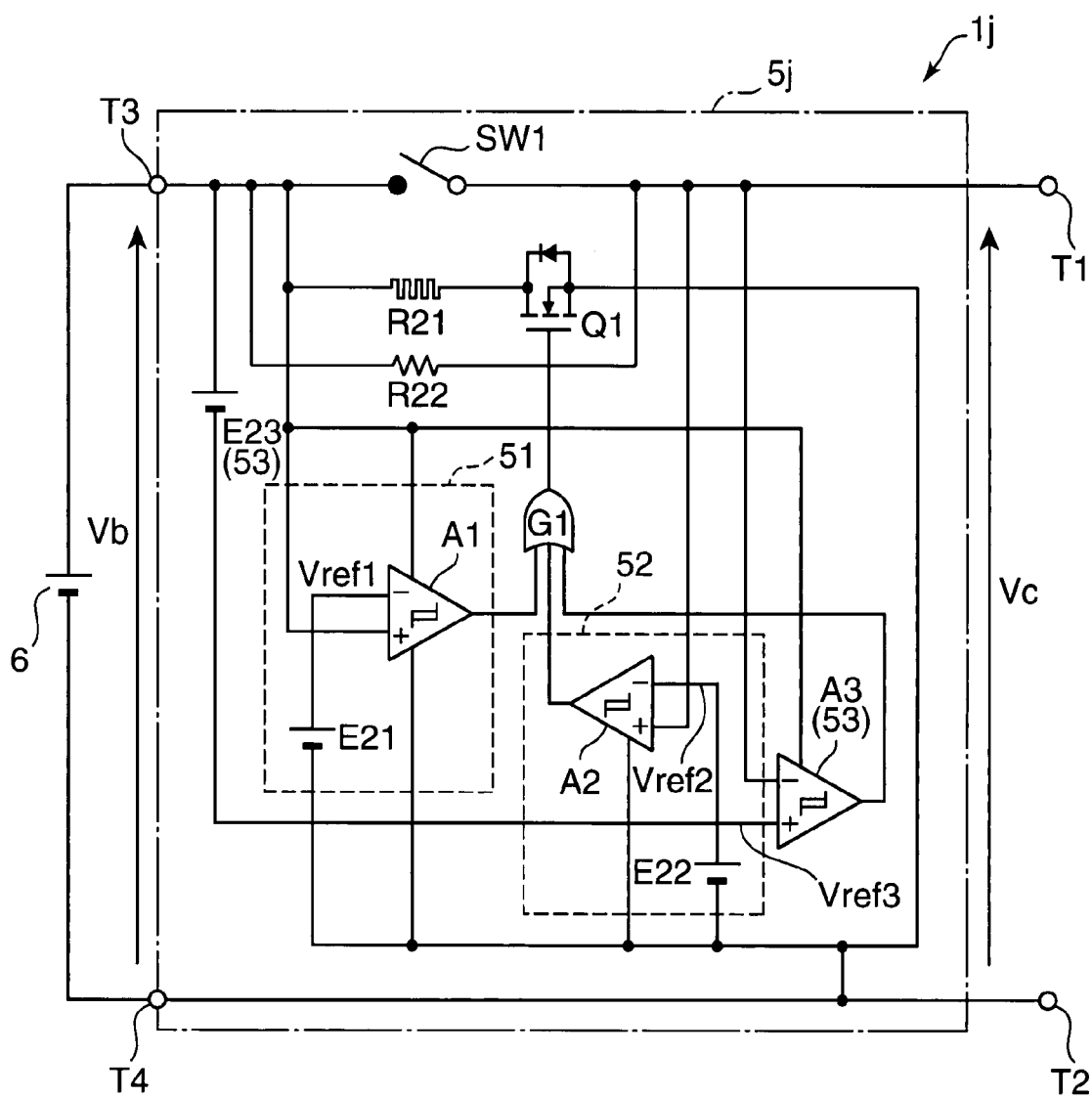
FIG. 28 is a circuit diagram of a battery pack according to a tenth embodiment.

Next, a battery pack according to a tenth embodiment of the present invention is described. The external appearance of a battery pack 1j according to the tenth embodiment of the present invention is similar to that of the battery pack 1 shown in FIG. 1. FIG. 28 is a circuit diagram of the battery pack 1j according to the tenth embodiment of the present invention. A protection circuit 5j of the tenth embodiment is constructed by additionally providing a short-circuit preventing device 53 in the protection circuit 5h of the eighth embodiment, i.e. is characterized by including both chattering preventing device 52 and short-circuit preventing device 53.

Since comparators A1 to A3 are connected to an OR gate G1, a transistor Q1 is turned on, a heater R21 generates heat and a bimetal switch SW1 is turned off if a high-level signal is outputted from any one of the comparators A1 to A3.

In this way, according to the protection circuit 5j of the tenth embodiment, in addition to the same effects as the eighth embodiment since the overcharging preventing device 51 and the chattering preventing device 52 are provided, the same effects as the ninth embodiment can be obtained since the short-circuit preventing device 53 is provided.

Although the heater R21 is used in the tenth embodiment, the present invention is not limited thereto. The overcharging preventing device 51, the chattering preventing device 52, the short-circuit preventing device 53, the OR gate G1, the transistor Q1 and the resistor R22 may be integrated into an integrated circuit and the bimetal switch SW1 may be heated utilizing the heat of the integrated circuit generated mainly when the transistor Q1 is turned on. In this case, the heater R21 is unnecessary and the number of parts can be reduced.

Eleventh Embodiment

Figure 29:
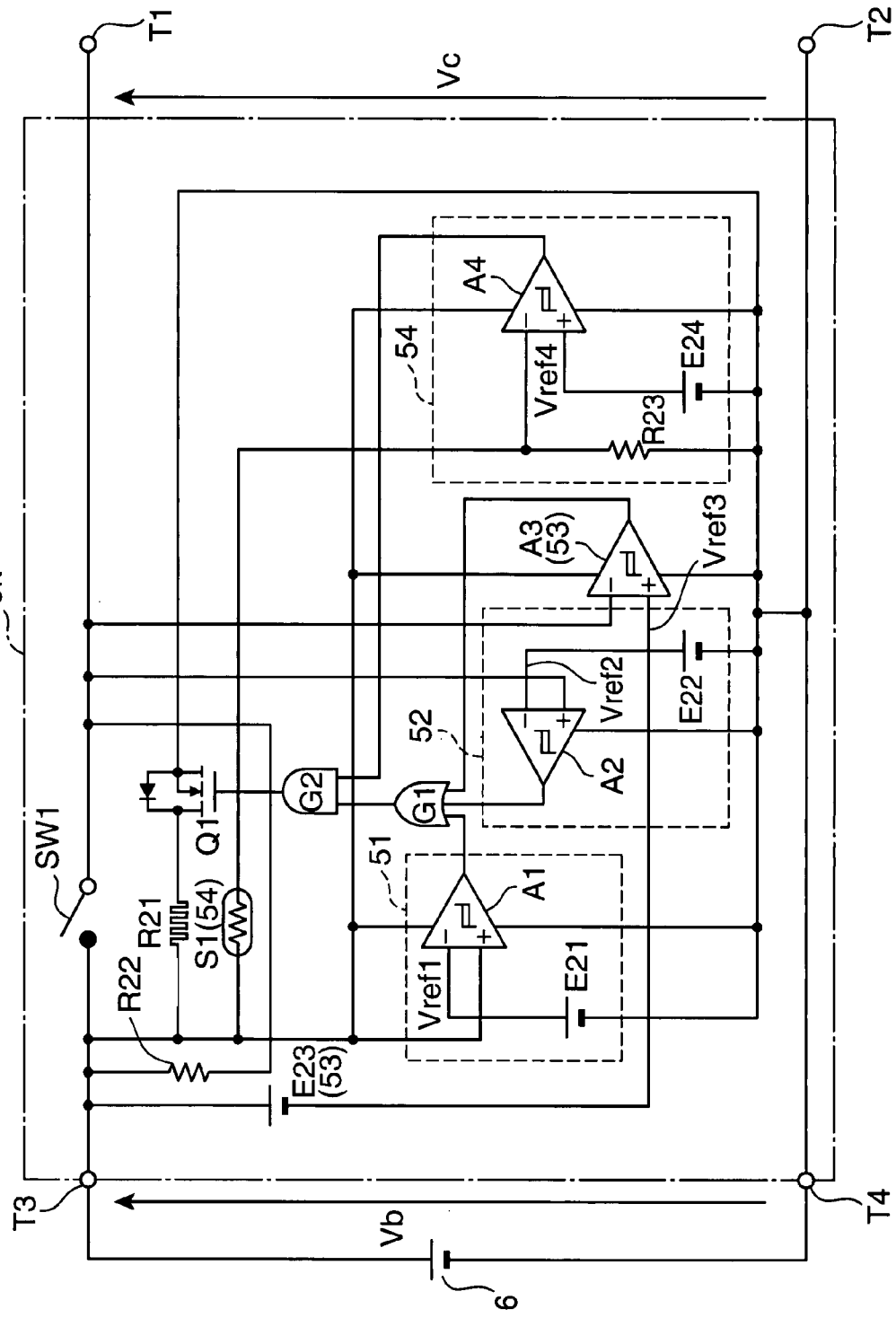
FIG. 29 is a circuit diagram of a battery pack according to an eleventh embodiment.

Next, a battery pack according to an eleventh embodiment is described. The external appearance of a battery pack $1k$ according to the eleventh embodiment of the present invention is similar to that of the battery pack 1 shown in FIG. 1. FIG. 29 is a circuit diagram of the battery pack $1k$ according to the eleventh embodiment of the present invention. The battery pack $1k$ is characterized by additionally including a temperature controller 54 and an AND gate G2 in the battery pack $5j$ according to the tenth embodiment. The temperature controller 54 includes a temperature sensor S1, a comparator A4, a resistor R23 and a reference voltage generator E24.

A minus terminal of the comparator A4 is connected to a connection terminal T3 via the temperature sensor S1, a plus terminal thereof is connected to a positive electrode of the reference voltage generator E24, an output terminal thereof is connected to an input terminal of the AND gate G2, a power supply terminal thereof is connected to the connection terminal T3, and a ground terminal thereof is connected to connection terminals T2, T4. One end of the resistor R23 is connected to the connection terminals T2, T4 and the other end thereof is connected to the minus terminal of the comparator A4. A negative electrode of the reference voltage generator E24 is connected to the connection terminals T2, T4. Further, an output terminal of an OR gate G1 is connected to the AND gate G2.

A thermistor having a negative characteristic is employed as the temperature sensor S1, so that the resistance thereof decreases as the temperature of a heater R21 increases. The reference voltage generator E24 is a voltage generating circuit for outputting a reference voltage Vref4 to detect a specified upper limit temperature of the heater R21. This upper limit temperature is higher than an operating temperature Tsw1 of a bimetal switch SW1. Here, the reference voltage Vref4 is set at such a value that a voltage at the plus terminal of the comparator A4 falls to or below a voltage at the minus terminal thereof when the temperature of the heater R21 exceeds the above upper limit temp.

The comparator A4 outputs a low-level signal to turn the transistor Q1 off if the temperature of the bimetal switch SW1 exceeds the upper limit temperature and the voltage at the minus terminal becomes higher than the one at the plus terminal. It should be noted that a comparator having a hysteresis characteristic is employed as the comparator A4 similar to the comparators A1 to A3.

Next, a temperature protecting operation of the protection circuit $5k$ is described. If the voltage control is not possible any longer, for example, due to the breakdown of an unillustrated charging device, a voltage Vb exceeds a reference voltage Vref1. Then, a high-level signal is outputted form the comparator A1 and a high-level signal is outputted from the OR gate G1. At this time, a high-level signal is outputted from the comparator A4 since the temperature of the bimetal switch SW1 has not yet reached the upper limit temperature.

Thus, a high-level signal is outputted from the AND gate G2 to turn the transistor Q1 on, whereby a current flows from the connection terminal T3 into the heater R21 to heat the bimetal switch SW1. When the temperature of the bimetal switch SW1 reaches the operating temperature Tsw1, the bimetal switch SW1 is turned off to cut off a charge current, thereby setting an overcharging protecting state.

If the overcharging protecting state continues, the temperature of the heater R21 further increases and, accordingly, the resistance of the temperature sensor S1 decreases. When the heater R21 reaches the upper limit temperature in due course, the comparator A4 outputs a low-level signal to turn the transistor Q1 off, whereby the heater R21 stops generating heat. In this way, the bimetal switch SW1 can be prevented from being heated to or above the upper limit temperature and the melting of the contact thereof can be prevented.

As described above, according to the protection circuit $5k$ of the eleventh embodiment, the melting of the contact of the bimetal switch SW1 can be prevented in addition to the effects of the protection circuit $5j$ of the tenth embodiment.

Although the heater R21 is used in the eleventh embodiment, the present invention is not limited thereto. The overcharging preventing device 51, the chattering preventing device 52, the short-circuit preventing device 53, the temperature controller 54, the OR gate G1, the AND gate G2, the transistor Q1, the resistor R22 and the temperature sensor S1 may be integrated into an integrated circuit and the bimetal switch SW1 may be heated utilizing the heat of the integrated circuit generated mainly when the transistor Q1 is turned on. In this case, the heater R21 is unnecessary and the number of parts can be reduced.

Twelfth Embodiment

Figure 30:
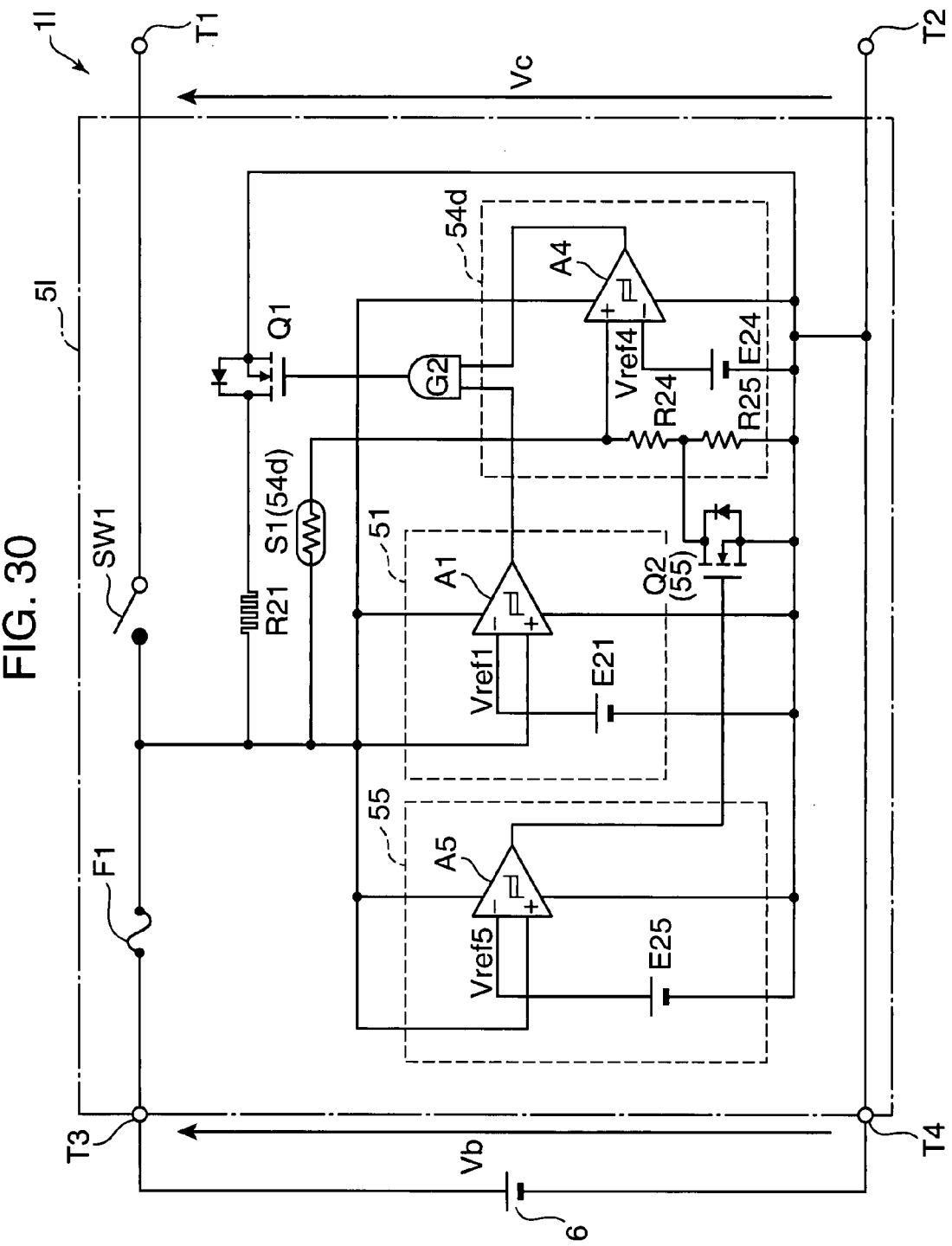
FIG. 30 is a circuit diagram of a battery pack according to a twelfth embodiment.

Next, a battery pack according to a twelfth embodiment is described. The external appearance of a battery pack $1l$ according to the twelfth embodiment of the present invention is similar to that of the battery pack 1 shown in FIG. 1. FIG. 30 is a circuit diagram of the battery pack $1l$ according to the twelfth embodiment of the present invention. The battery pack $1l$ according to the twelfth embodiment is characterized by omitting the chattering preventing device 52, employing an AND gate G2 instead of the OR gate G1, and adding a temperature fuse F1, a temperature controller $54d$ and an upper limit temperature changer 55 in the protection circuit $5h$ of the eighth embodiment.

The temperature controller $54d$ differs from that of the eleventh embodiment in that two resistors R24, R25 connected in series are provided instead of the resistor R23, and stops energizing a heater R21 if the heater R21 reaches an upper limit temperature. The upper limit temperature changer 55 includes a comparator A5, a reference voltage generator E25, and a transistor Q2 for changing the upper limit temperature of the heater R21. The resistors R24, R25 are set such that a sum of the resistance values thereof is equal to the resistance value of the resistor R23 of the protection circuit $5k$.

A plus terminal and a power supply terminal of the comparator A5 are connected to a connection terminal T3 via the temperature fuse F1, a minus terminal thereof is connected to a positive electrode of the reference voltage generator E25, an output terminal thereof is connected to a gate of a transistor Q2, and a ground terminal thereof is connected to connection terminals T2, T4. A negative electrode of the reference voltage generator E25 is connected to the connection terminals T2, T4. The transistor Q2 is an n-channel FET and is connected in parallel with the resistor R25.

The reference voltage generator E25 applies a reference voltage (second overcharging protection voltage) Vref5 to the minus terminal of the comparator A5. In the twelfth embodiment, the reference voltage Vref5 is set at a value larger than a reference voltage Vref1. The comparator A5 employed is a comparator having a hysteresis characteristic similar to the comparators A1 to A4.

A temperature fuse F1 is not described since having the same construction as the temperature fuse F1 of the first embodiment.

Next, the operation of the protection circuit 5*l* is described. First, it is assumed that the protection circuit 5*l* is in an overcharging protecting state in the same way as the protection circuit 5*k* is. If the overcharging protecting state continues, the temperature of the heater R21 further increases and, accordingly, the resistance of a temperature sensor S1 decreases and the heater R21 reaches the upper limit temperature Th of the bimetal switch SW1 in due course. Then, the comparator A4 outputs a low-level signal to turn a transistor Q1 off, whereby the heater R21 stops generating heat. In this way, the bimetal switch SW1 can be prevented from being heated to or above the upper limit temperature Th and the melting of the contact thereof can be prevented.

Next, a temperature protecting operation of the protection circuit 5*l* in the case where the contact of the bimetal switch SW1 is melted is described. Even if the overcharging protecting state continues and the upper limit temperature Th of the heater R21 is reached, the bimetal switch SW1 is not turned off since the contact thereof is melted, whereby the secondary battery 6 continues to be charged. When a voltage Vb exceeds the reference voltage Vref5 (>Vref1), the comparator A5 outputs a high-level signal to turn the transistor Q2 on. In this way, the resistor R25 is short-circuited, a voltage at the minus terminal of the comparator A4 falls to or below a reference voltage Vref4 and the comparator A4 outputs a high-level signal. At this time, since the voltage Vb is above the reference voltage Vref1, the comparator A1 is outputting a high-level signal. As a result, the transistor Q1 is turned on and the heater R21 generates heat to heat the bimetal switch SW1 again. Thus, the upper limit temperature of the heater R21 becomes higher than an operating temperature Tfuse1 of the temperature fuse F1. When the temperature of the temperature fuse F1 increases to exceed the operating temperature Tfuse1, the temperature fuse F1 melts to stop the charging of the secondary battery 6.

Since the temperature controller 54*d* is provided in the protection circuit 5*l* of the twelfth embodiment as described above, the temperature range within which the heater R21 heats the bimetal switch SW1 is defined to be higher than an operating temperature Tsw1 and equal to or lower than the operating temperature Tfuse1. Thus, the melting of the contact of the bimetal switch SW1 can be prevented. Further, since the upper limit temperature changer 55 is provided, the transistor Q2 is turned on and the upper limit temperature of the heater R21 becomes higher than the operating temperature Tfuse1 when the contact of the bimetal switch SW1 is melted to continue the overcharging of the secondary battery 6 and the voltage Vb exceeds the reference voltage Vref5. Thus, the temperature of the heater R21 further increases to reach the operating temperature Tfuse1, thereby melting the temperature fuse F1. Therefore, the secondary battery 6 can be protected from overcharging even if the contact of the bimetal switch SW1 is melted.

Although the heater R21 is used in the twelfth embodiment, the present invention is not limited thereto. The overcharging preventing device 51, the temperature controller 54*d*, the upper limit temperature changer 55, the AND gate G2, the transistor Q1 and the temperature sensor S1 may be integrated into an integrated circuit and the bimetal switch SW1 may be heated utilizing the heat of the integrated circuit generated mainly when the transistor Q1 is turned on. In this case, the heater R21 is unnecessary and the number of parts can be reduced. In this case, it is preferable to construct the battery pack 1*l* as shown in FIGS. 33 to 36.

Figure 33A:
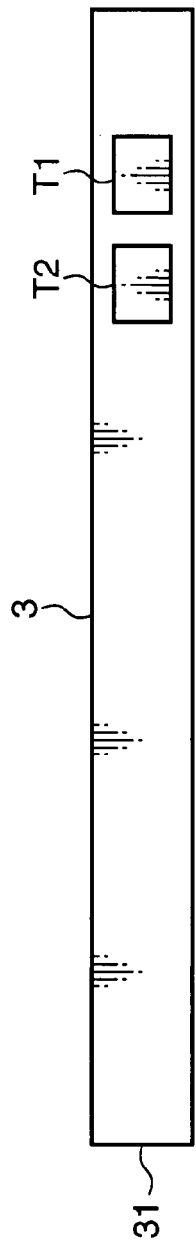
Figure 33B:
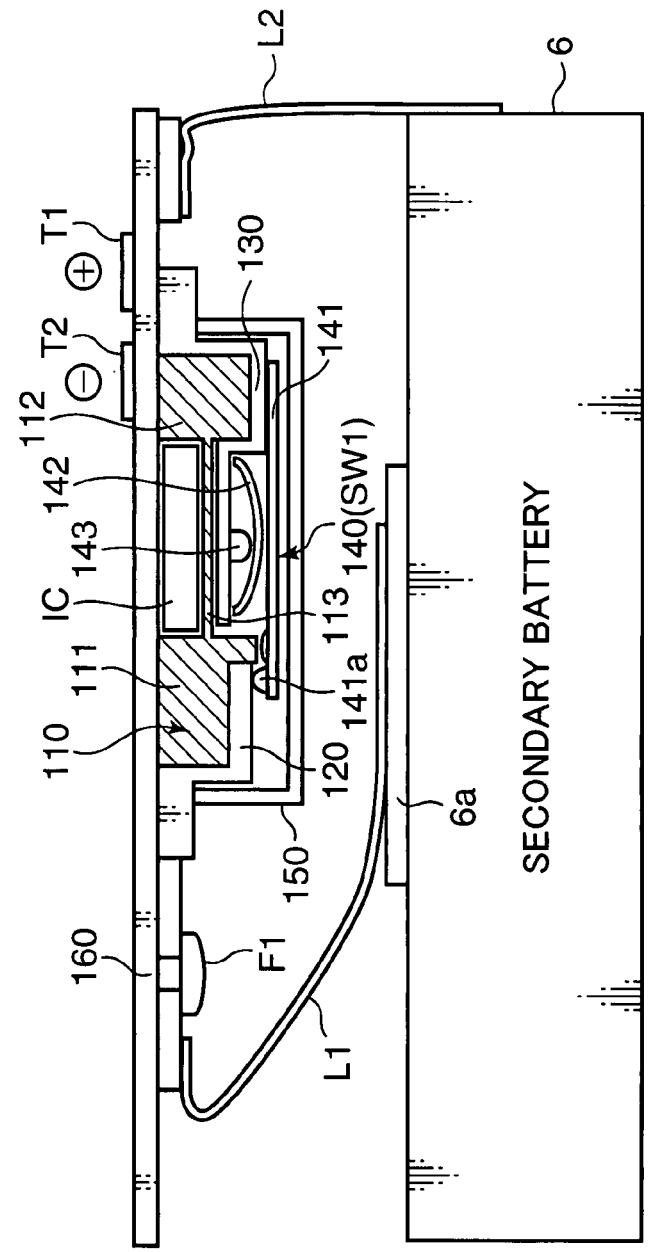

FIGS. 33 to 36 are exploded construction diagrams of the battery pack 1*l* in the case where the protection circuit 5*l* of the twelfth embodiment is an integrated circuit, wherein FIGS. 33A to 36A are top views and FIGS. 33B to 36B are side views. As shown in FIG. 33B, the battery pack 1*l* is provided with a frame body 110 integrally formed of an insulating material such as synthetic resin or ceramic, a first wiring conductor 120 formed of, e.g. a sheet metal, a second wiring conductor 130 formed of, e.g. a sheet metal, a bimetal switch 140 (SW1), a cover body 150 for covering the bimetal switch 140, and a wiring board 160.

The frame member 110 includes a first supporting member 111, a second supporting member 112 opposed at a specified distance to the first supporting member 111, and a coupling member 113 for coupling the first and second supporting members 111, 112. Space is defined between the wiring board 160 and the coupling member 113, and an integrated circuit IC is arranged in this space.

The first wiring conductor 120 is arranged on the first supporting member 111. The second wiring conductor 130 is arranged on the second supporting member 112. It should be noted that the second wiring conductor 130 extends up to the top surface of the coupling member 113.

The bimetal switch 140 includes a movable contact member 141, a bimetal element 142, and a projection 143. The movable contact member 141 has an elongated shape straddling between the first and second wiring conductors 120 and 130, a contact 141*a* projecting upward is provided at the left end, and the right end thereof is fixed onto the second wiring conductor 130. The bimetal element 142 has an elongated shape curved toward the movable contact member 141 in its middle part, and is curved toward the movable contact member 141 when being heated. The projection 143 prevents the deformation of the bimetal element 142 caused by an external force.

The contact 141*a* moves away from the first wiring conductor 120 when the movable contact member 141 receives a downward acting force from the bimetal element 142, whereby the bimetal switch 140 is turned off. On the other hand, the contact 141*a* is in contact with the first wiring conductor 120 when the movable contact member 141 receives no downward acting force from the bimetal element 142, whereby the bimetal switch 140 is turned on.

Connection terminals T1, T2 are arranged on the upper surface of the wiring board 160. A temperature fuse F1 is arranged at the left side of the first wiring conductor 120. The temperature fuse F1 and a positive electrode terminal 6*a* of a secondary battery 6 are electrically connected via a connection wiring L1. Further, a connection wiring L2 for grounding the connection terminal T2 is mounted at the right end of the wiring board 160.

Figure 34A:
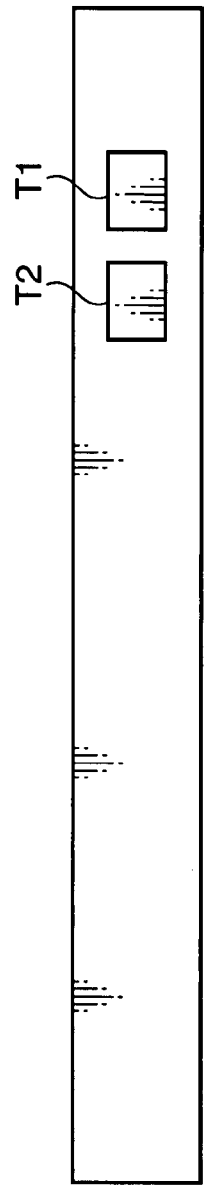
Figure 34B:
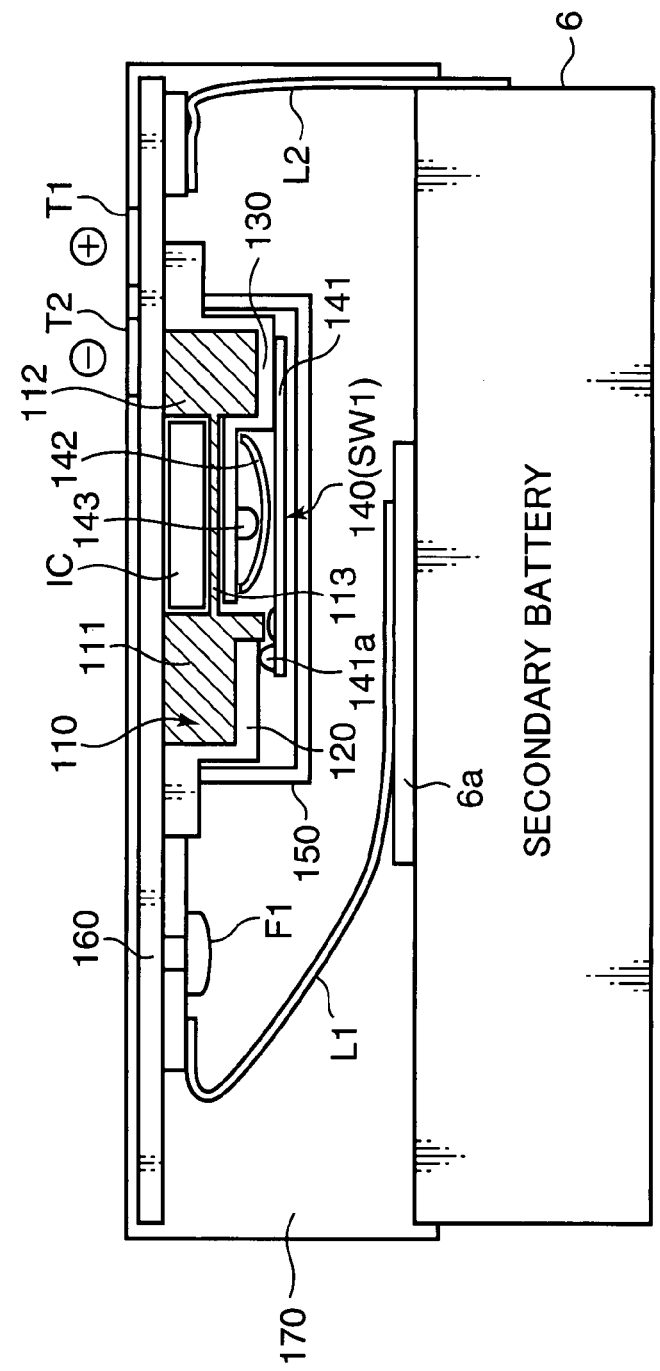

It should be noted that the construction shown in FIG. 34 may be adopted for the battery pack 1*l* according to the twelfth embodiment instead of the one shown in FIG. 33. The construction shown in FIG. 34 is characterized by filling space between the wiring board 160 and the secondary battery 6 with resin 170. Instead of the construction shown in FIG. 34, the one shown in FIG. 35 may be adopted. The construction shown in FIG. 35 is characterized by screw-cramping the secondary battery 6 and the wiring board 160 using two screws 131, 132.

Figure 35A:
Figure 35B:
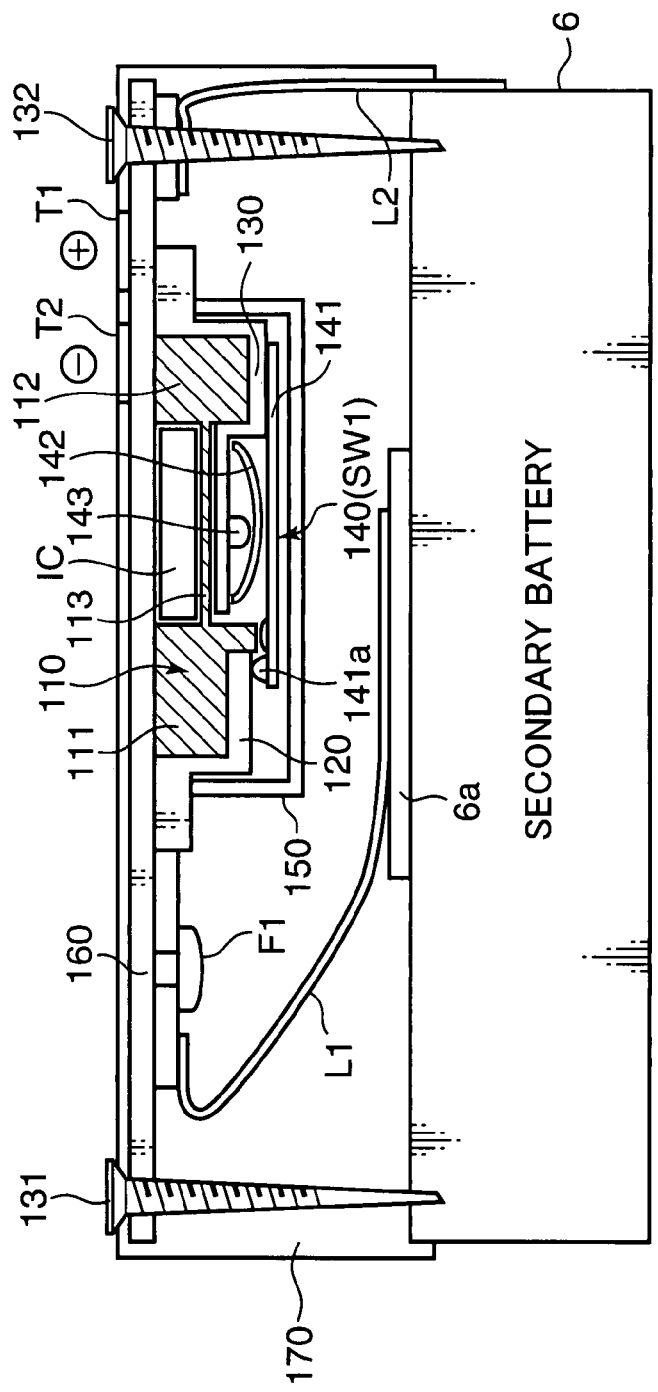

Further, instead of the construction shown in FIG. 35, the one shown in FIG. 36 may be adopted. The construction shown in FIG. 36 is characterized by arranging the wiring board 160 such that the top surface thereof where the bimetal switch 140 and the like are mounted is faced upward and the underside thereof faces the secondary battery 6 and utilizing a connector C1 as the connection terminals T1, T2. In this case, a charging device or a load device includes a connector corresponding to the connector C1, and is electrically connected with the secondary battery 6 by connecting the corresponding connector with the connector C1.

Thirteenth Embodiment

Figure 31:
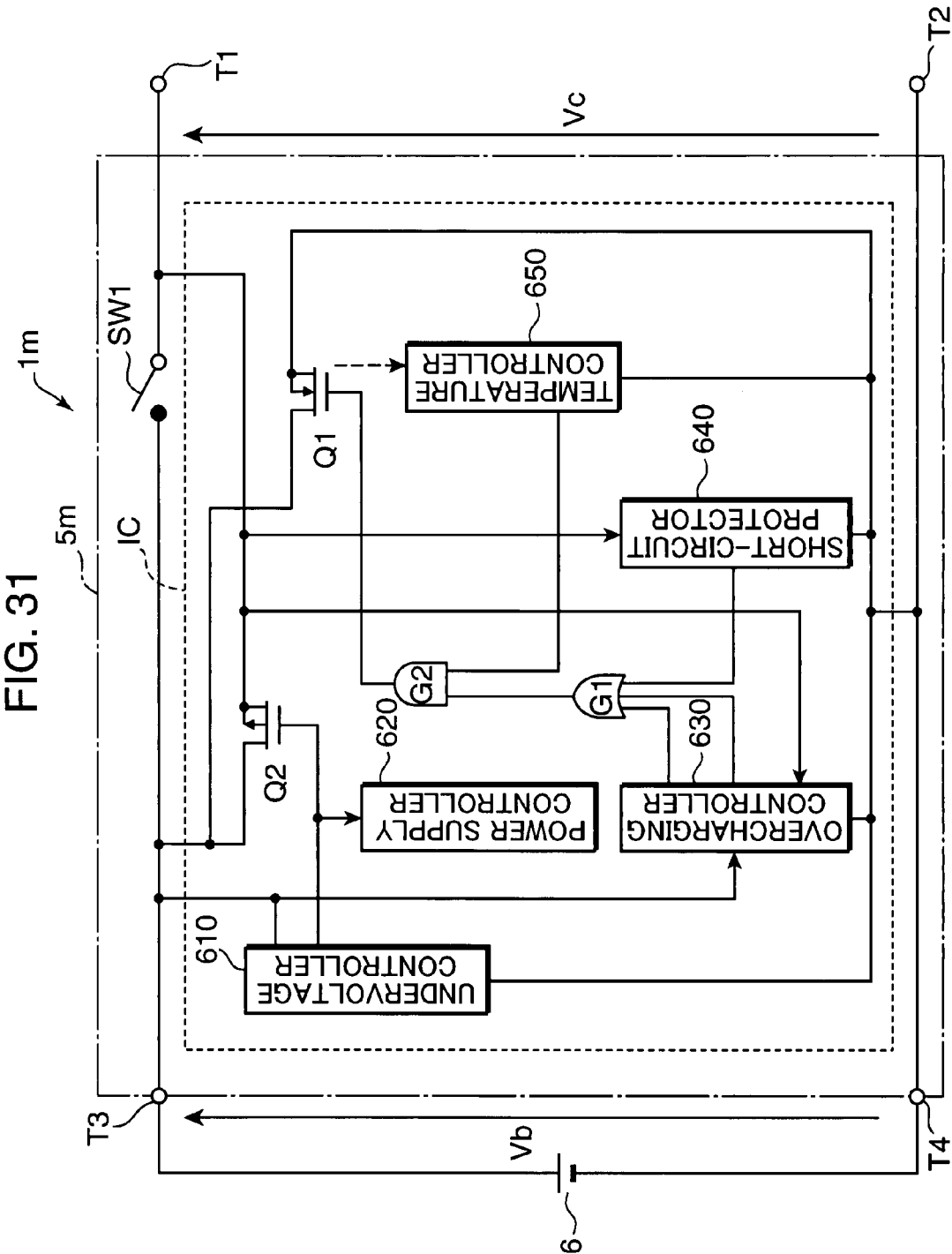
FIG. 31 is a circuit diagram of a battery pack according to a thirteenth embodiment.

Next, a battery pack according to a thirteenth embodiment is described. The external appearance of a battery pack 1m according to the thirteenth embodiment of the present invention is similar to that of the battery pack 1 shown in FIG. 1. FIG. 31 is a circuit diagram of the battery pack 1m according to the thirteenth embodiment of the present invention. A protection circuit 5m is provided with an integrated circuit IC and a bimetal switch SW1. The integrated circuit IC includes a transistor (switching device) Q1, a transistor (resistor) Q2, an AND gate (switching device) G2, an OR gate (switching device) G2, an undervoltage controller (power supply controller) 610, a power supply controller 620, an overcharging controller (first overcharging protector and second overcharging protector) 630, a short-circuit protector 640, and a temperature controller 650. The transistor Q1 is an n-channel FET, wherein a gate thereof is connected to an output terminal of the AND gate G2, a drain thereof is connected to a connection terminal T3, and a source thereof is connected to connection terminals T2, T4. The transistor Q2 is a p-channel FET, wherein a gate thereof is connected to the undervoltage controller 610 and the power supply controller 620, a drain thereof is connected to the connection terminal T3 and a source thereof is connected to a connection terminal T1.

The undervoltage controller 610 turns the power supply controller 620 and the transistor Q2 off to protect a secondary battery 6 from excessive discharge if a voltage Vb is equal to or below a specified excessive discharge prevention voltage.

The power supply controller 620 supplies power to the overcharging controller 630, the short-circuit protector 640 and the temperature controller 650. The overcharging controller 630 detects whether or not a charging device is connected with the connection terminals T1, T2 and overcharging is continued in the case where the bimetal switch SW1 is off in an overcharging protecting state.

The short-circuit protector 640 detects whether or not such a load as to cause overcurrent is connected with the connection terminals T1, T2 or the connection terminals T1, T2 are short-circuited in the overcurrent protecting state with the bimetal switch SW1 turned off.

The temperature controller 650 detects the temperature of the integrated circuit IC resulting from the heat generation of the transistor Q1, which doubles as a heating element and a switching element, and turns the transistor Q1 off if this temperature exceeds a specified set temperature.

Figure 32:
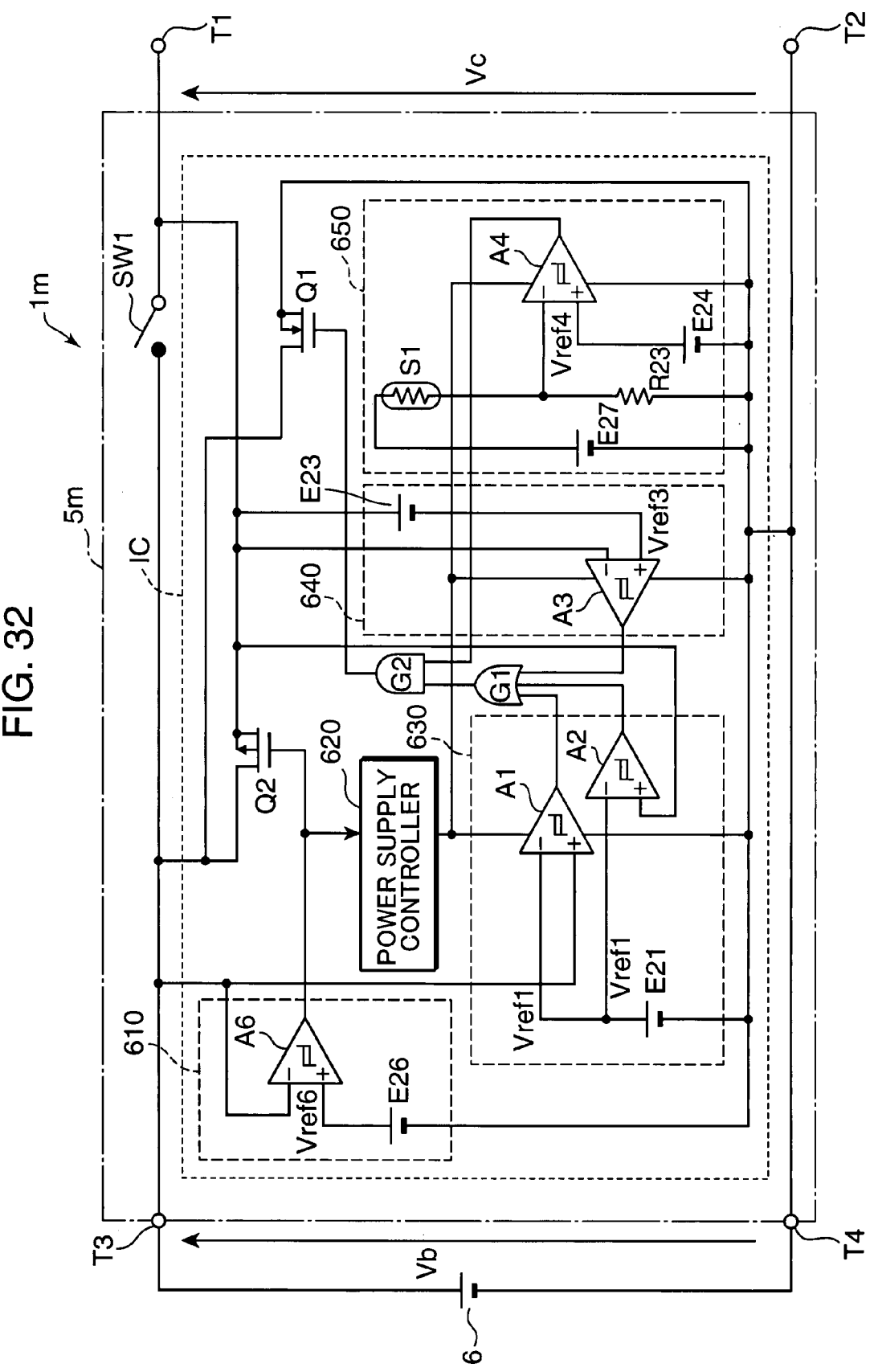

FIG. 32 is a circuit diagram showing the detailed construction of the protection circuit 5m. The undervoltage controller 610 includes a comparator A6 and a reference voltage generator E26. The reference voltage generator E26 is comprised of a voltage generating circuit and applies an excessive discharge prevention voltage Vref6 to a plus terminal of the comparator A6. The comparator A6 outputs a low-level signal to turn the transistor Q2 and the power supply controller 620 on if the voltage Vb exceeds the excessive discharge prevention voltage Vref6. Here, the excessive discharge prevention voltage Vref6 is smaller than reference voltages Vref1, Vref3, Vref4.

The power supply voltage 620 is connected to power supply terminals of the comparators A1, A2, A3 and A4 to supply power to these comparators. It should be noted wire connection between the comparator A2 and the wire supply controller 620 is not shown in FIG. 9.

The overcharging controller 630 includes the comparators A1, A2 and a reference voltage generator E21. The comparator A1 and the reference voltage generator E21 correspond to the overcharging protector 51 shown in the protection circuit 5h according to the eighth embodiment, and the comparator A2 and the reference voltage generator E21 correspond to the chattering preventing device 52 shown in the protection circuit 5h. The overcharging controller 630 detects the overcharging of the secondary battery 6 to protect the secondary battery 6 from overcharging and prevents the chattering of the bimetal switch SW1 in the overcharging protecting state.

The short-circuit protector 640 includes the comparator A3 and a reference voltage generator E23. An output terminal of the comparator A3 is connected to an input terminal of the OR gate G1, a plus terminal thereof is connected to a negative electrode of the reference voltage generator E23, a minus terminal thereof is connected to the connection terminal T1, the power supply terminal thereof is connected to the power supply controller 620, and a ground terminal thereof is connected to the connection terminals T2, T4.

The comparator A3 judges that the load is kept connected with the connection terminals T1, T2 in the overcurrent protecting state if the voltage Vb of the secondary battery 6 exceeds a sum of the reference voltage Vref3 and a voltage Vc (Vb>Vc+Ref3), and outputs a high-level signal. In this way, the chattering of the bimetal switch SW1 can be prevented in the overcurrent protecting state.

The temperature controller 650 includes the comparator A4, a reference voltage generator E24, a resistor R23, a temperature sensor S1 and a reference voltage generator E27 and corresponds to the temperature controller 54 shown in the protection circuit 5k according to the eleventh embodiment.

An output terminal of the comparator A4 is connected to an input terminal of the AND gate G2, a minus terminal thereof is connected to the connection terminals T2, T4 via the resistor R23, a plus terminal thereof is connected with the connection terminals T2, T4 via the reference voltage generator E24, and a ground terminal thereof is connected to the connection terminals T2, T4. A negative electrode of the reference voltage generator E27 is connected to the connection terminals T2, T4, and a positive electrode thereof is connected to the minus terminal of the comparator A4 via the temperature sensor S1.

Next, the operation of the protection circuit 5m according to the thirteenth embodiment is described. First, an excessive discharge protecting operation by the protection circuit 5m is described. When the discharge of the secondary battery 6 proceeds and the voltage Vb falls to or below the excessive discharge prevention voltage Vref6, the comparator A6 outputs a high-level signal to turn the transistor Q2 and the power supply controller 620 off. Accordingly, the supply of the power of the secondary battery 6 to the comparators A1 to A4 can be prevented to protect the secondary battery 6 from excessive discharge caused when no load is connected between the connection terminals T1 and T2.

Next, a short-circuit protecting operation in the overcurrent protecting state by the protection circuit 5m is described. The process up to the overcurrent protecting state and the process up to the prevention of the chattering of the bimetal switch SW1 are not described since being the same as with the protection circuit 5i of the ninth embodiment.

If the short circuit between the connection terminals T1 and T2 is removed in the overcurrent protecting state, a minute electric current flows from the secondary battery 6 to the connection terminal T1 via the transistor Q2. At this time, since no load is connected between the connection terminals T1 and T2, the voltages Vc, Vb take the substantially same value and a difference therebetween is equal to or smaller than the reference voltage Vref3, with the result that the comparator A3 outputs a low-level signal. At this time, since the comparator A1 is also outputting a low-level signal, the transistor Q1 is turned off to stop the heating of the bimetal switch SW1. When the temperature of the bimetal switch SW1 falls to or below the operating temperature Tsw1 by natural cooling, the bimetal switch SW1 is turned on and the protection circuit 5 returns from the overcurrent protecting state to the normal state.

It should be noted that the overcharging protecting operation and the chattering preventing operation in the overcharging protecting state by the overcharging controller 630 are the same as with the protection circuit 5h according to the eighth embodiment and the temperature protecting operation by the temperature controller 650 is the same as with the protection circuit 5k according to the eleventh embodiment and, accordingly, are not described.

As described above, according to the battery pack 1m of the thirteenth embodiment, in addition to the same functions and effects as the protection circuits 5h to 5l of the eighth to twelfth embodiments, the secondary battery 6 can be protected from excessive discharge since the undervoltage controller 610 and the transistor Q2 are provided.

Fourteenth Embodiment

Figure 37:
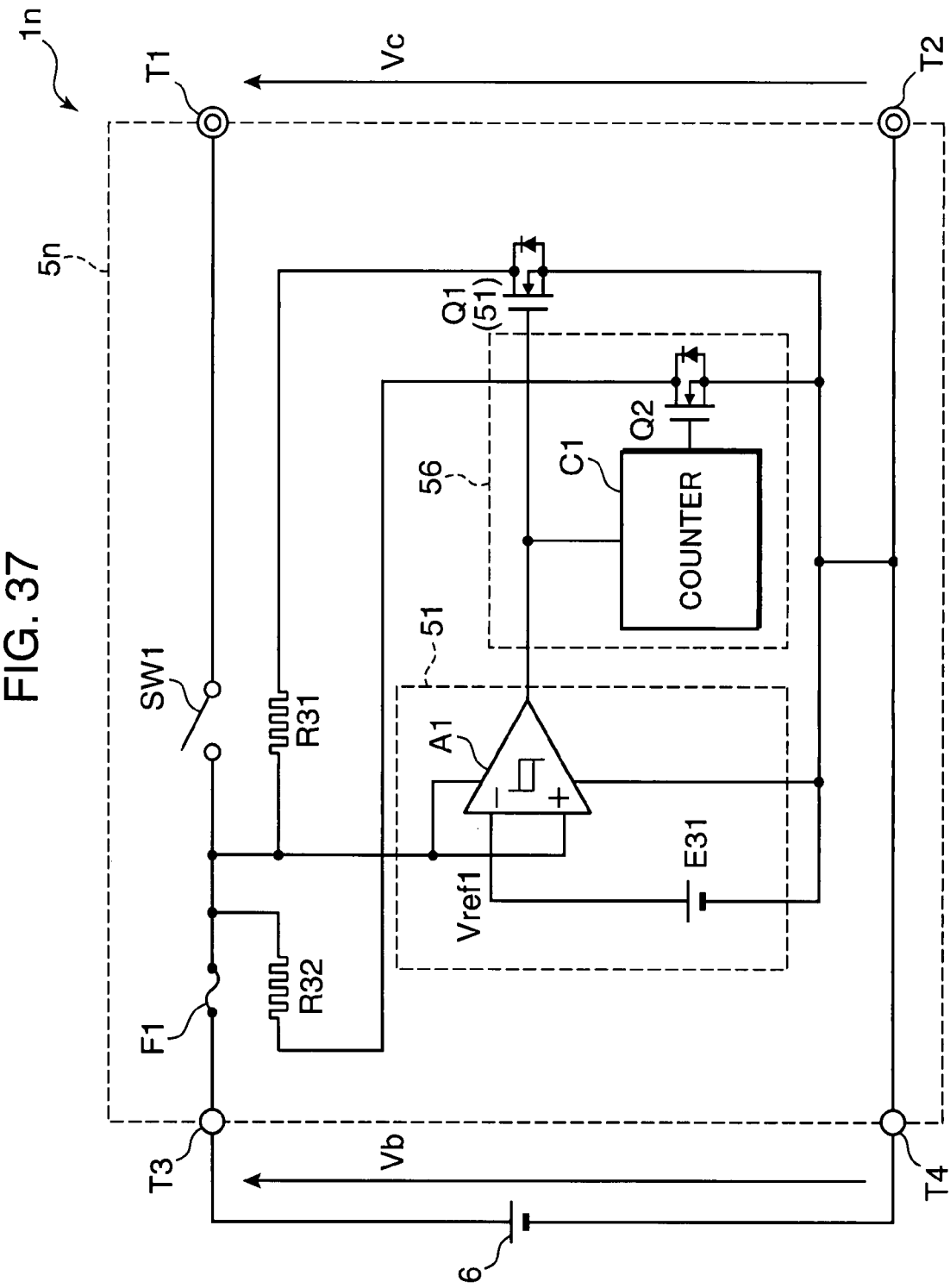
FIG. 37 is a circuit diagram of a battery pack according to a fourteenth embodiment.

Next, a battery pack according to a fourteenth embodiment is described. The external appearance of a battery pack in according to the fourteenth embodiment of the present invention is similar to that of the battery pack 1 shown in FIG. 1. FIG. 37 is a circuit diagram of the battery pack 1n according to the fourteenth embodiment of the present invention. The battery pack in is provided with a protection circuit 5n and a secondary battery 6. The secondary battery 6 is, for example, a rechargeable secondary battery such as a lithium ion secondary battery, a lithium polymer secondary battery, a nickel-metal-hydride secondary battery or a nickel-cadmium secondary battery. The protection circuit 5n is for protecting the secondary battery 6 from overcharging and overcurrent.

The protection circuit 5n is provided with connection terminals T1 to T4 (first to fourth connection terminals), a bimetal switch SW1, a temperature fuse F1, heaters R31, R32, an overcharging protector 51, and a temperature fuse controller 56. The overcharging protector 51 includes a comparator A1, a reference voltage generator E31 and a transistor Q1. The temperature fuse controller 56 includes a counter C1 and a transistor Q2.

The connection terminals T1 and T2 are for the connection of an unillustrated charging device for charging the secondary battery 6 and/or load devices driven by a discharge current from the secondary battery 6. The load devices are various battery-driven electric devices such as a mobile phone, a digital camera, a video camera, a portable personal computer and an electric tool. The connection terminal T3 is connected to a positive electrode of the secondary battery 6 and the connection terminal T4 is connected to a negative electrode of the secondary battery 6.

The bimetal switch SW1 is a heat-sensitive switch that is turned off when the temperature thereof exceeds a specified operating temperature Tsw1 set beforehand, and the operating temperature Tsw1 is, for example, set at a maximum temperature within such a temperature range as not to degrade characteristics of the secondary battery 6.

The bimetal switch SW1 is a return-type heat-sensitive switch that is turned on again if temperature decreases after being turned off due to a temperature increase. Instead of the bimetal switch, a switch using a shape-memory alloy (e.g. those disclosed in Japanese Examined Utility Model Publication No. H07-4770 and Japanese Unexamined Patent Publication No. H11-224579) or a switch using a shape-memory resin can be similarly used as the heat-sensitive switch.

Any shape-memory alloy such as a nickel-titanium alloy or a copper-zinc-aluminum alloy will do provided that it has a restoring force resulting from the thermoelastic martensitic transformation and reverse transformation. Shape change temperature ranges within which these alloys change their shapes from the transformed shapes to the restored shapes can be changed by suitably choosing the composition of the shape-memory alloy or by changing a heating process.

A polyester, a polyurethane, a styrene butadiene, a transpolyisoprene and like resins in which cross-linked or partially crystallized stationary phase and reversible phase are mixedly present can be used as the shape-memory resin.

The temperature fuse F1 is heated by the heater R32, melted by heat from the heater R32, and arranged in proximity to the secondary battery 6 or attached thereto with an insulating material held therebetween so as to be melted if the secondary battery 6 generates heat due to overcharging or excessive discharge. An operating temperature Tfuse1 at which the temperature fuse F1 is melted is set higher than the operating temperature Tsw1 of the bimetal switch SW1. The melting characteristic of the temperature fuse F1 is set such that an operating speed thereof is slower than that of the bimetal switch SW1. The temperature fuse F1 is a nonreturn-type heat-sensitive switch that does not return to an electrically conductive state once being melted. In this case, the operating temperature Tsw1 of the bimetal switch SW1, a finally attained temperature Th1 of the heater R31, the operating temperature Tfuse1 of the temperature fuse F1 and a finally attained temperature Th2 of the heater R2 have a relationship given by Equation (3) below.

$$Tsw1 < Th1 < Tfuse1 < Th2 \quad (3)$$

The operating temperatures and operating speeds of the bimetal switch SW1 and the temperature fuse F1 may be set by, for example, bringing the bimetal switch SW1 and the secondary battery 6 into proximity to or into close contact with each other to make thermal resistance between the bimetal switch SW1 and the secondary battery 6 smaller than the one between the temperature fuse F1 and the secondary battery 6 in order to cause the bimetal switch SW1 to operate earlier than the temperature fuse F1 in addition to by setting the characteristics of components of the bimetal switch SW1 and the temperature fuse F1 themselves. For example, the bimetal switch SW1 may be so constructed as to easily increase temperature due to its own heat generation by increasing an amount of heat generation of the bimetal switch SW1 through an increase in the contact resistance of the bimetal switch SW1 or resistance in a movable section, by increasing thermal resistance to the surrounding area when the bimetal switch S1 radiates heat, or by reducing thermal capacity through the miniaturization of the bimetal switch SW1.

In order to make the operation of the temperature fuse F1 slower than that of the bimetal switch SW1, the temperature fuse F1 may be so constructed as to be unlikely to increase temperature, for example, by reducing thermal resistance to the surrounding area upon the heat radiation of the temperature fuse F1 or increasing the apparent thermal capacity of the temperature fuse F1 without enlarging the temperature fuse F1, for example, by a method of bringing a material having good thermal conductivity into contact with the temperature fuse F1.

PTC (Positive Temperature Coefficient) thermistors having a positive temperature characteristic, i.e. whose resistance value increases and decreases with temperature are used as the heaters R31, R32. Thus, if a voltage is applied to the heater R31, the resistance value of the heater R31 increases due to the heat generation of the heater R31 itself, thereby decreasing a current flowing through the heaters R31, R32, with the result that the temperatures of the heaters R31, R32 finally stabilize at the finally attained temperatures Th1, Th2. The finally attained temperature Th1 is set at such a temperature that is above the operating temperature Tsw1 of the bimetal switch SW1 and does not damage the secondary battery 6 and the protection circuit 5n. This can suppress the damage of the secondary battery 6 and the protection circuit 5n due to the heat generation of the heater R31. Further, the finally attained temperature Th2 is set at such a temperature that is above the operating temperature Tfuse1 of the temperature fuse F1 and does not damage the secondary battery 6 and the protection circuit 5n.

The bimetal switch SW1 is connected between the connection terminal T1 and the temperature fuse F1. The temperature fuse F1 is connected between the bimetal switch SW1 and the connection terminal T3.

A plus terminal and a power supply terminal of the comparator A1 are connected to the connection terminal T3 via the temperature fuse F1 to be driven by the power supplied from the secondary battery 6. A minus terminal of the comparator A1 is connected to a positive electrode of the reference voltage generator E31, an output terminal thereof is connected to a gate of the transistor Q1 and an input terminal of the counter C1, and a ground terminal thereof is connected to the connection terminals T2, T4. A negative electrode of the reference voltage generator E31 is a voltage generating circuit connected to the connection terminals T2, T4 and adapted to apply a specified overcharging protection voltage Vref1 to the minus terminal of the comparator A1.

The transistor Q1 is comprised of an n-channel field-effect transistor, and a drain thereof is connected to the temperature fuse F1 via the heater R31, and a source thereof is connected to the connection terminals T2, T4. The transistor Q2 is comprised of an n-channel field-effect transistor, and a gate thereof is connected to an output terminal of the counter C1, a drain thereof is connected to the temperature fuse F1 via the heater R32, and a source thereof is connected to the connection terminals T2, T4.

The comparator A1 outputs a high-level signal to turn the transistor Q1 on if a voltage Vb between the connection terminals T3 and T4 exceeds the specified overcharging protection voltage Vref1 while outputting a low-level signal to turn the transistor Q1 off if the voltage Vb is equal to or below the overcharging protection voltage Vref1. In the fourteenth embodiment, the overcharging protection voltage Vref1 is set at Ref1=4.3 V.

The counter C1 is comprised of a known counter, counts up every time the signal outputted from the comparator A1 changes from low level to high level, and outputs a high-level signal to turn the transistor Q2 on when the count value exceeds a specified value.

Next, the operation of the protection circuit 5n is described. First, an overcharging protecting operation by the protection circuit 5n is described. When an unillustrated charging device is connected with the connection terminals T1, T2 to apply a voltage Vc between the connection terminals T1 and T2, the bimetal switch SW1 is turned on in a normal state where the voltage Vb is equal to or below the overcharging protection voltage Vref1, and the secondary battery 6 is charged. Here, the voltage Vc is normally up to, for example, 4.2 V.

If the voltage control is not possible any longer, for example, due to the breakdown of the unillustrated charging device, the voltage Vb exceeds the overcharging protection voltage Vref1. Then, the comparator A1 outputs a high-level signal to turn the transistor Q1 on, whereby a current flows to the heater R31 to heat the bimetal switch SW1. When the temperature of the bimetal switch SW1 reaches the operating temperature Tsw1 of the bimetal switch SW1, the bimetal switch SW1 turns off to cut off a charge current, thereby setting an overcharging protecting state. Thus, the secondary battery 6 is protected from overcharging.

Next, protection from overcurrent by the protection circuit 5n is described. First, when the connection terminals T1, T2 are short-circuited or a resistance value between the connection terminals T1 and T2 becomes low with the bimetal switch SW1 turned on, for example, because a metal piece touches the connection terminals T1, T2 or an unillustrated mobile phone or like load device connected with the connection terminals T1, T2 breaks down, an overcurrent flows from the secondary battery 6 via the temperature fuse F1 and the bimetal switch SW1. The bimetal switch SW1 is heated by the contact resistance if the overcurrent flows.

When the temperature of the bimetal switch SW1 reaches the operating temperature Tsw1, the bimetal switch SW1 is turned off to cut off the discharge current of the secondary battery 6, whereby the protection circuit 5n enters an overcurrent protecting state to protect the secondary battery 6 from overcurrent. At this time, since the output of the comparator A1 is low level and the heater R31 is not heated, the bimetal switch SW1 is naturally cooled. When the temperature of the bimetal switch SW1 falls to or below the operating temperature Tsw1, the bimetal switch SW1 is turned on again and the protection circuit 5n returns from the overcurrent protecting state to the normal state.

Next, an operation of avoiding the melting of the bimetal switch SW1 by the protection circuit 5n is described. The comparator A1 turns the transistor Q1 on to heat the heater R31, thereby turning the bimetal switch SW1 off, when the voltage Vb exceeds the overcharging protection voltage Vref1. On the other hand, the comparator A1 turns the transistor Q1 off to stop the heating of the heater R31, thereby turning the bimetal switch SW1 on, when the voltage Vb falls to or below the overcharging protection voltage Vref1.

Accordingly, the bimetal switch SW1 can be thought to undergo a contact operation of separating the bimetal and the contact touching each other when the signal outputted from the comparator A1 changes from low level to high level.

Therefore, the counter C1 counts up every time the level of the signal outputted from the comparator A1 changes. When the count value exceeds the specified value, the transistor Q2 is turned on to heat the heater R32, thereby melting the temperature fuse F1. In this way, the charging and discharging of the secondary battery can be stopped before the operation number of the bimetal switch SW1 reaches the guaranteed number of operations, which can prevent such an occurrence that the bimetal switch SW1 is melted to cease the overcharging protecting function and the overcurrent protecting function. Therefore, user safety can be assured.

Since the bimetal switch SW1 is turned off by the heat generation thereof at the time of protection from overcurrent regardless of whether or not it is heated by the heater R31, the count number of the counter C1 does not indicate a precise number of times the bimetal switch has been turned off. However, it is certain that the bimetal switch has been turned off a greater number of times as the count number of the counter C1 increases. Therefore, if the above specified value is set in consideration of the number of times the bimetal switch SW is turned off by the heat generation thereof, the melting of the bimetal switch SW1 can be securely prevented.

As described above, since the secondary battery 6 can be protected from overcharging and overcurrent using the bimetal switch SW1 according to the protection circuit 5n, the FET 1006 for cutting off the discharge current, the FET 1007 for cutting off the charge current, the reference voltage generator 1009 for detecting the overcurrent, the comparator 1111, the resistor 1112 and the logic circuit 1013 for on-off controlling the two FETs 1006, 1007 are not necessary unlike the protection circuit 1002 according to background art shown in FIG. 51, wherefore the circuitry of the protection circuit 5n can be simplified and the protection circuit 5n can be easily miniaturized.

Further, since overcharging is detected by the comparator A1 and the bimetal switch SW1 is heated by the heater R31 to be turned off, accuracy in detecting overcharging can be improved as compared, for example, to the case where protection from overcharging is carried out only by the bimetal switch 1023 or the PTC element 1032 connected in series with the secondary battery 1022 as shown in FIGS. 52 and 53. Therefore, likelihood of overcharging the secondary battery 6 without performing the overcharging protection, degrading the characteristics of the secondary battery 6 or causing the expansion or deformation of the secondary battery 6 can be reduced.

Furthermore, the number of level changes of the signal of the comparator A1 from low level to high level is counted, and the heater R32 is heated to melt the temperature fuse F1 if the count value reaches the specified value, which can prevent such an occurrence that the bimetal switch SW1 is melted to cease the overcharging protecting function and the overcurrent protecting function, thereby protecting the secondary battery 6. In addition, user safety can be assured.

In the fourteenth embodiment, the bimetal switch SW1 may be heated by heat generated when the transistor Q1 is on and the temperature fuse F1 may be heated by heat generated when the transistor Q2 is on. In this case, the heaters R31, R32 become unnecessary, enabling the circuit simplification and cost reduction. Further, the overcharging protector 51 and the temperature fuse controller 56 may be constructed by the integrated circuit IC and the temperature fuse F1 and the bimetal switch SW1 may be arranged such that the heat of this integrated circuit IC is transferred to the temperature fuse F1 and the bimetal switch SW1. In this case, the circuit can be miniaturized. If a self-holding bimetal switch is used as the bimetal switch SW1, the overcurrent protecting state can be continued.

Fifteenth Embodiment

Next, a battery pack according to a fifteenth embodiment is described. The battery pack according to the fifteenth embodiment aims to solve problems that there is a limit in the miniaturization of a protection circuit board formed by mounting a protection circuit on a wiring board resulting from the complication of a circuitry and, if a battery pack is constructed using the protection circuit board, such a use also hinders the miniaturization of the battery pack.

Figure 38:
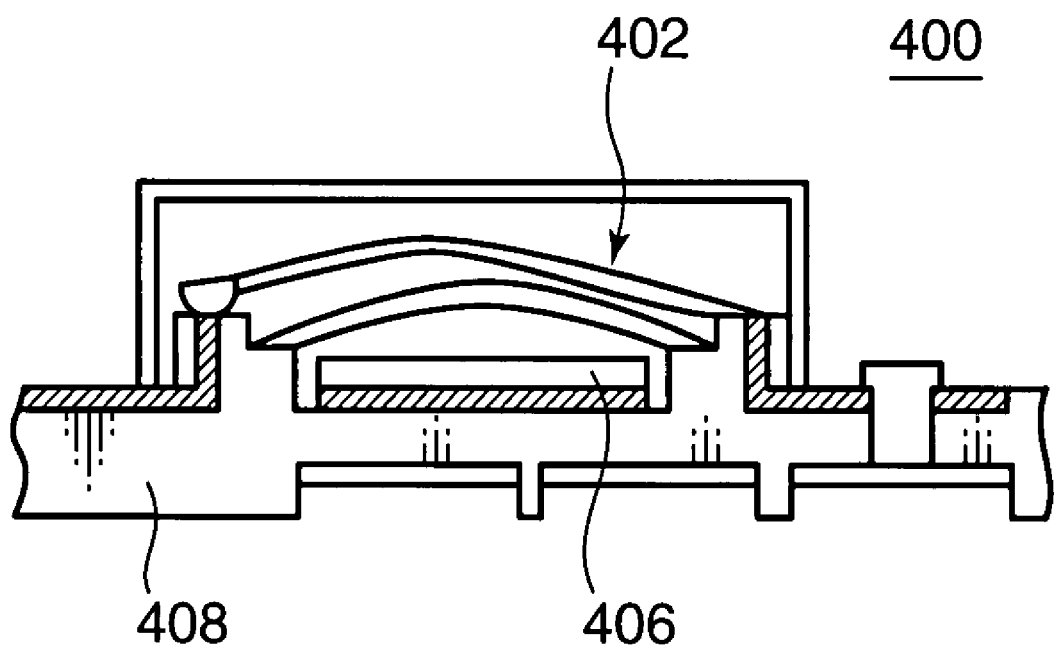
FIG. 38 is a partial diagram of a protection circuit board constructed by incorporating a heat-sensitive switching element and a heater into a wiring board.

FIG. 38 is a diagram showing the construction of a heat-sensitive protection switch device 400 using a bimetal switch 402 comprised of a movable contact member and a bimetal element for the comparison with a heat-sensitive protection switch device provided in the battery pack according to the fifth embodiment. Specifically, the heat-sensitive protection switch device 400 using the bimetal switch 402 comprised of the movable contact member and the bimetal element is introduced into a charging/discharging circuit of a secondary battery, a heater 406 is caused to generate heat in accordance with a detection signal outputted from an overcharging detecting circuit when an excessive charge current flows into the secondary battery, thereby actuating the bimetal switch 402 to turn the circuit off, and the bimetal switch 2 is actuated to turn the circuit off by Joule heat generated by the contact resistance of a movable contact of the movable contact member when an excessive discharge current flows into the secondary battery. In this way, the flows of an excessive charge current and an excessive discharge current into the secondary battery can be prevented.

According to the protection circuit constructed as above, the flows of the excessive charge current and the excessive discharge current into the secondary battery can be prevented only by providing the overcharging detecting circuit, the number of components of the protection circuit can be reduced to simplify the circuitry as compared to the construction shown in FIG. 51 and, in addition, the protection circuit board in which the respective components are arranged on the wiring board can be miniaturized by simplifying the circuitry.

However, the bimetal switch 402 and the heater 406 for heating the bimetal switch 402 need to be integrally incorporated into the wiring board 408. This not only makes it cumbersome to assemble the protection circuit board, but also places limits on the miniaturization of the protection circuit board by complicating the construction of the wiring board 408. This may hinder the miniaturization of the battery pack in the case of constructing the battery pack using such a protection circuit board. In view of this, such an application of an inventive heat-sensitive protection switch device as not to cause such inconvenience to a battery pack is described below.

Figure 39:
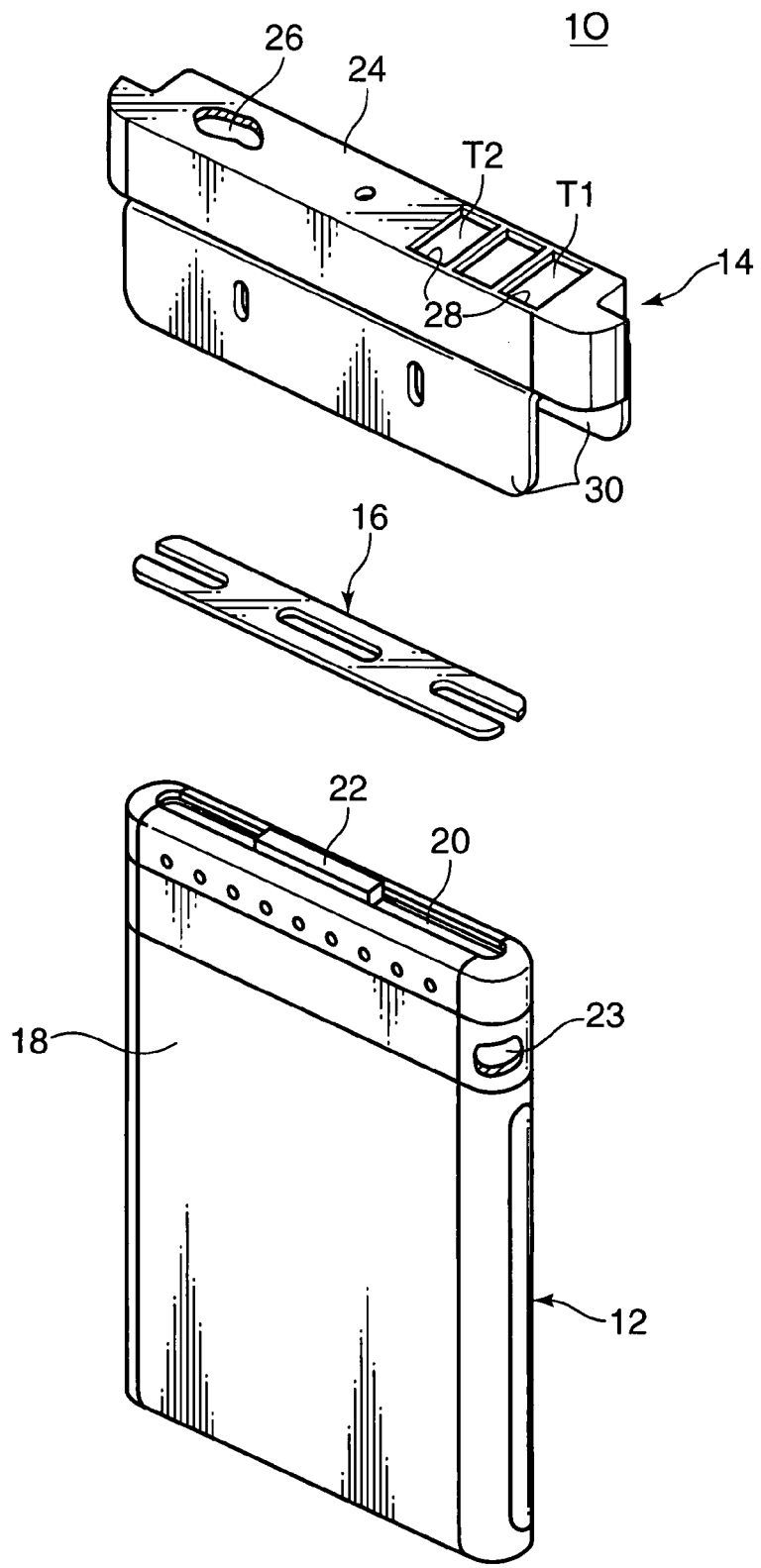
FIG. 39 is an external exploded perspective view showing the schematic construction of a battery pack according to a fifteenth of the invention.

FIG. 39 is an exploded perspective view showing the external schematic construction of a battery pack 1o according to the fifteenth embodiment of the present invention. In FIG. 39, the battery pack 1o is provided with a battery accommodating portion 12 having a flat shape, a circuit accommodating portion 14 to be fitted into an opening end of the battery accommodating portion 12, and an insulating spacer 16 to be interposed between the battery accommodating portion 12 and the circuit accommodating portion 14.

In the battery accommodating portion 12, a secondary battery 20 such as a lithium ion secondary battery, a lithium polymer secondary battery, a nickel-metal-hydride secondary battery or a nickel-cadmium secondary battery is accommodated in a casing 18 having an open upper end and made of a steel sheet having, for example, nickel plating applied to the outer surface thereof such that a projection-shaped positive electrode terminal 22 projects through the opening end, the casing 18 is sealed by caulking after the secondary battery 20 is accommodated thereinto, and a negative electrode terminal 23 of the secondary battery 20 is connected with the casing 18 inside the casing 18.

In the circuit accommodating portion 14, a protection circuit board 26 formed with a protection circuit 40 to be described later is accommodated in a casing 24 having an open bottom end and made of, for example, a synthetic resin material. A connection terminal T1 (first connection terminal) and a connection terminal T2 (second connection terminal) corresponding to the positive electrode terminal 22 and the negative electrode terminal 23 of the secondary battery 20 are exposed at a plurality of windows 28 formed in the closed upper surface of the casing 24. Connection terminals 30 extending downward and made of metal sheets are provided at the opposite sides of the opening edge of the casing 24. The circuit accommodating portion 14 has the protection circuit board 26 formed with the protection circuit 40 accommodated thereinto and is mounted into the opening end of the battery accommodating portion 12 via the insulating spacer 16. The connection terminals 30 are electrically connected with the casing 18 to construct the battery pack 1o.

Figure 40:
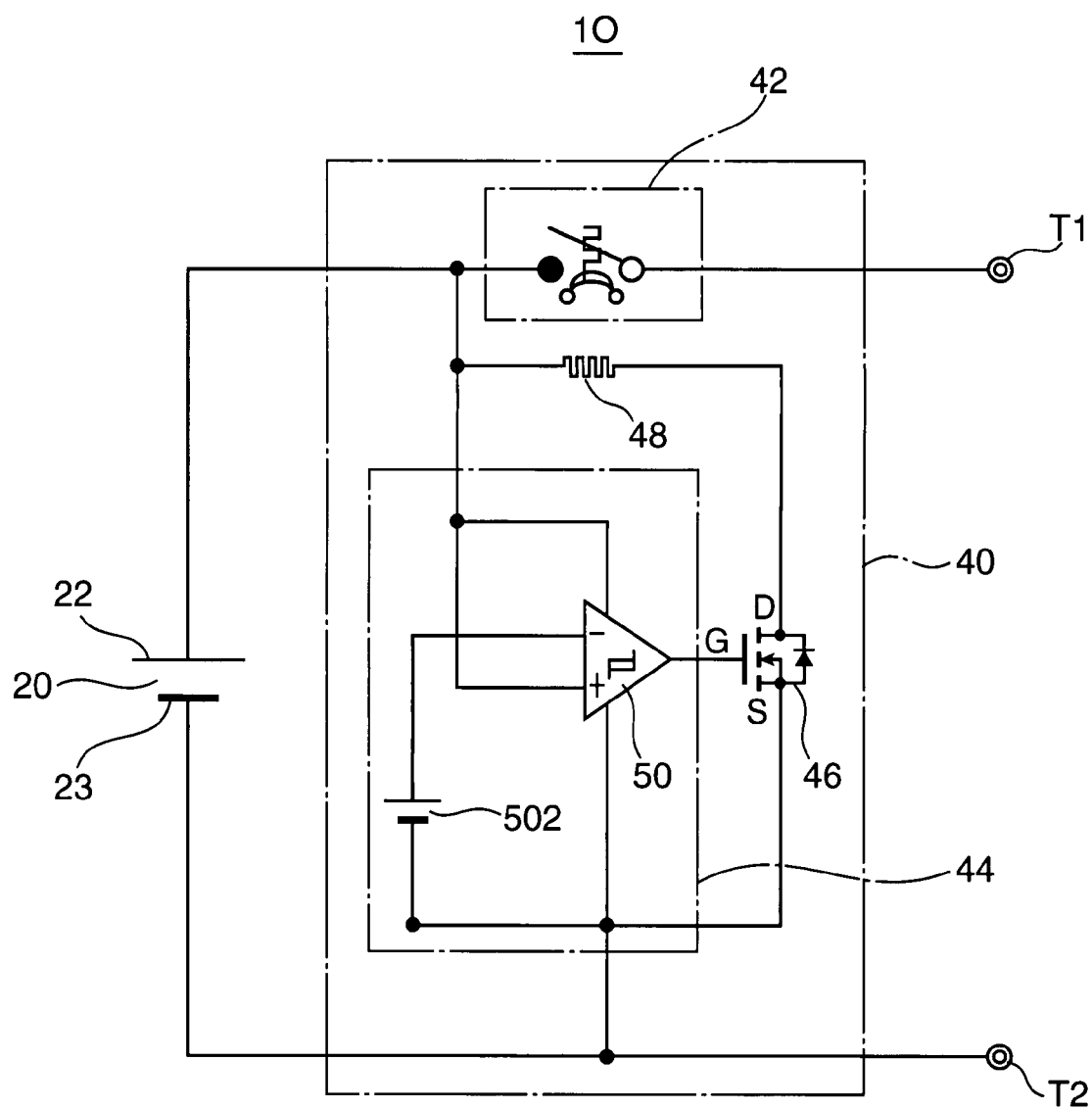
FIG. 40 is a circuit diagram of the battery pack shown in FIG. 39.

FIG. 40 is a circuit diagram of the battery pack 1o shown in FIG. 39. The battery pack 1o includes the aforementioned connection terminals T1, T2 for the connection of an unillustrated charging device or a load device such as a mobile phone with the secondary battery 20, and the protection circuit 40 is connected between the positive electrode terminal 22 and the negative electrode terminal 23 of the secondary battery 20 and the connection terminals T1, T2 to prevent the flows of an excessive charge current and an excessive discharge current into the secondary battery 20.

This protection circuit 40 includes a heat-sensitive protection switch device 42 provided between the positive electrode terminal 22 of the secondary battery 20 and the connection terminal T1, an overcharging detecting circuit 44 connected between the positive electrode terminal 22 and the negative electrode terminal 23 of the secondary battery 20 to detect the overcharging of the secondary battery 20 by the flow of an excessive charge current into the secondary battery 20, a MOSFET 46 as a switching element that is on-off controlled by a detection signal of the overcharging detecting circuit 44, and a heater 48 as a heating element connected between the positive electrode terminal 22 and the negative electrode terminal 23 of the secondary battery 20 via the MOSFET 46.

Here, the heat-sensitive protection switch device 42 is constructed using the bimetal switch, and turns a charging/discharging circuit of the secondary battery 20 on if this bimetal switch is not heated by the heater 48 while turning this circuit off if the bimetal switch is heated by the heater 48. The specific construction of this heat-sensitive protection switch device 42 is described later.

The overcharging detecting circuit 44 includes a comparator 50 and a reference voltage generator 502, wherein a plus terminal of the comparator 50 is connected to the positive electrode terminal 22 of the secondary battery 20, a minus terminal thereof is connected to the reference voltage generator 502, and an output terminal thereof is connected to a gate G of the MOSFET 46. Here, a voltage value capable of judging that the secondary battery 20 went beyond a fully charged state to enter an overcharge state where an excessive charge current flows is set in the reference voltage generator 502. It should be noted that a drain D of the MOSFET 46 is connected to the heater 48 and a source S thereof is connected to the negative electrode terminal 23 of the secondary battery 20.

Figure 41:
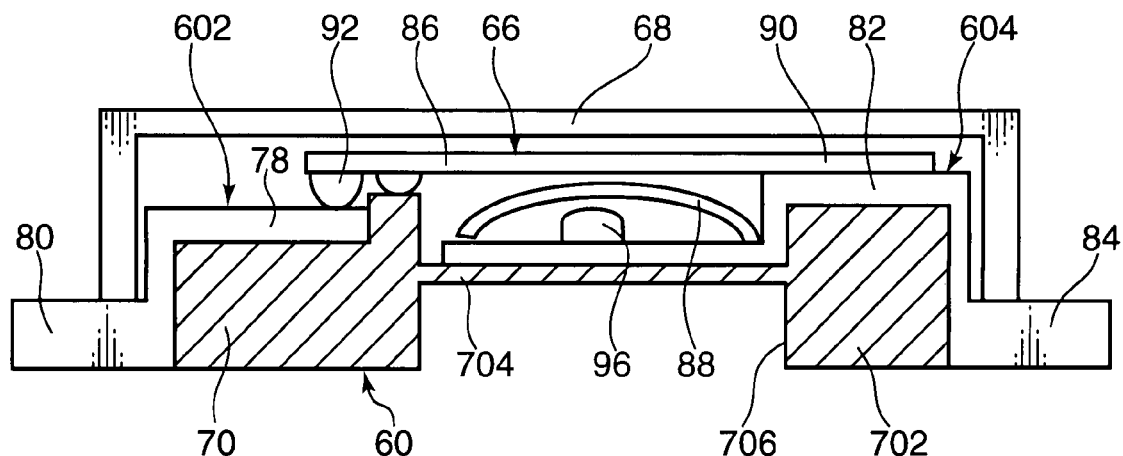
FIG. 41 is a section of an essential portion showing one example of the specific construction of a heat-sensitive protection switch device.

FIG. 41 is a section of an essential portion showing one example of the specific construction of the heat-sensitive protection switch device 42. Specifically, the heat-sensitive protection switch device 42 includes a frame body 60 constructed to be surface-mountable on a wiring board and integrally made of an insulating material such as synthetic resin or ceramic, a first wiring conductor 602 formed, e.g. by a sheet metal, a second wiring conductor 604 formed on a sheet metal, a bimetal switch 66 as a heat-sensitive switching element, and a cover body 68 for covering the secondary battery 66 on the top side of the frame body 60.

Here, the frame body 60 is comprised of a first supporting member 70, a second supporting member 702 opposed at a specified distance to the first supporting member 70, and a coupling member 704 for coupling the first and second supporting members 70, 702 between a first surface (top surface) and a second surface (underside) facing the first surface (between the upper and lower surfaces in the shown example). In this frame body 60, a recess (space portion) 706 is formed at the underside of the coupling member 704 and between the first and second supporting members 70, 702 by forming the coupling member 704 between the top surfaces and undersides of the first and second supporting members 70, 702. By forming this recess 706 to communicate with the outside, the heater 48 (see FIG. 40) for heating the bimetal switch 66 can be disposed in the recess 706 upon mounting the heat-sensitive protection switch device 42 on a wiring board or the like.

The first wiring conductor 602 is arranged on the upper side of the first supporting member 70 to construct a first contact (first contact point) 78. The first wiring conductor 602 also extends from the first contact 78 via the outer surface of the first supporting member 70 to construct a first mounting terminal 80. This first mounting terminal 80 is bent outward at the underside of the first supporting member 70 so as to be flush with the underside of the first supporting member 70.

The second wiring conductor 604 is arranged on the upper side of the second supporting member 702 to construct a second contact (second contact point) 82. The second wiring conductor 604 also extends from the second contact 82 via the outer surface of the second supporting member 702 to construct a second mounting terminal 84. This second mounting terminal 84 is bent outward at the underside of the second supporting member 702 so as to be flush with the underside of the second supporting member 702. It should be noted that the second wiring conductor 604 also extends on the top surface of the coupling member 74, whereby a bimetal element 88 to be described later can be more easily mounted.

The bimetal switch 66 includes an elongated movable contact member 86 straddling between the first and second contacts 78 and 82, and the bimetal element 88 arranged on the top surface of the coupling member 704.

Here, one end of the movable contact member 86 serves as a fixed contact point 90 and the other end thereof serves as a movable contact 92. The fixed contact point 90 is mounted on the second contact 82, for example, by spot welding. The movable contact 92 is constantly in contact with the first contact 78 to connect the first and second contacts 78, 82 if the bimetal switch 66 receives no action force of the bimetal element 88. The movable contact 92 moves away from the first contact 78 to disconnect the first and second contacts 78, 82 if the bimetal switch 88 receives an action force.

The bimetal element 88 has an elongated shape curved toward the movable contact member 86 in its middle part, has the one end located at the side of the second supporting member 702 mounted to the second wiring conductor 604, e.g. by spot welding, is curved toward the movable contact member 86 when being heated and moves the movable contact 78 away from the first contact 78 by an action force created upon coming into contact with the movable contact member 86. It should be noted that a projection 95 for improving the positional accuracy of the bimetal element 88 is provided on the top side of the coupling member 704.

The cover member 68 is for protecting the bimetal switch 66 from external pressure, dust and the like and has such a structure that the opposite longitudinal ends of an elongated insulating plate material are bent toward the first and second mounting terminals 80, 84. The cover member 68 is fixed by adhering the end surfaces thereof to the first and second mounting terminals 80, 84.

The heat-sensitive protection switch device 42 thus constructed is surface-mounted on the wiring board, on which the heater 48 (see FIG. 40) is mounted, by means of the first and second mounting terminals 80, 84 such that the heater 48 is located in the recess 706 of the frame body 60. The protection circuit 40 using this heat-sensitive protection switch device 42 operates as follows.

Specifically, in the case where a charging device is connected between the connection terminals T1 and T2 to charge the secondary battery 20, until the secondary battery 20 reaches an excessively charged state, the comparator 50 outputs a low-level signal to turn the MOSFET 46 off, whereby no power is applied to the heater 48, since the voltage of the reference voltage generator 502 is higher than that of the secondary battery 20. Thus, the heat-sensitive protection switch device 42 is kept on to keep charging the secondary battery 20. It should be noted that the charging device ends its charging operation upon reaching a fully charged state since having the protection circuit for stopping the charging operation if the secondary battery 20 reaches the fully charged state.

However, the voltage of the secondary battery 20 becomes higher than that of the reference voltage generator 502 if an excessive charge current flows into the secondary battery 20 by the malfunction caused, for example, by the breakdown of the charging device, wherefore the comparator 50 outputs a high-level signal to turn the MOSFET 46 on, whereby the heater 48 receives power application and generates heats.

In this way, the bimetal element 88 of the bimetal switch 66 is heated to be curved toward the movable contact member 86 and the movable contact 92 is moved away from the first contact 78 by the action force of the bimetal element 88 to turn the circuit in the charging state off, whereby the supply of the charge current from the charging device to the secondary battery 20 is stopped. Therefore, the overcharging of the secondary battery 20 can be effectively prevented.

On the other hand, if a load device such as mobile phone is connected between the connection terminals T1 and T2 and an excessive discharge current flows into the secondary battery 20 due to the breakdown of the load device or the like, the movable contact member 86 is heated by Joule heat generated by contact resistance between the movable contact 92 and the first contact 78, and the bimetal element 88 is heated by this heated movable contact member 86. Thus, the movable contact 92 of the movable contact member 86 is moved away from the first contact 78 by an action force created by the curving of the bimetal element 88 to turn the circuit in the energized state off, whereby the power supply from the secondary battery 20 to the load device is stopped. Therefore, the flow of an excessive discharge current into the secondary battery 20 can be effectively prevented.

Figure 42:
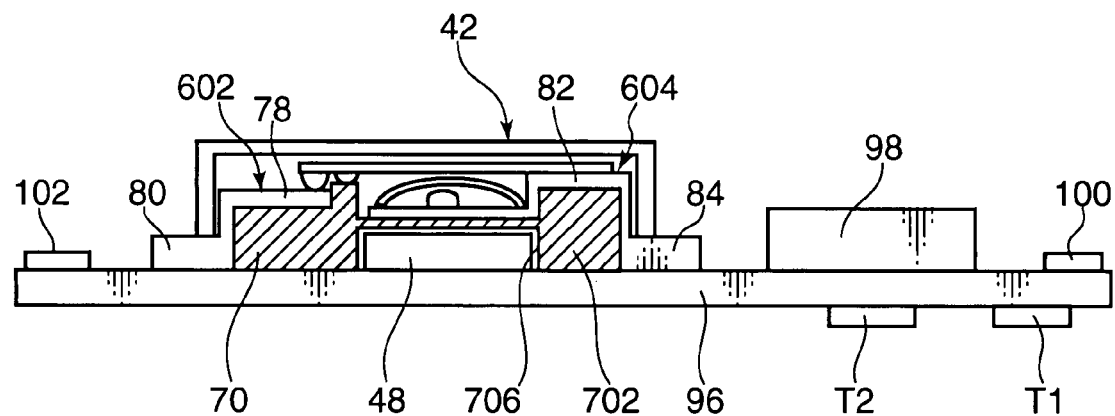
FIG. 42 is a side view of a protection circuit board shown in FIG. 39.

FIG. 42 is a side view of the protection circuit board 26 shown in FIG. 39. This protection circuit board 26 is surface-mounted on a wiring board 96, for example, by disposing the heater 48 in the recess 706 of the heat-sensitive protection switch device 42 after fixing the heater 48 to a specified position on the top surface of the wiring board 96 using, e.g. heat resistance adhesive. Specifically, the protection circuit board 26 is surface-mounted on the wiring board 96 by connecting the first and second mounting terminals 80, 84 to unillustrated lands of the wiring board 96 using, e.g. electrically conductive adhesive. Further, a control circuit section 98 in the form of a hybrid integrated circuit of circuit sections including the overcharging detecting circuit 44 and the MOSFET 46 is surface-mounted to an unillustrated land of the wiring board 96.

Here, a first mounting electrode 100 and a second mounting electrode 102 for the connection with the positive electrode terminal 22 and the negative electrode terminal 23 of the secondary battery 20 are arranged at the opposite ends of the top surface of the wiring board 96 constructing the protection circuit board 26. Further, the connection terminals T1 and T2 are arranged on the underside of the wiring board 96. Unillustrated wiring patterns for the wire connection of the heat-sensitive protection switch device 42, the heater 48, the control circuit section 98, the first mounting electrode 100, the second mounting electrode 102 and the connection terminals T1, T2 are also arranged on the wiring board 96.

In the protection circuit board 26 thus constructed, the heat-sensitive protection switch device 42 is a unit to be handled independently of the heater 48 and the recess 706 is open to communicate with the outside. Thus, after the heater 48 is mounted on the wiring board 96, the heat-sensitive protection switch device 42 can be mounted on the wiring board 96 independently of the mounting of the heater 48. Therefore, the protection circuit board 26 can be easily assembled and the miniaturization of the protection circuit board 26 can be advanced since the construction of the wiring board 96 is not complicated, which can lead to advancement in the miniaturization of the battery pack 1o.

Figure 43:
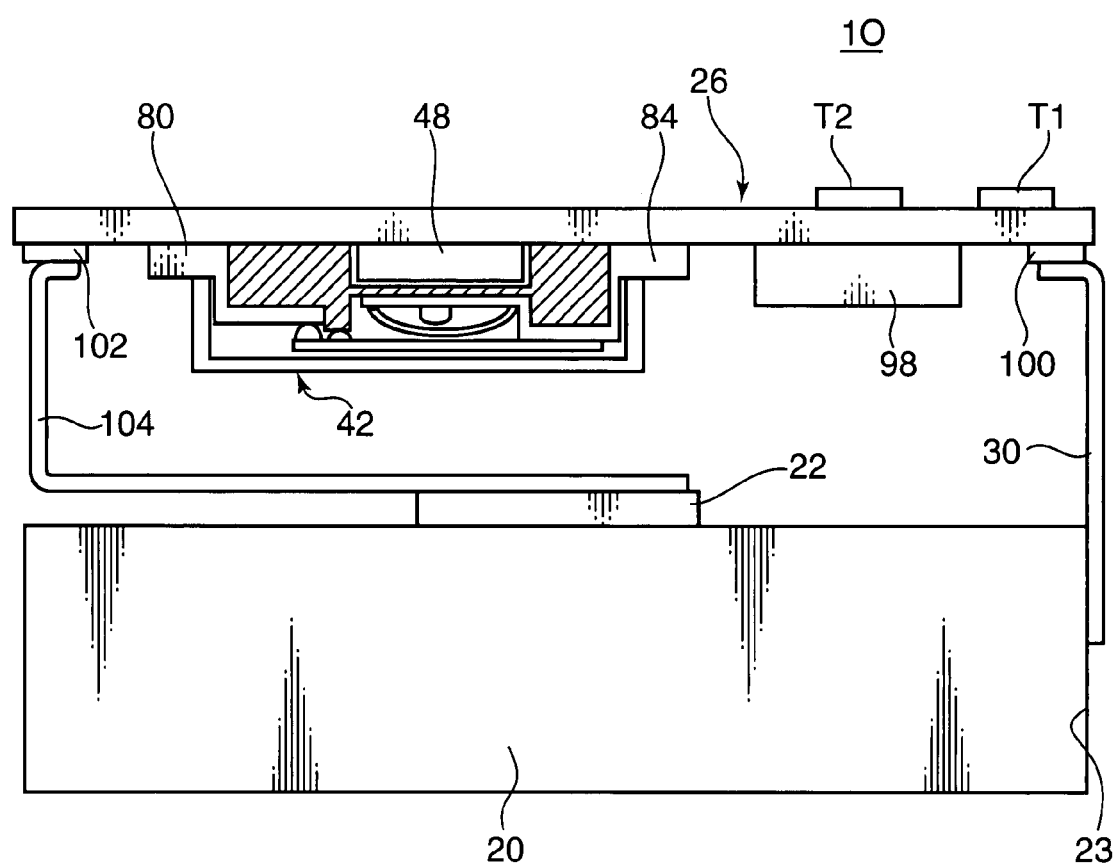
FIG. 43 is a diagram conceptually showing the arrangement of the protection circuit board with respect to a secondary battery and an electrical connection between the secondary battery and the protection circuit board in the case of constructing the battery pack shown in FIG. 39 using the protection circuit board shown in FIG. 42.

FIG. 43 is a diagram conceptually showing the arrangement of the protection circuit board 26 with respect to the secondary battery 20 and the electrical connection relationship between the secondary battery 20 and the protection circuit board 26 in the case where the battery pack 1o shown in FIG. 39 is constructed using the protection circuit board 26 shown in FIG. 42. In FIG. 43, the casing 18 for accommodating the secondary battery 20 and the casing 24 for accommodating the protection circuit board 26 are not shown.

Specifically, the protection circuit board 26 is arranged such that the side thereof mounted with the heat-sensitive protection switch device 42 and the like faces the secondary battery 20, the first mounting electrode 100 of the protection circuit board 26 and the negative electrode terminal 23 of the secondary battery 20 are connected by the connection terminals 30 (see FIG. 39), the second mounting electrode 102 and the positive electrode terminal 22 of the secondary battery 20 are connected by the connection terminal 104, and the connection terminals T1, T2 are exposed at the windows 28 (see FIG. 39) of the casing 24 by fitting the unillustrated casing 24 accommodating the protection circuit board 26 into the unillustrated casing 18 accommodating the secondary battery 20. In this way, the battery pack 1o is constructed. It should be noted that a clearance between the secondary battery 20 and the protection circuit board 26 can be filled with insulating resin or the like. In this way, the cover body 68 of the heat-sensitive protection switch device 42 preferably has a sealed construction in the case of filling the insulating resin.

Figure 44:
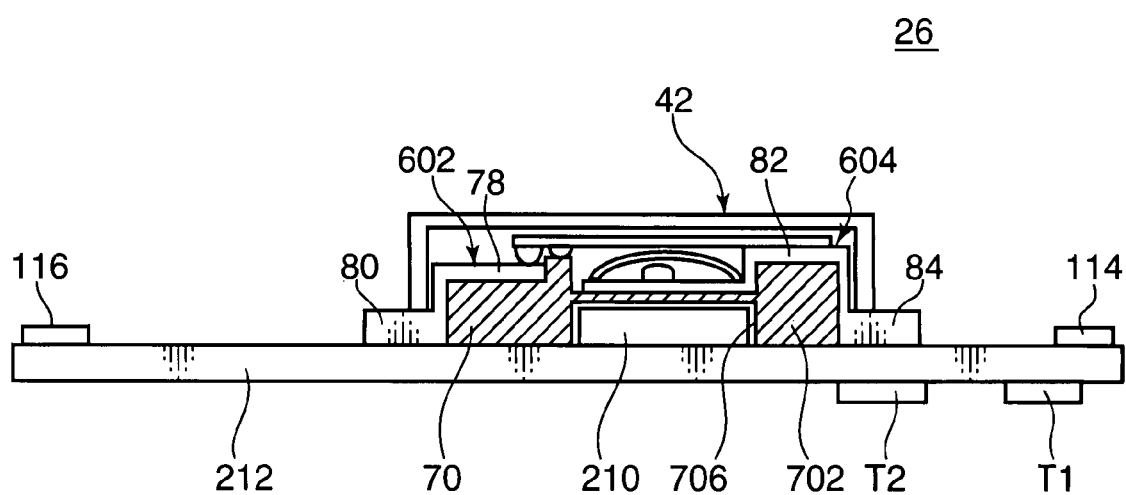
FIG. 44 is a side view of a protection circuit board constructed by using IC devices formed into semiconductor integrated circuits on a wiring board and mounting these on a wiring board.

FIG. 44 is a side view of a protection circuit board 26 constructed by using and mounting the heat-sensitive protection switch device 42 constructed as above and an IC device 210 in the form of a semiconductor integrated circuit including the protection circuit 40 except the heat-sensitive protection switch device 42 on a wiring board 212. This protection circuit board 26 is constructed, for example, by surface-mounting the heat-sensitive protection switch device 42 by connecting the first and second mounting terminals 80, 84 to unillustrated lands of the wiring board 212 by means of electrically conductive adhesive or the like such that the IC device 210 is accommodated into the recess 706 of the heat-sensitive protection switch device 42 after fixing the IC device 210 to the top surface of the wiring board 212 by means of heat resistant adhesive or the like such that the heater 48 faces the bimetal element 88.

Here, a first mounting electrode 114 and a second mounting electrode 116 for the connection with the positive electrode terminal 22 and the negative electrode terminal 23 of the secondary battery 20 are arranged at the opposite ends of the top surface of the wiring board 212 constructing the protection circuit board 26, and the connection terminals T1 and T2 are arranged on the underside thereof. Unillustrated wiring patterns for the wire connection of the heat-sensitive protection switch device 42, the IC device 210, the first mounting electrode 114, the second mounting electrode 116 and the connection terminals T1, T2 are also arranged on the wiring board 212.

In the protection circuit board 26 thus constructed, the heat-sensitive protection switch device 42 can be mounted on the wiring board 212 independently of the mounting of the IC device 210 including the heater 48 after the IC device 210 including the heater 48 is mounted on the wiring board 212 since the recess 706 between the first and second supporting members 70 and 702 of the heat-sensitive protection switch device 42 is open to communicate with the outside. Thus, the protection circuit board 26 can be easily assembled and the miniaturization of the protection circuit board 26 can be advanced since the construction of the wiring board 212 is not complicated, which can lead to an advantage of advancing the miniaturization of the battery pack 1o.

Further in this protection circuit board 26, arrangement space for the components to be mounted on the wiring board 212 can be reduced since the IC device 210 is in the form of the semiconductor integrated circuit of the protection circuit except the heat-sensitive protection switch device 42, with the result that the miniaturization of the protection circuit board 26 can be further advanced and, hence, the miniaturization of the battery pack 1o can be further advanced. In this case, the IC device 210 including the heater 48 doubles as a heating element for heating the bimetal switch 66. In other words, the bimetal switch 66 is heated by heat generated by the heater 48 and heat generated by the IC device 210 excluding the heater 48.

Figure 45:
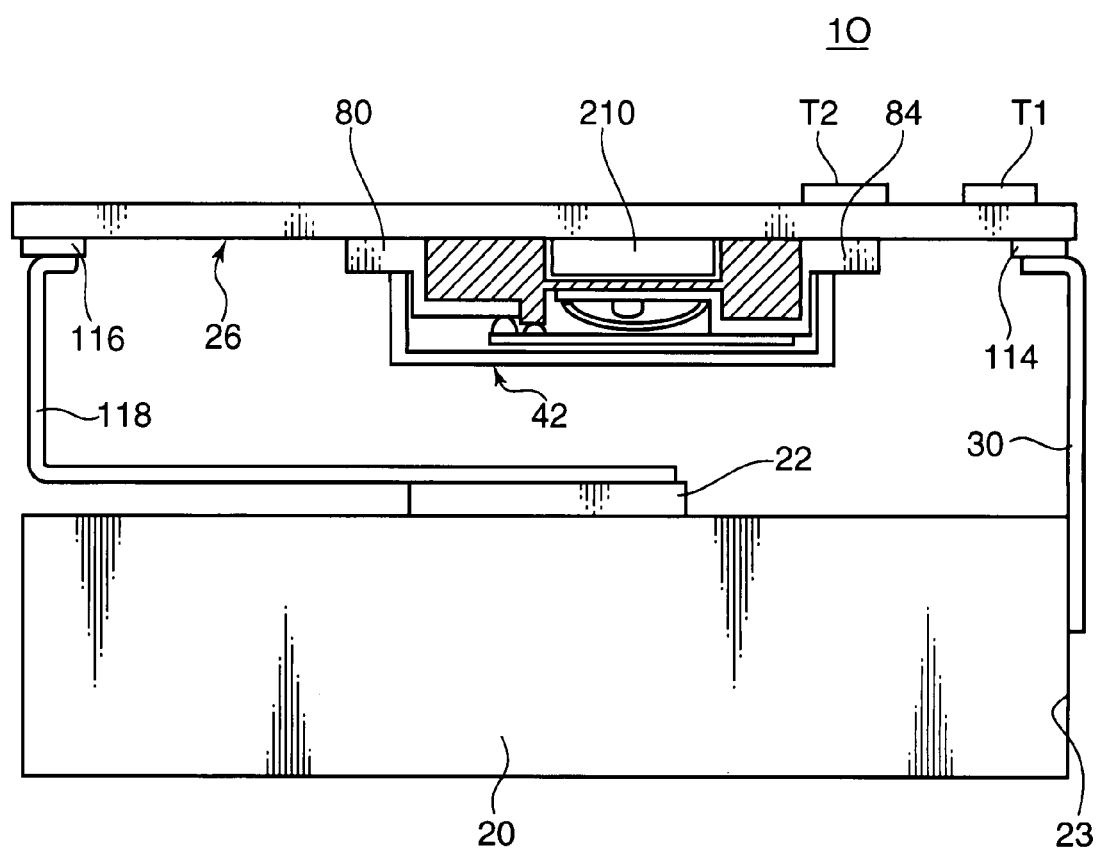
FIG. 45 is a diagram conceptually showing the arrangement of the protection circuit board with respect to the secondary battery and an electrical connection between the secondary battery and the protection circuit board in the case of constructing the battery pack shown in FIG. 39 using the protection circuit board shown in FIG. 44.

FIG. 45 is a diagram conceptually showing the arrangement of the protection circuit board 26 with respect to the secondary battery 20 and the electrical connection relationship between the secondary battery 20 and the protection circuit board 26 in the case where the battery pack 1o shown in FIG. 39 is constructed using the protection circuit board 26 shown in FIG. 44. In FIG. 45, the casing 18 for accommodating the secondary battery 20 and the casing 24 for accommodating the protection circuit board 26 are not shown.

Specifically, the protection circuit board 26 is arranged such that the side thereof mounted with the heat-sensitive protection switch device 42 and the like faces the secondary battery 20, the first mounting electrode 114 of the protection circuit board 26 and the negative electrode terminal 23 of the secondary battery 20 are connected by the connection terminals 30 (see FIG. 39), the second mounting electrode 116 and the positive electrode terminal 22 of the secondary battery 20 are connected by the connection terminal 118, and the connection terminals T1, T2 are exposed at the windows 28 (see FIG. 39) of the casing 24 by fitting the unillustrated casing 24 accommodating the protection circuit board 26 into the unillustrated casing 18 accommodating the secondary battery 20. In this way, the battery pack 1o is constructed. It should be noted that a clearance between the secondary battery 20 and the protection circuit board 26 can be filled with insulating resin or the like. In this way, the cover body 68 of the heat-sensitive protection switch device 42 preferably has a sealed construction in the case of filling the insulating resin.

Figure 46:
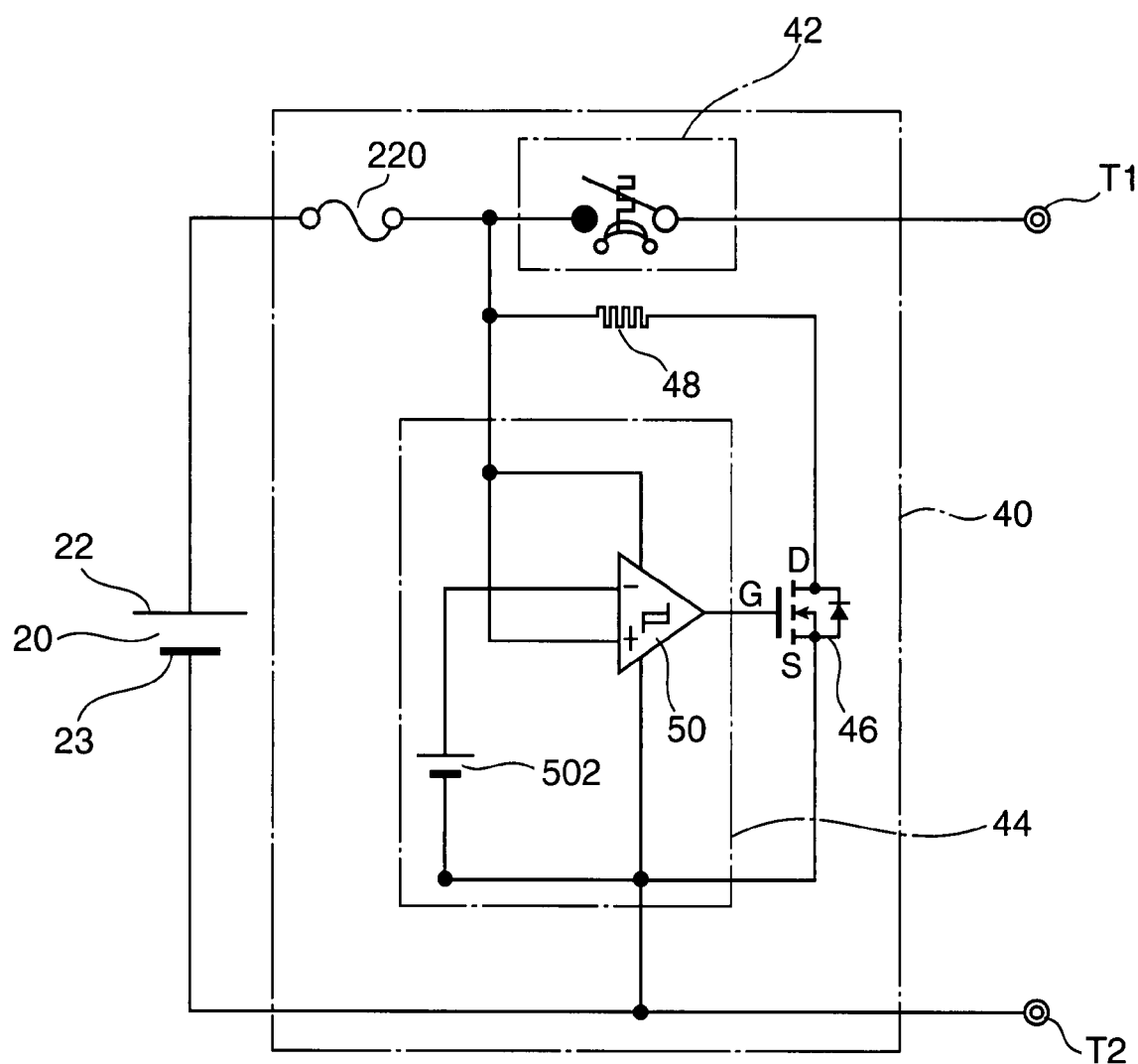
FIG. 46 is a circuit diagram showing another example of the electrical construction of the battery pack shown in FIG. 39.

FIG. 46 is a circuit diagram showing another electrical construction of the battery pack 1o shown in FIG. 39. In this construction example, a temperature fuse 220 is provided between the positive electrode terminal 22 of the secondary battery 20 and the heat-sensitive protection switch device 42 to construct the protection circuit 40 and the other construction is identical to the one shown in FIG. 40. Thus, no detailed description is given on common components by identifying them by the same reference numerals. Specifically, this construction example is designed to shut off the circuit by melting the temperature fuse 120 by heat generated by the heater 48 and the movable contact member 86, for example, if the movable contact 92 of the movable contact member 86 of the bimetal switch 66 is burnt to adhere to the first contact 78.

Figure 47:
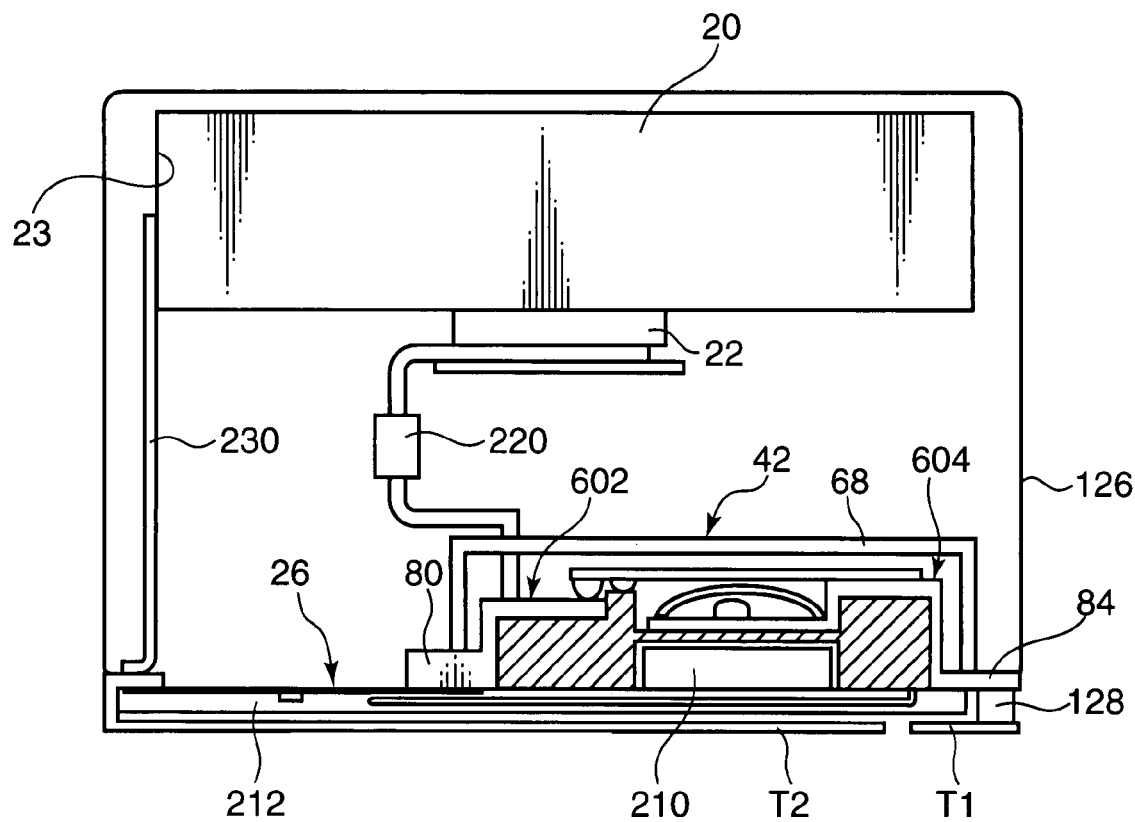
FIG. 47 is a diagram showing a battery pack having a construction different from the one shown in FIG. 39 by using a protection circuit board having a circuit construction shown in FIG. 46.

FIG. 47 is a diagram showing a battery pack 1p constructed using the protection circuit board 26 having a circuitry shown in FIG. 46 mounted with the heat-sensitive protection switch device 42 and having a construction different from the one shown in FIG. 39. In this construction example, the battery pack 1p is such that the temperature fuse 220 is provided between the positive electrode terminal 22 of the secondary battery 20 shown in FIG. 2 and the heat-sensitive protection switch device 42, the secondary battery 20 is accommodated into a casing 126 made of an insulating material and having an opening such that the positive electrode terminal 22 of the secondary battery 20 faces toward the opening, and the protection circuit board 26 is mounted into the casing 126 with the heat-sensitive protection switch device 42 of the protection circuit board 26 fitted in the opening of the casing 126.

The protection circuit board 26 of this embodiment has a construction basically similar to the one shown in FIG. 44 except the mounting construction for the connection terminals T1, T2. Specifically, in this embodiment, the connection terminal T1 is formed by a metal sheet connected to the second mounting terminal 84 of the heat-sensitive protection switch device 42 via a metal spacer 128 disposed on a side surface of the wiring board 212; the connection terminal T2 is formed by a metal plate mounted on an edge of the top surface of the wiring board 212, bent at a side surface of the wiring board 212 and extending up to the underside of the wiring board 212; the temperature fuse 220 is connected between the positive electrode terminal 22 of the secondary battery 20 and the first wiring conductor 602 of the heat-sensitive protection switch device 42; and the negative electrode terminal 23 of the secondary battery 20 and the connection terminal T2 are connected by a metal conductor 230. In this way, the battery pack 1p is constructed.

For the battery pack 1p having the above construction, the miniaturization is advanced to be easily handled similar to the battery pack 1o shown in FIGS. 43 and 45. Similar to the preceding construction examples, a clearance between the secondary battery 20 and the protection circuit board 26 can be filled with insulating resin. The cover body 68 of the heat-sensitive protection switch device 42 preferably has a sealed construction in the case of filling the insulating resin in this way.

In the battery pack 1o according to the present invention, the heat-sensitive protection switch device 42 can be mounted on the wiring board 96, 212 independently of the mounting of the heater 48 or the IC device 210 after the heater 48 or the IC device 210 is mounted on the wiring board 96, 212 since the recess 706 between the first and second supporting members 70 and 702 of the frame body 60 open to communicate with the outside as in the above embodiments. Thus, the protection circuit board 26 can be easily assembled and the miniaturization of the protection circuit board 26 can be advanced since the construction of the wiring board 96 is not complicated, which can lead to advancement in the miniaturization of the battery packs 1o, 1p.

The battery pack 1o according to the fifteenth embodiment of the present invention is not limited to the above, and various modifications as described below may be adopted according to needs.

(1) Although the above battery pack 1o is provided with the heat-sensitive protection switch device 42 and the cover body 68, the fifteenth embodiment is not limited to such a construction. For example, the cover body 68 may be omitted if the bimetal switch 66 needs not be protected from external pressure, dust and the like.

Figure 48:
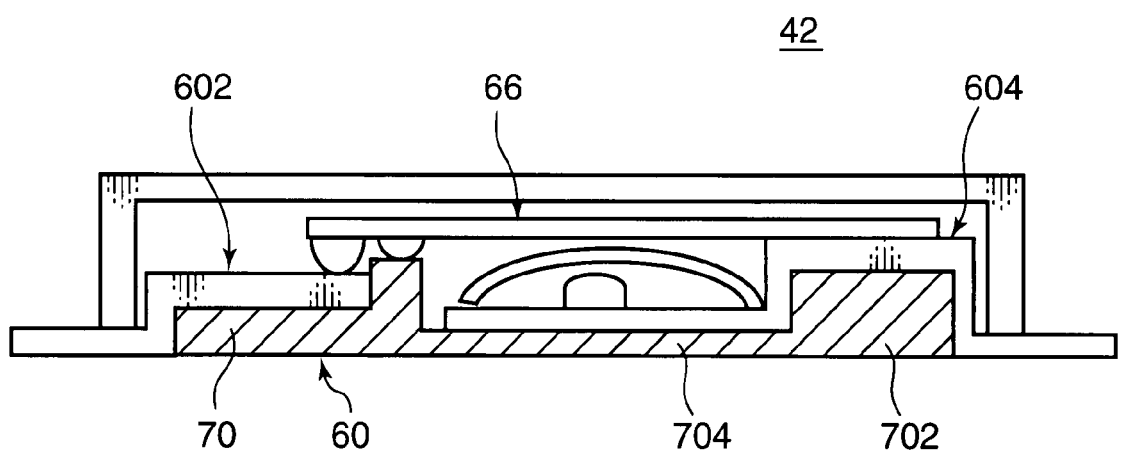
FIG. 48 is a section of an essential portion showing another example of the specific construction of the heat-sensitive protection switch device.

(2) Although the recess 706 is formed between the first and second supporting members 70 and 702 at the underside of the coupling member 704 of the frame body 60 of the heat-sensitive protection switch device 42 and is open to communicate with the outside in the above battery pack 1o, the fifteenth embodiment is not limited thereto. For example, as shown in FIG. 48, the frame body 60 may be formed such that the underside of the coupling member 704 and those of the first and second supporting members 70, 702 are flush with each other and, hence, no constructional element is present at least between the first and second supporting members 70 and 702 on the underside of the frame 60.

Figure 49:
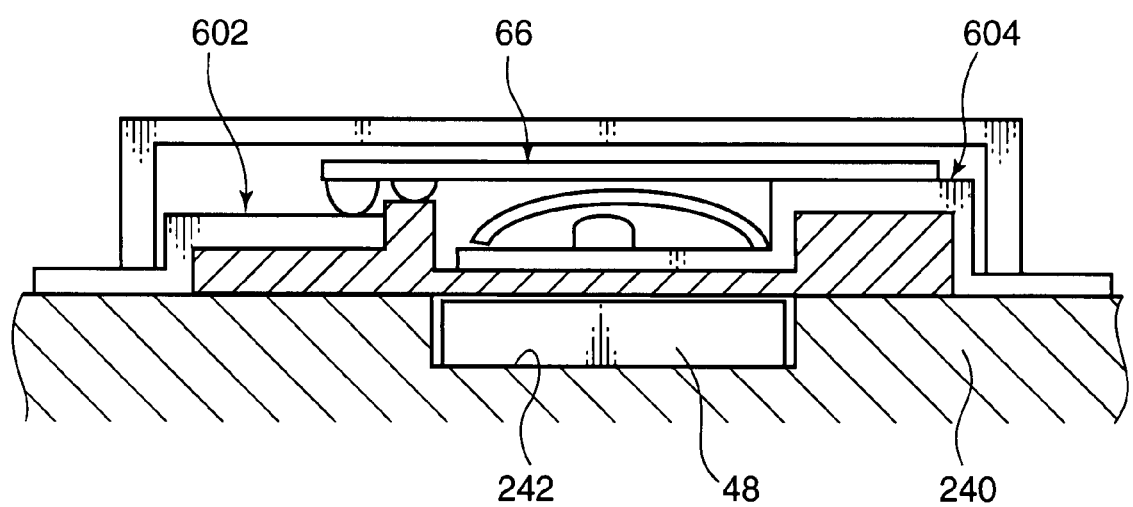
FIG. 49 is a diagram showing the mounting construction of the heat-sensitive protection switch device shown in FIG. 48 on a wiring board.

In the case of such a construction, a depression 242 may be formed in a wiring board 240 on which the heat-sensitive protection switch device 42 is to be mounted and the heat-sensitive protection switch device 42 may be mounted on the wiring board 240 such that a section between the first and second supporting members 70 and 702 faces the depression 242 with the heater 48 (or IC device 210) arranged in this depression 242 as shown in FIG. 49. In short, it is sufficient to provide an opening at the underside of the frame body 60 to arrange the heater 48 or the IC device 210 for heating a heat-sensitive switching element such as the bimetal switch 66 via the first and second supporting members 70, 702.

(3) Although the heat-sensitive protection switch device 42 causes the bimetal switch 66 to operate by Joule heat generated by the contact resistance between the movable contact 92 of the movable contact member 86 and the first contact 78 if an excessive discharge current flows into the circuit in the above battery pack 1o, the fifteenth embodiment is not limited thereto. For example, the heat-sensitive protection switch device 42 may operate only if an excessive charge current flows into the circuit.

(4) Although the heat-sensitive protection switch device 42 is constructed using the bimetal switch 66 comprised of the movable contact member 86 and the bimetal element 88 in the above battery pack 1o, the fifteenth embodiment is not limited thereto. For example, the movable contact member 86 may be constructed by a bimetal. In such a case, the coupling member 704 is not necessarily needed since the bimetal element 88 is unnecessary.

(5) Although the heat-sensitive protection switch device 42 is constructed using the bimetal switch 66 in the above battery pack 1o, the fifteenth embodiment is not limited thereto. For example, another heat-sensitive switching element such as a PTC thermistor element (positive characteristic thermistor element) which is made of polymer and whose resistance value suddenly increases upon reaching a specified temperature may be used instead of the bimetal switch 66 as a heat-sensitive switching element. If an excessive discharge current flows when the PTC thermistor element is used instead of the bimetal switch 66 in this way, the circuit can be substantially turned off by the PTC thermistor element taking a high resistance value by the self-heat generation. In the case of using the PTC thermistor element, the coupling member 704 is not necessary since the PTC thermistor element can be held by connecting a pair of terminals thereof to the first contact (first connection point) 78 and the second contact (second connection point) 82.

(6) In the above battery pack 1o, the protection circuit having the construction shown in FIG. 40 or 46 is illustrated as the protection circuit 40 for turning the charging/discharging circuit off if an excessive charge current or an excessive discharge current flows into the secondary battery 20. However, the fifteenth embodiment is not limited thereto. For example, a circuit for preventing the chattering of the bimetal switch 66 may be added as the protection circuit 40.

(7) Although the heat-sensitive protection switch device 42 is described to be used for the protection circuit 40 constructing the battery packs 1o, 1p, the fifteenth embodiment is not limited thereto. It goes without saying that the heat-sensitive protection switch device 42 can also be used to construct a protection circuit for an electric part other than the battery packs 1o, 1p.

(8) Although the heat-sensitive protection switch device 42 is made surface-mountable on the wiring board by bending the first and second mounting terminals 80, 84 outward in the above battery pack 1o, the fifteenth embodiment is not limited thereto. For example, the heat-sensitive protection switch device 42 may be made surface-mountable on the wiring board by bending the first mounting terminal 80 toward the underside of the first supporting member 70 and bending the second mounting terminal 84 toward the underside of the second supporting member 702.

(9) Although the first and second mounting terminals 80, 84 of the heat-sensitive protection switch device 42 are constructed to be surface-mountable in the above battery pack 1o, the fifteenth embodiment is not limited thereto. For example, the first and second mounting terminals 80, 84 may be axially constructed and may be mounted by being inserted into mount holes formed in the wiring board.

Figure 50:
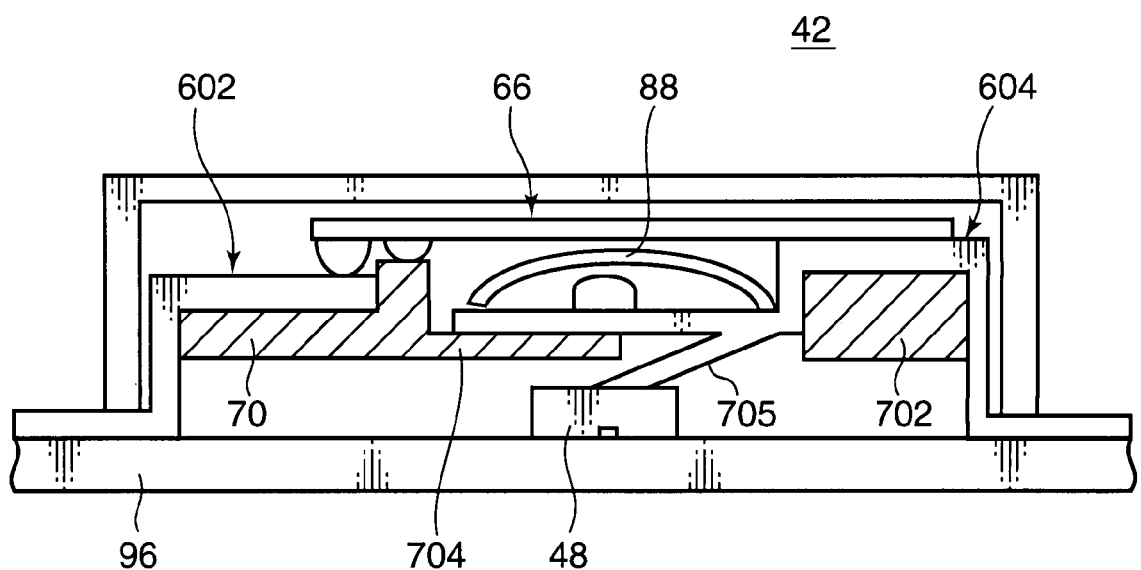
FIG. 50 is a section of an essential portion showing still another example of the specific construction of the heat-sensitive protection switch device.

(10) As shown in FIG. 50, the upper surface of the first supporting member 70 is placed on the lower surface of the first wiring conductor 602, the upper surface of the second supporting member 702 is placed on the lower surface of the second wiring conductor 604, and a space portion is defined between the lower surfaces of the first and second supporting members 70, 704 and the wiring board 96. Then, the right half of the coupling member 704 may be removed so that the lower surface of the second wiring conductor 604 at the side of the coupling member 704 communicates with the space, and a pressing terminal 705 for biasing the heater 48 arranged on the wiring board 96 toward the wiring board 96 to electrically connect the bimetal element 88 and the heater 48 may be mounted in the vicinity of the right end of the lower surface of the second wiring conductor 604. In this way, the bimetal element 88 and the heater 48 can be securely electrically connected. Here, a PTC can be employed as the heater 48.

SUMMARY OF THE INVENTION (1) A protection circuit for a secondary battery according to the present invention comprises a first and a second connection terminals for connecting a charging device for charging the secondary battery and/or a load device driven by a discharge current from the secondary battery; a third and a fourth connection terminals connected with the opposite electrodes of the secondary battery; a heat-sensitive switch that is provided between the first and third connection terminals and turned off in the case of exceeding a specified temperature set beforehand; a first heater for heating the heat-sensitive switch; and a protection controller for turning the heat-sensitive switch off by causing the first heater to generate heat if a physical quantity relating to the characteristic of the secondary battery exceeds a preset value of the physical quantity.

With this construction, if the physical quantity relating to the characteristic of the secondary battery exceeds the preset value of the physical quantity, the first heater is caused to generate heat by the protection controller and the heat-sensitive switch is heated by the first heater, whereby the heat-sensitive switch is turned off to cut off a charge or discharge current. Thus, the characteristic degradation of the secondary battery can be reduced. Further, the circuit can be simplified since the discharge current and the charge current can be cut off by one heat-sensitive switch.

(2) It is preferable that the physical quantity relating to the characteristic of the secondary battery is a voltage at the third connection terminal; and that the protection controller turns off the heat-sensitive switch by causing the heater to generate heat if the voltage at the third connection terminal exceeds a preset reference voltage.

With this construction, the heater is caused to generate heat by the protection controller and the heat-sensitive switch is heated by the heater to be turned off, thereby cutting off the charge current if the voltage applied to the third connection terminal exceeds the preset reference voltage. Thus, the secondary battery can be protected from overcharging.

(3) The first heater is preferably a PTC thermistor whose resistance value increases and decreases with temperature.

With this construction, since the heater is a PTC thermistor whose resistance value increases and decreases with temperature, if the heater is caused to generate heat, the resistance value thereof is increased by the heat generation thereof and the current flowing into the heater decreases. As a result, the excessive heat generation of the heater can be suppressed.

(4) The heat-sensitive switch is preferably one selected from a bimetal switch, a switch using a shape-memory alloy and a switch using a shape-memory resin.

With this construction, since the one selected from a bimetal switch, a switch using a shape-memory alloy and a switch using a shape-memory resin is used as the heat-sensitive switch, the heat-sensitive switch can be turned off in the case of exceeding a specified temperature set beforehand and if the charge or discharge current of the secondary battery exceeds a specified current value set beforehand can be turned off by the self-heat generation.

(5) It is preferable that a fuse connected in series with the heat-sensitive switch is further provided and that operating conditions of the heat-sensitive switch are set so that the heat-sensitive switch is turned off earlier than the fuse.

With this construction, since the heat-sensitive switch is turned off earlier than the fuse, the fuse does not melt unless the heat-sensitive switch is broken down, and the protecting operation for the secondary battery can be repeatedly performed. Further, if the heat-sensitive switch is broken down, the protecting operation for the secondary battery can be performed by the melting of the fuse. Therefore, the reliability of the protecting operation can be improved.

(6) It is preferable that the first heater is connected in parallel with the heat-sensitive switch; and that the protection controller includes a detector for detecting the physical quantity relating to the characteristic of the secondary battery.

With this construction, when the heat-sensitive switch is turned off, the discharge current flows into the first heater connected in parallel with the heat-sensitive switch and the first heater generates heat to heat the heat-sensitive switch, whereby the heat-sensitive switch is kept off. In this case, unless the first heater is, for example, connected in parallel with the heat-sensitive switch, there is a likelihood of an occurrence of chattering to repeatedly turning the heat-sensitive switch on and off as in the case where, after being turned off by the self-heat generation thereof, the heat-sensitive switch is turned on by natural cooling to have the discharge current of the secondary battery flown thereinto, and the heat-sensitive switch is turned off by the self-heat generation to cut off the discharge current. According to the present invention, the first heater connected in parallel with the heat-sensitive switch keeps the heat-sensitive switch off after the heat-sensitive switch is turned off by the self-heat generation. Thus, an occurrence of chattering can be suppressed.

(7) It is preferable that the physical quantity relating to the characteristic of the secondary battery is a voltage at the third connection terminal; that the detector detects the voltage at the third connection terminal; and that the protection controller turns the heat-sensitive switch off by causing the first heater to generate heat if the voltage detected by the detector exceeds a preset reference voltage.

With this construction, the voltage of the secondary battery as a physical quantity relating to the characteristic of the secondary battery is applied to the third connection terminal when the secondary battery is connected with the third and fourth connection terminals. If the voltage at the third connection terminal exceeds the preset reference voltage, the first heater is caused to generate heat by the protection controller and the heat-sensitive switch is heated by the first heater, whereby the heat-sensitive switch is turned off to cut off the charge current. Thus, the secondary battery can be protected from overcharging. Further, since the discharge current and the charge current can be cut off by one heat-sensitive switch, the circuit can be simplified.

(8) It is preferable that the physical quantity relating to the characteristic of the secondary battery is the temperature of the secondary battery; and that the protection controller turns the heat-sensitive switch off by causing the first heater to generate heat if the temperature of the secondary battery detected by the detector exceeds a preset temperature.

With this construction, the temperature of the secondary battery as the physical quantity relating to the characteristic of the secondary battery is detected by the detector. If the temperature detected by the detector exceeds the preset temperature, the first heater is caused to generate heat by the protection controller and the heat-sensitive switch is heated by the first heater to be turned off, thereby cutting off the charge and discharge currents. Thus, the secondary battery can be protected from excessive heat generation. Further, the discharge current and the charge current can be cut off by one heat-sensitive switch, the circuit can be simplified.

(9) It is preferable that a first rectifying element is so disposed between the first heater and the first connection terminal as to allow the discharge current of the secondary battery connected with the third connection terminal to flow in forward direction; and that the protection controller includes a switching device for connecting and disconnecting a connection point of the first heater and the first rectifying element and the second connection terminal and turns the switching device on if the physical quantity detected by the detector exceeds the preset value of the physical quantity.

With this construction, if the heat-sensitive switch is turned off to cut off the discharge current from the third connection terminal to the first connection terminal, the discharge current is caused to flow to the first heater connected in parallel with the heat-sensitive switch by the first rectifying element disposed to allow the discharge current of the secondary battery connected with the third connection terminal to flow in forward direction. Thus, the first heater generates heat to heat the heat-sensitive switch, wherefore the heat-sensitive switch can be kept off. If the physical quantity detected by the detector exceeds the preset value of the physical quantity, the switching device is turned on by the protection controller to form a current path extending from the first connection terminal to the second connection terminal via the heat-sensitive switch, the first heater and the switching device, and the first heater generates heat to heat the heat-sensitive switch. Therefore, the heat-sensitive switch can be turned off.

(10) It is preferable that the first heater includes a series circuit of a second and a third heaters; and that the protection controller includes a switching device for connecting and disconnecting a connection point of the second and third heaters and the fourth connection terminal and turns the switching device on if the physical quantity detected by the detector exceeds the preset value of the physical quantity.

With this construction, since the discharge current flows into the series circuit of the second and third heaters connected in parallel with the heat-sensitive switch when the heat-sensitive switch is turned off to cut off the discharge current from the third connection terminal to the first connection terminal, the second and third heaters generate heat to heat the heat-sensitive switch, whereby the heat-sensitive switch can be kept off. When the physical quantity detected by the detector exceeds the preset value of the physical quantity, the protection controller turns the switching device on to form a current path extending from the first connection terminal to the second connection terminal via the third heater and the switching device and the third heater generates heat to heat the heat-sensitive switch, whereby the heat-sensitive switch can be turned off.

(11) It is preferable that a fourth heater having one end thereof connected to the first connection terminal and adapted to heat the heat-sensitive switch is further provided; and that the protection controller includes a switching device for connecting and disconnecting the other end of the fourth heater and the second connection terminal and turns the switching device on if the physical quantity detected by the detector exceeds the preset value of the physical quantity.

With this construction, since the discharge current flows into the first heater connected in parallel with the heat-sensitive switch when the heat-sensitive switch is turned off to cut off the discharge current from the third connection terminal to the first connection terminal, the first heater generates heat to heat the heat-sensitive switch, whereby the heat-sensitive switch can be kept off. When the physical quantity detected by the detector exceeds the preset value of the physical quantity, the protection controller turns the switching device on to form a current path extending from the first connection terminal to the second connection terminal via the fourth heater and the switching device and the fourth heater generates heat to heat the heat-sensitive switch, whereby the heat-sensitive switch can be turned off.

(12) The resistance values of the first and fourth heaters are preferably so set as to equalize a heat value of the first heater by a discharge current from the secondary battery connected with the third connection terminal when the heat-sensitive switch is turned off and a heat value of the fourth heater by an output current from the charging device connected with the first connection terminal when the switching device is turned on.

With this construction, since the resistance values of the first and fourth heaters are so set as to equalize the heat value of the first heater by the discharge current from the secondary battery connected with the third connection terminal when the heat-sensitive switch is turned off and the heat value of the fourth heater by the output current from the charging device connected with the first connection terminal when the switching device is turned on, the heat values for heating the heat-sensitive switch can be equalized between the case where the heat-sensitive switch is turned off to protect the secondary battery from excessive discharge current and the case where the heat-sensitive switch is turned off to protect the secondary battery from overcharging.

(13) A second rectifying element is preferably so provided between the third connection terminal and the first heater as to allow the discharge current of the secondary battery connected with the third connection terminal in forward direction.

With this construction, when the heat-sensitive switch is turned off to cut off the discharge current from the third connection terminal to the first connection terminal, the discharge current is caused to flow into the first heater connected in parallel with the heat-sensitive switch by the second rectifying element for allowing the discharge current of the secondary battery connected with the third connection terminal to flow in forward direction. Thus, the first heater generates heat to heat the heat-sensitive switch, whereby the heat-sensitive switch can be kept off. When the heat-sensitive switch is turned off to cut off the charge current to the secondary battery connected with the third connection terminal, the flow of the charge current to the secondary battery via the first heater is suppressed by the second rectifying element.

(14) It is preferable that the second and third heaters are a PTC thermistor whose resistance value increases and decreases with temperature; that the PTC thermistor is substantially plate-shaped and formed with a groove for dividing at least one surface thereof into a plurality of areas; that some of the plurality of areas on the one surface of the PTC thermistor are used as a first electrode and at least some of the areas except those used as the first electrode are used as a second electrode; that the other surface of the PTC thermistor is used as a third electrode; that the first and third electrodes are used as connection terminals at the opposite ends of the second heater; and that the third and second electrodes are used as connection terminals at the opposite ends of the third heater.

With this construction, the protection circuit can be easily miniaturized since one PTC thermistor can be used as the second and third heater.

(15) It is preferable that the first and fourth heaters are a PTC thermistor whose resistance value increases and decreases with temperature; that the PTC thermistor is substantially plate-shaped and formed with a groove for dividing at least one surface thereof into a plurality of areas; that some of the plurality of areas on the one surface of the PTC thermistor are used as a first electrode and at least some of the areas except those used as the first electrode are used as a second electrode; that the other surface of the PTC thermistor is used as a third electrode; that the first and third electrodes are used as connection terminals at the opposite ends of the first heater; and that the third and second electrodes are used as connection terminals at the opposite ends of the fourth heater.

With this construction, the protection circuit can be easily miniaturized since one PTC thermistor can be used as the first and fourth heater.

(16) It is preferable that the groove divides the one surface of the PTC thermistor into two areas; and that one area divided by the groove is used as the first electrode and the other area is used as the second electrode.

With this construction, the one surface of the PTC thermistor is divided into two areas, and the one area is used as the first electrode while the other area is used as the second electrode. Thus, one PTC thermistor can be used as two heaters.

(17) It is preferable that the groove is a substantially crisscross groove for dividing the one surface of the PTC into four areas; that two adjacent ones of the four areas are used as the first electrode; and that the areas other than those used as the first electrode are used as the second electrode.

With this construction, the one surface of the PTC is divided into four areas by the substantially crisscross groove, and the two adjacent ones of the four areas are used as the first electrode while the areas other than those used as the first electrode are used as the second electrode. Thus, the PTC thermistor can be connected with a wiring pattern disposed to be connected to the first and second electrodes while being turned by 90°, thereby improving assemblability. Further, both surfaces may be divided by substantially crisscross grooves to be identically shaped, one surface may be connected as the first and second electrodes as described above while the front part of the other surface may be connected as the third electrode. Thus, intended heaters can be built regardless of whether the PTC thermistor is turned upside down or in which direction the PTC thermistor is turned by 90°, wherefore assemblability can be further improved.

(18) The PTC thermistor is preferably shaped such that vertical and horizontal directions can be physically determined.

With this construction, since having such a shape that vertical and horizontal directions can be physically determined, the PTC thermistor can be easily oriented upon mounting the PTC thermistor on the wiring pattern disposed to be connected to the first and second electrodes.

(19) It is preferable that the heat-sensitive switch is turned off in the case of exceeding a specified operating temperature by the self-heat generation due a current flowing thereinto and in the case of exceeding the operating temperature by being externally heated; and that the protection controller includes a switching device for controlling the energization of the first heater, a first overcharging protector for causing the switching device to energize the first heater if a voltage between the third and fourth connection terminals exceeds a specified overcharging protection voltage, and a second overcharging protector for causing the switching device to energize the first heater if a voltage between the first and second connection terminals exceeds the overcharging protection voltage.

With this construction, the first overcharging protector causes the switching device to energize the heater if the voltage between the third and fourth connection terminals (voltage of the secondary battery) exceeds the preset overcharging protection voltage, and the heat-sensitive switch is heated by the heater to be turned off, thereby cutting off the charge current. Thus, the secondary battery can be protected from overcharging.

Further, since the heat-sensitive switch is turned off by the self-heat generation to cut off the discharge current if the discharge current from the secondary battery exceeds the specified current value, the secondary battery can be protected from overcurrent. Thus, the FET 1006 for preventing overcurrent, the reference voltage generator 1009, and the comparator 1111 for detecting overcurrent as shown in FIG. 51 are unnecessary, wherefore the circuit can be simplified.

Further, since the discharge current and the charge current are cut off by the heat-sensitive switch, the circuit can be simplified.

Here, the second overcharging protector is assumed not to exist. If the power of the secondary battery is consumed by the heater in an overcharging protecting state, the voltage of the secondary battery decreases, the energization of the first heater is stopped by the switching device and the heating of the heat-sensitive switch is stopped. When being naturally cooled to or below the operating temperature, the heat-sensitive switch is turned on again to allow the charge current from the charging device to flow, thereby charging the secondary battery again. If the charging of the secondary battery continues, the voltage of the secondary battery exceeds the overcharging protection voltage and the heat-sensitive switch is turned off again. In this way, chattering occurs if the charging device is kept connected between the first and second connection terminals in the overcharging protecting state.

However, the second overcharging protector is provided according to the present invention. Thus, if the charging device is connected between the first and second connection terminals and keeps charging and the voltage between the first and second connection terminals exceeds the overcharging protection voltage in the overcharging protecting state, the switching device is caused to energize the first heater. Thus, even if the voltage of the secondary battery falls to or below the overcharging protection voltage, the heat-sensitive switch is kept on. As a result, the chattering of the heat-sensitive switch occurring in the overcharging protecting state can be prevented. Therefore, the degradation of the heat-sensitive switch can be prevented.

(20) It is preferable that the first overcharging protector includes a first comparator for detecting whether or not a voltage between the third and fourth connection terminals exceeds the overcharging protection voltage; that the second overcharging protector includes a second comparator for outputting a high-level signal if a voltage between the first and second connection terminals has exceeded the overcharging protection voltage; and that the switching device energizes the first heater if at least either one of the first and second comparators has outputted a high-level signal.

With this construction, since the voltage between the third and fourth connection terminals (voltage of the secondary battery) and the one between the first and second connection terminals are detected by the comparators, such detections can be made with high accuracy.

(21) The switching device preferably includes an OR gate having an input terminal thereof connected to output terminals of the first and second comparators, and an n-channel field-effect transistor having a gate thereof connected to an output terminal of the OR gate, having a drain thereof connected with the first heater, and having a source thereof connected to the second and fourth connection terminals.

With this construction, since the switching device includes the OR gate and the n-channel field-effect transistor, the first heater can be more securely heated to securely turn the heat-sensitive switch off if the voltage between the third and fourth connection terminals (voltage of the secondary battery) has exceeded the overcharging protection voltage or if the voltage between the first and second connection terminals has exceeded the overcharging protection voltage.

(22) It is preferable to further provide a short-circuit protector for causing the switching device to energize the first heater if a voltage between the third and fourth connection terminals exceeds a sum of a voltage between the first and second connection terminals and a specified short-circuit protection voltage.

With this construction, the short-circuit protector causes the first heater to be heated to keep the heat-sensitive switch off upon judging that the first and second connection terminals are short-circuited or such a low resistor as to cause overcurrent is connected if a voltage obtained by subtracting the voltage between the first and second connection terminals from the voltage of the secondary battery is above the short-circuit protection voltage in an overcurrent protecting state. Thus, the chattering of the heat-sensitive switch in the overcurrent protecting state can be prevented. As a result, overcurrent that flows during the chattering of heat-sensitive switch can be prevented if such a load as to cause overcurrent is kept connected with the first and second connection terminals in the overcharging protecting state.

(23) It is preferable that the first overcharging protector includes a first comparator for detecting whether or not a voltage between the third and fourth connection terminals exceeds an overcharging protection voltage; that the second overcharging protector includes a second comparator for outputting a high-level signal if a voltage between the first and second connection terminals has exceeded the overcharging protection voltage; that the short-circuit protector includes a third comparator for outputting a high-level signal if the voltage between the third and fourth connection terminals exceeds a sum of the voltage between the first and second connection terminals and the short-circuit protection voltage; and that the switching device energizes the first heater if at least one of the first to third comparators has outputted a high-level signal.

With this construction, since the first comparator detects whether or not the voltage between the third and fourth connection terminals (voltage of the secondary battery) is above the overcharging protection voltage, the second comparator detects whether or not the voltage between the first and second connection terminals is above the overcharging protection voltage, and the third comparator detects whether or not the voltage of the secondary battery is above the sum of the voltage between the first and second connection terminals and the short-circuit protection voltage. Thus, these detections can be made with high accuracy.

(24) The switching device preferably includes an OR gate having an input terminal thereof connected to output terminals of the first to third comparators, and an n-channel field-effect transistor having a gate thereof connected to an output terminal of the OR gate, having a drain thereof connected to the first heater, and having a source thereof connected to the second and fourth connection terminals.

With this construction, since the switching device includes the OR gate and the n-channel field-effect transistor, the first heater can be more securely heated to securely turn the heat-sensitive switch off if the voltage between the third and fourth connection terminals (voltage of the secondary battery) has exceeded the overcharging protection voltage, if the voltage between the first and second connection terminals has exceeded the overcharging protection voltage or if the voltage obtained by subtracting the voltage between the first and second connection terminals from the voltage of the secondary battery has exceeded the short-circuit protection voltage.

(25) It is preferable to further provide a temperature controller for causing the switching device to stop energizing the first heater if the temperature of the first heater has reached to a specified upper limit temperature higher than the operating temperature of the heat-sensitive switch.

With this construction, the temperature controller causes the energization of the first heater to be stopped if the temperature of the first heater has reached to the upper limit temperature higher than the operating temperature of the heat-sensitive switch. Thus, it can be prevented to heat the heat-sensitive switch to or above the upper limit temperature and, thereby, to prevent the melting of the heat-sensitive switch while protection from overcharging is achieved.

(26) It is preferable that the first overcharging protector includes a first comparator for outputting a high-level signal if a voltage between the third and fourth connection terminals exceeds an overcharging protection voltage; that the second overcharging protector includes a second comparator for outputting a high-level signal if a voltage between the first and second connection terminals has exceeded the overcharging protection voltage; that the short-circuit protector includes a third comparator for outputting a high-level signal if the voltage between the third and fourth connection terminals exceeds a sum of the voltage between the first and second connection terminals and the short-circuit protection voltage; that the temperature controller includes a temperature sensor for detecting the temperature of the first heater and a fourth comparator for outputting a low-level signal if temperature detected by the temperature sensor has reached the upper limit temperature; and that the switching device includes an OR gate having an input terminal thereof connected to output terminals of the first to third comparators, an AND gate having an input terminal thereof connected to an output terminal of the OR gate and an output terminal of the fourth comparator, and an n-channel field-effect transistor having a gate thereof connected to an output terminal of the AND gate, having a drain thereof connected to the first heater, and having a source thereof connected to the second and fourth connection terminals.

With this construction, the first overcharging protector, the second overcharging protector, the short-circuit protector and the temperature controller are constructed by the first to fourth comparators, and the switching device is constructed by the OR gate, the AND gate and the n-channel field-effect transistor. Thus, the secondary battery can be securely protected from overcharging and overcurrent.

(27) It is preferable that the heat-sensitive switch is turned off in the case of exceeding a specified operating temperature by self-heat generation due a current flowing thereinto and in the case of exceeding the operating temperature by being externally heated; and that the protection controller includes a switching device for controlling the energization of the first heater, a first overcharging protector for causing the switching device to energize the first heater if the voltage between the third and fourth connection terminals exceeds a specified overcharging protection voltage and a temperature controller for causing the switching device to stop energizing the first heater if the temperature of the first heater has reached a specified upper limit temperature higher than the operating temperature of the heat-sensitive switch.

With this construction, in addition to the protection of the secondary battery from overcharging and the simplification of the circuit, the temperature controller can prevent the melting of the heat-sensitive switch by preventing the heat-sensitive switch from being heated to or above the upper limit temperature while realizing protection from overcharging since stopping the energization of the first heater if the temperature of the first heater has reached the upper limit temperature higher than the operating temperature of the heat-sensitive switch.

(28) It is preferable that the first overcharging protector includes a first comparator for outputting a high-level signal if the voltage between the third and fourth connection terminals exceeds the overcharging protection voltage; that the second overcharging protector includes a second comparator for outputting a high-level signal if the voltage between the first and second connection terminals exceeds the overcharging protection voltage; that the short-circuit protector includes a third comparator for outputting a high-level signal if the voltage between the third and fourth connection terminals exceeds a sum of the voltage between the first and second connection terminals and the short-circuit protection voltage; that the temperature controller includes a temperature sensor for detecting the temperature of the first heater and a fourth comparator for outputting a low-level signal if the temperature detected by the temperature sensor has reached the upper limit temperature; and that the switching device includes an OR gate having an input terminal thereof connected with output terminals of the first to third comparators, an AND gate having an input terminal thereof connected to an output terminal of the OR gate and an output terminal of the fourth comparator, and an n-channel field-effect transistor having a gate thereof connected to an output terminal of the AND gate, a drain thereof connected to the first heater, and a source thereof connected to the second and fourth connection terminals.

With this construction, the first comparator detects whether or not the voltage between the third and fourth connection terminals (voltage of the secondary battery) is above the overcharging protection voltage, the temperature sensor detects the temperature of the first heater and the fourth comparator detects whether or not the temperature of the first heater is above the upper limit temperature. Thus, these detections can be made with high accuracy.

(29) It is preferable that the first overcharging protector includes a first comparator for outputting a high-level signal if the voltage between the third and fourth connection terminals exceeds the overcharging protection voltage; that the temperature controller includes a temperature sensor for detecting the temperature of the first heater and a fourth comparator for outputting a low-level signal if the temperature detected by the temperature sensor has reached the upper limit temperature; and that the switching device causes the first heater to be energized if high-level signals are outputted from both first and fourth comparators while causing the energization of the first heater to be stopped if a low-level signal is outputted from at least either one of the two comparators.

With this construction, since the switching device is constructed by the AND gate and the n-channel field-effect transistor, the first heater can be accurately turned on if the voltage between the third and fourth connection terminals (voltage of the secondary battery) has exceeded the overcharging protection voltage, whereby the heating of the first heater can be accurately stopped if the temperature of the first heater has exceeded the upper limit temperature.

(30) It is preferable to further provide a temperature fuse connected between the heat-sensitive switch and the third connection terminal and an upper limit temperature changer for changing the upper limit temperature to the one higher than the melting temperature of the temperature fuse if the voltage between the third and fourth connection terminals has exceeded a second overcharging protection voltage higher than the overcharging protection voltage.

With this construction, if charging is continued in an overcharging protecting state, the temperature of the first heater further increases to eventually reach the upper limit temperature. If the heat-sensitive switch is melted, charging is continued even if the temperature of the first heater has reached the upper limit temperature. If charging is continued and the voltage between the third and fourth connection terminals (voltage of the secondary battery) exceeds the second overcharging protection voltage, the upper limit temperature is changed to the one higher than the melting temperature of the temperature fuse. Thus, the temperature fuse can be securely melted and the secondary battery can be protected from overcharging even if the heat-sensitive switch is melted.

(31) It is preferable that the heat-sensitive switch is connected between the first and third connection terminals and is turned off in the case of exceeding a specified operating temperature by self-heat generation due a current flowing thereinto and in the case of exceeding the operating temperature by being externally heated; and that the protection controller includes a switching device for controlling the energization of the first heater, a first overcharging protector for causing the switching device to energize the first heater if the voltage between the third and fourth connection terminals exceeds a specified overcharging protection voltage and a short-circuit protector for causing the switching device to energize the first heater if the voltage between the third and fourth connection terminals exceeds a sum of the voltage between the first and second connection terminals and a specified short-circuit protection voltage.

With this construction, the secondary battery can be protected from overcharging, the circuit can be simplified, and the chattering of the heat-sensitive switch in the overcurrent protecting state can be prevented.

(32) It is preferable that the first overcharging protector includes a first comparator for detecting whether or not the voltage between the third and fourth connection terminals exceeds the overcharging protection voltage; that the short-circuit protector includes a third comparator for outputting a high-level signal if the voltage between the third and fourth connection terminals exceeds a sum of the voltage between the first and second connection terminals and a specified short-circuit protection voltage; and that the switching device energizes the first heater if at least either one of the first and third comparators has outputted a high-level signal.

With this construction, since the voltage between the third and fourth connection terminals (voltage of the secondary battery) and the voltage between the first and second connection terminals are detected by the comparators, such detections can be made with high accuracy.

(33) The switching device preferably includes an OR gate having an input terminal thereof connected to output terminals of the first and third comparators, and an n-channel field-effect transistor having a gate thereof connected to an output terminal of the OR gate, a drain thereof connected to the first heater, and a source thereof connected to the second and fourth connection terminals.

With this construction, since the switching device is constructed by the OR gate and the n-channel field-effect transistor, the first heater can be more securely heated and the heat-sensitive switch can be more securely turned off if the voltage between the third and fourth connection terminals (voltage of the secondary battery) has exceeded the overcharging protection voltage or if a voltage obtained by subtracting the voltage between the first and second connection terminals from the voltage of the secondary battery has exceeded the short-circuit protection voltage.

(34) A resistor is preferably connected in parallel with the heat-sensitive switch.

With this construction, if such a load as to cause overcurrent is detached from the first and second connection terminals in an overcurrent protecting state, a current from the secondary battery flows to the resistor connected in parallel with the heat-sensitive switch, whereby the voltage between the third and fourth connection terminals (voltage of the secondary battery) and the voltage between the first and second connection terminals become substantially equal to each other. Since the voltage of the secondary battery is, then, below the sum of the voltage between the first and second connection terminals and the short-circuit protection voltage, the heating of the first heater is stopped and the heat-sensitive switch is turned on. Therefore, the protection circuit can be quickly returned from the overcurrent protecting state to the normal state if the load is detached in the overcurrent protecting state to cancel a short-circuited state or a low-resistance state.

(35) It is preferable to further provide a power supply controller for stopping the supply of power from the secondary battery to the protection circuit if the voltage between the third and fourth connection terminals falls to or below a specified excessive discharge voltage.

With this construction, since the supply of power from the secondary battery to the protection circuit is stopped if the voltage between the third and fourth connection terminals (voltage of the secondary battery) falls to or below the excessive discharge voltage, the power consumption of the secondary battery can be prevented, and the secondary battery can be protected from excessive discharge in a state where the first and second connection terminals are open.

(36) It is preferable that the heat-sensitive switch is a bimetal switch; and that the protection controller includes an overcharging protector for energizing the first heater to turn the bimetal switch off if the voltage between the third and fourth connection terminals exceeds a specified overcharging protection voltage and a breaker for counting the number of times the bimetal switch is turned off by the overcharging protector and breaking the electrical connection with the secondary battery if a count value has exceeded a specified value determined based on an operation assurance number.

With this construction, since the overcharging protector energizes the first heater to turn the bimetal switch off, thereby cutting off a charge current, if the voltage between the third and fourth connection terminals (voltage of the secondary battery) exceeds the preset overcharging protection voltage, the secondary battery can be protected from overcharging.

Further, if a discharge current from the secondary battery has exceeded a specified current value, the bimetal switch is turned off by self-heat generation to cut off the discharge current. Thus, the bimetal switch can protect the secondary battery from overcurrent. Therefore, the FET 1006 for preventing overcurrent, the reference voltage generator 1009, and the comparator 1111 for detecting overcurrent as shown in FIG. 51 are unnecessary, wherefore the circuit can be simplified.

Further, the number of times the bimetal switch is turned off is counted and the electrical connection with the secondary battery is broken if the count value has exceeded the specified value determined based on the operation assurance number of the bimetal switch. Thus, the charging and discharging of the secondary battery can be stopped before the number of operation of the bimetal switch exceeds the operation assurance number. As a result, the melting of the bimetal switch can be prevented, the secondary battery can be protected from overcharging and overcurrent and, in addition, user safety can be assured.

(37) The breaker preferably includes a temperature fuse connected between the bimetal switch and the third connection terminal, a second heater for heating the temperature fuse and a temperature fuse controller for energizing the second heater to melt the temperature fuse if the count value has exceeded the specified value.

With this construction, since the second heater is energized to melt the temperature fuse if the count value has exceeded the specified value, the electrical connection with the secondary battery can be securely broken and user safety can be more securely assured.

(38) It is preferable that the overcharging protector includes a comparator and a first transistor; that the temperature fuse controller includes a counter and a second transistor; that the comparator turns the first transistor on to energize the first heater and causes the counter to count up if the voltage between the third and fourth connection terminals has exceeded the overcharging protection voltage; and that the counter turns the second transistor on to energize the second heater if the count value has exceeded the specified value.

With this construction, since the overcharging protector is constructed by the comparator and the first transistor and the temperature fuse controller is constructed by the counter and the second transistor, the bimetal switch can be more securely turned off and the counter can be more securely caused to count up if the voltage of the secondary battery has exceeded the overcharging protection voltage.

(39) It is preferable that the first heater includes the first transistor; that the second heater includes the second transistor; that the bimetal switch is heated by heat generated when the first transistor is on; and that the temperature fuse is heated by heat generated when the second transistor is on.

With this construction, the first and second heaters can be omitted, whereby the circuit can be simplified and reduced in cost.

(40) It is preferable to provide a heat-sensitive protection switch device including a frame body having a first and a second supporting members arranged at a specified distance from each other, a first wiring conductor for forming a contact by being arranged on the first supporting member at a first-surface side of the frame body and forming a mounting terminal by extending from the contact, a second wiring conductor for forming a contact by being arranged on the second supporting member at the first-surface side of the frame body and forming a mounting terminal by extending from the contact, and a heat-sensitive switch, wherein the heat-sensitive switch is arranged to straddle between the respective contacts of the first and second wiring conductors and disconnects the respective contacts if being heated by the first heater, and a second-surface side of the frame body facing the first surface has a space portion in which the first heater is arranged via the respective supporting members.

With this construction, the heat-sensitive protection switch device is a unit to be handled independently of the first heater by forming the second-surface side of the frame body with such an opening in which the first heater for heating the heat-sensitive switching device via the first and second supporting members can be arranged. Thus, after the first heater is mounted on a wiring board, the heat-sensitive protection switch device can be mounted on the wiring board independently of the mounting of the first heater. Therefore, the protection circuit board can be more easily assembled and can be miniaturized since the construction of the wiring board is not complicated.

(41) It is preferable that the heat-sensitive switch includes a movable contact member arranged to straddle between the respective contacts and a bimetal element for acting on the movable contact member to disconnect the respective contacts if being heated by the first heater; and that the frame body includes a coupling member for coupling the first and second supporting members and mounting the bimetal element on the first-surface side.

With this construction, the bimetal element can be secured at a precise position with respect to the movable contact member by providing the frame body with the coupling member. Thus, the bimetal element can accurately act on the movable contact member and to securely turn the circuit off.

(42) The frame body is preferably formed with a recess in a second-surface side of the coupling member by forming the coupling member in an intermediate portion between the first and second surfaces of the first and second supporting members, the recess being the space portion.

With this construction, since the recess formed in the second-surface side of the coupling member is the opening enabling the first heater to be arranged to heat the heat-sensitive switching device, the heat-sensitive protection switch device can be so mounted on the wiring board that the first heater is arranged in the recess in the second-surface side of the coupling member. Thus, the heat-sensitive protection switch device can be easily positioned with respect to the heating element and the protection circuit board can be easily assembled.

(43) A cover body for covering the heat-sensitive switch is preferably provided at the first-surface side of the frame body.

With this construction, since the cover body for covering the heat-sensitive switching device is provided at the first-surface side of the frame body, the heat-sensitive protection switch device can be protected from external pressure, dust and the like. Thus, a heat-sensitive protection switch device having high operational reliability can be realized.

(44) The frame body is preferably constructed by fixing the first and second supporting members by the wiring board.

With this construction, since the frame body is constructed by fixing the first and second supporting members by the wiring board, it can be made solid. Thus, a heat-sensitive protection switch device having high operational reliability can be realized.

(45) A battery pack according to the present invention comprises a secondary battery and a protection circuit therefor as defined in (1).

With this construction, a battery pack having the same effects as the above (1) can be provided.

(46) It is preferable to provide a bottomed container for accommodating the secondary battery and an external terminal connecting unit including wiring patterns constructing the protection circuit, the protection circuit being formed in the external terminal connecting unit.

With this construction, the protection circuit for the secondary battery is formed in the external terminal connecting unit, and the secondary battery accommodated in the bottomed container can be protected from overcharging and excessive discharge current by the protection circuit.

(47) The wiring patterns are preferably printed on a surface of the external terminal connecting unit facing the secondary battery accommodated in the container.

With this construction, since the wiring patterns forming the protection circuit are printed on the surface of the external terminal connecting unit facing the secondary battery accommodated in the container, no separate board is necessary to form the protection circuit and the protection circuit can be miniaturized.

(48) The heat-sensitive switch is preferably arranged at a position of the external terminal connecting unit facing the secondary battery accommodated in the container.

With this construction, since the heat-sensitive switch is arranged at the position of the external terminal connecting unit facing the secondary battery accommodated in the container, the heat-sensitive switch is heated if the secondary battery generates heat by charging and discharging. If the temperature of the heat-sensitive switch exceeds a specified temperature set beforehand, the heat-sensitive switch is turned off to cut off the charge or discharge current of the secondary battery, wherefore the secondary battery can be protected from overcharging and excessive discharge current.

(49) It is preferable to further provide an electrically conductive cover disposed to cover the protection controller and mounted to connect wiring patterns formed at the opposite sides of the protection controller while straddling the protection controller.

With this construction, since the protection controller is covered by the electrically conductive cover and the wiring patterns formed at the opposite sides of the protection controller are connected by this cover, an area taken up by the wiring patterns on a plane where the controller is mounted can be reduced, whereby the protection circuit can be miniaturized.

(50) It is preferable that a fuse connected in series with the heat-sensitive switch is further provided; that operating conditions of the heat-sensitive switch are set such that the heat-sensitive switch is turned off earlier than the fuse; and that the fuse is arranged at a position of the cover facing the secondary battery accommodated in the container.

With this construction, since the fuse is arranged at the position of the cover facing the secondary battery accommodated in the container, the fuse can be easily heated by the heat generation of the secondary battery.

(51) It is preferable that the heat-sensitive switch includes a movable section driven by the temperature-dependent deformation of one selected from a bimetal, a shape-memory alloy and a shape-memory resin; and that a supporting member supporting the movable section is formed on a surface of the external terminal connecting unit facing the secondary battery accommodated in the container.

With this construction, the heat-sensitive switch is one selected from a bimetal switch, a switch using a shape-memory alloy and a switch using a shape-memory resin, and the movable sections of these heat-sensitive switches are supported by the supporting member provided on the surface of the external terminal connecting unit facing the secondary battery accommodated in the container. Thus, these heat-sensitive switches need not be formed as separate components and can be miniaturized.

(52) It is preferable that the protection circuit comprises a heat-sensitive protection switch device including a frame body having a first and a second supporting members arranged at a specified distance from each other, a first wiring conductor for forming a contact by being arranged on the first supporting member at a first-surface side of the frame body and forming a mounting terminal by extending from the contact, a second wiring conductor for forming a contact by being arranged on the second supporting member at the first-surface side of the frame body and forming a mounting terminal by extending from the contact, and a heat-sensitive switch; that the heat-sensitive switch is arranged to straddle between the respective contacts of the first and second wiring conductors; and that a second-surface side of the frame body facing the first surface has a space portion in which the first heater is arranged via the respective supporting members.

With this construction, since the protection circuit constructed using the heat-sensitive protection switch device is provided, the miniaturization of the protection circuit board can be advanced. Therefore, the miniaturization of the battery pack can also be advanced.

(53) It is preferable that the heat-sensitive protection switch device is arranged between a positive electrode terminal of the secondary battery and the first connection terminal; and that the protection controller includes an overcharging detecting circuit for detecting that the secondary battery has been overcharged and a switching element on-off controlled by a detection signal of the overcharging detecting circuit.

With this construction, since the first heater is energized to heat the heat-sensitive switching element constructing the heat-sensitive protection switch device if the secondary battery is overcharged, the charging circuit can be securely shut off. Thus, the secondary battery can be securely protected and a battery pack having high reliability can be realized.

(54) The overcharging detecting circuit, the switching element and the first heater are preferably constructed by a semiconductor integrated circuit.

With this construction, the overcharging detecting circuit, the switching element and the first heater constructing the protection circuit are constructed by a semiconductor integrated circuit, the protection circuit can be miniaturized and the miniaturization of the protection circuit board can be more advanced. Thus, the miniaturization of the battery pack can be more advanced.

(55) The semiconductor integrated circuit is preferably arranged in the space portion to heat the heat-sensitive switch.

With this construction, since the heat-sensitive switching element constructing the heat-sensitive protection switch device is heated by the semiconductor integrated circuit, the heat value is larger than in the case where the heat-sensitive switching element is heated only by the first heater, whereby the heat-sensitive switching element can be securely heated. Therefore, the secondary battery can be securely protected and a battery pack having high reliability can be realized.

(56) A heat-sensitive protection switch device according to the present invention for turning a circuit off by being heated by a heating element comprises a frame body having a first and a second supporting members arranged at a specified distance from each other; a first wiring conductor for forming a contact by being arranged on the first supporting member at a first-surface side of the frame body and forming a mounting terminal by extending from the contact; a second wiring conductor for forming a contact by being arranged on the second supporting member at the first-surface side of the frame body and forming a mounting terminal by extending from the contact; and a heat-sensitive switch arranged to straddle between the respective contacts of the first and second wiring conductors and adapted to disconnect the respective contacts if being heated by the heating element, a second-surface side of the frame body facing the first surface being formed with such an opening in which the heating element for heating the heat-sensitive switch via the respective supporting members can be arranged.

With this construction, the heat-sensitive protection switch device is a unit to be handled independently of the heating element by forming the second-surface side of the frame body with such an opening in which the heating element for heating the heat-sensitive switching element via the first and second supporting members can be arranged. Thus, after the heating element is mounted on a wiring board, the heat-sensitive protection switch device can be mounted on the wiring board independently of the mounting of the heating element. Therefore, the protection circuit board can be more easily assembled and the miniaturization thereof can be advanced since the construction of the wiring board is not complicated.

(57) A battery pack having a first and a second connection terminals according to the present invention comprises a secondary battery for supplying power to a load device, and a protection circuit for protecting the secondary battery, the protection circuit being constructed using the heat-sensitive protection switch device as defined in the above (56).

With this construction, since the protection circuit constructed using the heat-sensitive protection switch device is provided, the miniaturization of the protection circuit board can be advanced. Therefore, the miniaturization of the battery pack can also be advanced.

INDUSTRIAL APPLICABILITY

The present invention is capable of protecting a secondary battery from overcharging and excessive discharge current by a simple circuit and is useful as a power source for a mobile device or a driving power source.

What is claimed is:

1. A protection circuit for a secondary battery, comprising:
a first and a second connection terminals for connecting a charging device for charging the secondary battery and/or a load device driven by a discharge current from the secondary battery;
a third and a fourth connection terminals connected with the opposite electrodes of the secondary battery;
a heat-sensitive switch that is provided between the first and third connection terminals and turned off in the case of exceeding a specified temperature set beforehand;
a first heater for heating the heat-sensitive switch; and
a protection controller for turning the heat-sensitive switch off by causing the first heater to generate heat if a physical quantity relating to the characteristic of the secondary battery exceeds a preset value of the physical quantity, wherein
the heat-sensitive switch is turned off in the case of exceeding a specified operating temperature by self-heat generation due a current flowing thereinto and in the case of exceeding the operating temperature by being externally heated, and
the protection controller includes:
a switching device for controlling the energization of the first heater,
a first overcharging protector for causing the switching device to energize the first heater if a voltage between the third and fourth connection terminals exceeds a specified overcharging protection voltage, and
a second overcharging protector for causing the switching device to energize the first heater if a voltage between the first and second connection terminals exceeds the overcharging protection voltage, wherein
the first overcharging protector includes a first comparator for detecting whether or not a voltage between the third and fourth connection terminals exceeds the overcharging protection voltage,
the second overcharging protector includes a second comparator for outputting a high-level signal if a voltage between the first and second connection terminals has exceeded the overcharging protection voltage, and
the switching device energizes the first heater if at least either one of the first and second comparators has outputted a high-level signal,
wherein the switching device includes:
an OR gate having an input terminal thereof connected to output terminals of the first and second comparators; and
an n-channel field-effect transistor having a gate thereof connected to an output terminal of the OR gate, having a drain thereof connected with the first heater, and having a source thereof connected to the second and fourth connection terminals.

2. A protection circuit for a secondary battery, comprising:
a first and a second connection terminals for connecting a charging device for charging the secondary battery and/or a load device driven by a discharge current from the secondary battery;
a third and a fourth connection terminals connected with the opposite electrodes of the secondary battery;
a heat-sensitive switch that is provided between the first and third connection terminals and turned off in the case of exceeding a specified temperature set beforehand;
a first heater for heating the heat-sensitive switch;
a protection controller for turning the heat-sensitive switch off by causing the first heater to generate heat if a physical quantity relating to the characteristic of the secondary battery exceeds a preset value of the physical quantity, wherein the protection controller further comprises a switching device, and a short-circuit protector for causing the switching device to energize the first heater if a voltage between the third and fourth connection terminals exceeds a sum of a voltage between the first and second connection terminals and a specified short-circuit protection voltage, wherein the protection controller further comprises:
a first overcharging protector, and
a second overcharging protector, wherein the first overcharging protector includes a first comparator for detecting whether or not a voltage between the third and fourth connection terminals exceeds an overcharging protection voltage, the second overcharging protector includes a second comparator for outputting a high-level signal if a voltage between the first and second connection terminals has exceeded the overcharging protection voltage, the short-circuit protector includes a third comparator for outputting a high-level signal if the voltage between the third and fourth connection terminals exceeds a sum of the voltage between the first and second connection terminals and the short-circuit protection voltage, and the switching device energizes the first heater if at least one of the first to third comparators has outputted a high-level signal, wherein the switching device includes:
an OR gate having an input terminal thereof connected to output terminals of the first to third comparators; and
an n-channel field-effect transistor having a gate thereof connected to an output terminal of the OR gate, having a drain thereof connected to the first heater, and having a source thereof connected to the second and fourth connection terminals.

3. A protection circuit for a secondary battery, comprising:
a first and a second connection terminals for connecting a charging device for charging the secondary battery and/or a load device driven by a discharge current from the secondary battery;
a third and a fourth connection terminals connected with the opposite electrodes of the secondary battery;
a heat-sensitive switch that is provided between the first and third connection terminals and turned off in the case of exceeding a specified temperature set beforehand;
a first heater for heating the heat-sensitive switch;
a protection controller for turning the heat-sensitive switch off by causing the first heater to generate heat if a physical quantity relating to the characteristic of the secondary battery exceeds a preset value of the physical quantity, wherein
the protection controller further comprises:
a switching device,
a first overcharging protector,
a second overcharging protector,
a short-circuit protector for causing the switching device to energize the first heater if a voltage between the third and fourth connection terminals exceeds a sum of a voltage between the first and second connection terminals and a specified short-circuit protection voltage, and
a temperature controller for causing the switching device to stop energizing the first heater if the temperature of the first heater has reached to a specified upper limit temperature higher than the operating temperature of the heat-sensitive switch, wherein the first overcharging protector includes a first comparator for outputting a high-level signal if a voltage between the third and fourth connection terminals exceeds an overcharging protection voltage;

the second overcharging protector includes a second comparator for outputting a high-level signal if a voltage between the first and second connection terminals has exceeded the overcharging protection voltage;

the short-circuit protector includes a third comparator for outputting a high-level signal if the voltage between the third and fourth connection terminals exceeds a sum of the voltage between the first and second connection terminals and the short-circuit protection voltage;

the temperature controller includes:
a temperature sensor for detecting the temperature of the first heater, and
a fourth comparator for outputting a low-level signal if temperature detected by the temperature sensor has reached the upper limit temperature; and the switching device includes:
an OR gate having an input terminal thereof connected to output terminals of the first to third comparators,
an AND gate having an input terminal thereof connected to an output terminal of the OR gate and an output terminal of the fourth comparator, and
an n-channel field-effect transistor having a gate thereof connected to an output terminal of the AND gate, having a drain thereof connected to the first heater, and having a source thereof connected to the second and fourth connection terminals.

4. A protection circuit for a secondary battery, comprising:
a first and a second connection terminals for connecting a charging device for charging the secondary battery and/or a load device driven by a discharge current from the secondary battery;
a third and a fourth connection terminals connected with the opposite electrodes of the secondary battery;
a heat-sensitive switch that is provided between the first and third connection terminals and turned off in the case of exceeding a specified temperature set beforehand;
a first heater for heating the heat-sensitive switch;
a protection controller for turning the heat-sensitive switch off by causing the first heater to generate heat if a physical quantity relating to the characteristic of the secondary battery exceeds a preset value of the physical quantity, wherein the heat-sensitive switch is turned off in the case of exceeding a specified operating temperature by self-heat generation due a current flowing thereinto and in the case of exceeding the operating temperature by being externally heated; and the protection controller includes:
a switching device for switching the energization of the first heater,
a first overcharging protector for causing the switching device to energize the first heater if the voltage between the third and fourth connection terminals exceeds a specified overcharging protection voltage,
a second overcharging protector, and
a temperature controller for causing the switching device to stop energizing the first heater if the temperature of the first heater has reached a specified upper limit temperature higher than the operating temperature of the heat-sensitive switch, wherein
the first overcharging protector includes a first comparator for outputting a high-level signal if the voltage between the third and fourth connection terminals exceeds the overcharging protection voltage;
the second overcharging protector includes a second comparator for outputting a high-level signal if the voltage between the first and second connection terminals exceeds the overcharging protection voltage;
the short-circuit protector includes a third comparator for outputting a high-level signal if the voltage between the third and fourth connection terminals exceeds a sum of the voltage between the first and second connection terminals and the short-circuit protection voltage;
the temperature controller includes:
  a temperature sensor for detecting the temperature of the first heater, and
  a fourth comparator for outputting a low-level signal if the temperature detected by the temperature sensor has reached the upper limit temperature; and
the switching device includes:
  an OR gate having an input terminal thereof connected with output terminals of the first to third comparators,
  an AND gate having an input terminal thereof connected to an output terminal of the OR gate and an output terminal of the fourth comparator, and
  an n-channel field-effect transistor having a gate thereof connected to an output terminal of the AND gate, a drain thereof connected to the first heater, and a source thereof connected to the second and fourth connection terminals.

5. A protection circuit for a secondary battery according to claim 4, wherein the switching device causes the first heater to be energized if high-level signals are outputted from both first and fourth comparators while causing the energization of the first heater to be stopped if a low-level signal is outputted from at least either one of the two comparators.

6. A protection circuit for a secondary battery, comprising:
a first and a second connection terminals for connecting a charging device for charging the secondary battery and/or a load device driven by a discharge current from the secondary battery;
a third and a fourth connection terminals connected with the opposite electrodes of the secondary battery,
a heat-sensitive switch that is provided between the first and third connection terminals and turned off in the case of exceeding a specified temperature set beforehand;
a first heater for heating the heat-sensitive switch; and
a protection controller for turning the heat-sensitive switch off by causing the first heater to generate heat if a physical quantity relating to the characteristic of the secondary battery exceeds a preset value of the physical quantity, wherein
the heat-sensitive switch is connected between the first and third connection terminals and is turned off in the case of exceeding a specified operating temperature by self-heat generation due a current flowing thereinto and in the case of exceeding the operating temperature by being externally heated; and
the protection controller includes:
  a switching device for controlling the energization of the first heater,
  a first overcharging protector for causing the switching device to energize the first heater if the voltage between the third and fourth connection terminals exceeds a specified over charging protection voltage, and
  a short-circuit protector for causing the switching device to energize the first heater if the voltage between the third and fourth connection terminals exceeds a sum of the voltage between the first and second connection terminals and a specified short-circuit protection voltage, wherein
the first overcharging protector includes a first comparator for detecting whether or not the voltage between the third and fourth connection terminals exceeds the overcharging protection voltage;
the short-circuit protector includes a third comparator for outputting a high-level signal if the voltage between the third and fourth connection terminals exceeds a sum of the voltage between the first and second connection terminals and a specified short-circuit protection voltage; and
the switching device energizes the first heater if at least either one of the first and third comparators has outputted a high-level signal,
wherein the switching device includes:
an OR gate having an input terminal thereof connected to output terminals of the first and third comparators, and
an n-channel field-effect transistor having a gate thereof connected to an output terminal of the OR gate, a drain thereof connected to the first heater, and a source thereof connected to the second and fourth connection terminals.

7. A protection circuit for a secondary battery, comprising:
a first and a second connection terminals for connecting a charging device for charging the secondary battery and/or a load device driven by a discharge current from the secondary battery;
a third and a fourth connection terminals connected with the opposite electrodes of the secondary battery;
a heat-sensitive switch that is provided between the first and third connection terminals and turned off in the case of exceeding a specified temperature set beforehand;
a first heater for heating the heat-sensitive switch; and
a protection controller for turning the heat-sensitive switch off by causing the first heater to generate heat if a physical quantity relating to the characteristic of the secondary battery exceeds a preset value of the physical quantity, wherein
the heat-sensitive switch is a bimetal switch; and
the protection controller includes:
  an overcharging protector for energizing the first heater to turn the bimetal switch off if the voltage between the third and fourth connection terminals exceeds a specified overcharging protection voltage, and
  a breaker for counting the number of times the bimetal switch is turned off by the overcharging protector and breaking the electrical connection with the secondary battery if a count value has exceeded a specified value determined based on an operation assurance number.

8. A protection circuit for a secondary battery according to claim 7, wherein the breaker includes:
a temperature fuse connected between the bimetal switch and the third connection terminal;
a second heater for heating the temperature fuse; and
a temperature fuse controller for energizing the second heater to melt the temperature fuse if the count value has exceeded the specified value.

9. A protection circuit for a secondary battery according to claim 8, wherein:
the overcharging protector includes a comparator and a first transistor;

the temperature fuse controller includes a counter and a second transistor;

the comparator turns the first transistor on to energize the first heater and causes the counter to count up if the voltage between the third and fourth connection terminals has exceeded the overcharging protection voltage; and the counter turns the second transistor on to energize the second heater if the count value has exceeded the specified value.

10. A protection circuit for a secondary battery according to claim 9, wherein:

the first heater includes the first transistor;

the second heater includes the second transistor;

the bimetal switch is heated by heat generated when the first transistor is on; and the temperature fuse is heated by heat generated when the second transistor is on.

\* \* \* \* \*